United States Patent
Funyak et al.

(10) Patent No.: US 11,345,415 B2
(45) Date of Patent: May 31, 2022

(54) VEHICLE OCCUPANT DETECTION

(71) Applicant: IEE INTERNATIONAL ELECTRONICS & ENGINEERING S.A., Echternach (LU)

(72) Inventors: Joseph Michael Funyak, Rochester Hills, MI (US); Bjorn M. Hansson, Carmel, IN (US); Oliver Diekmann, Lake Orion, MI (US); Russ Holland, White Lake, MI (US)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 16/818,536

(22) Filed: Mar. 13, 2020

(65) Prior Publication Data

US 2020/0290567 A1 Sep. 17, 2020

Related U.S. Application Data

(60) Provisional application No. 62/865,744, filed on Jun. 24, 2019, provisional application No. 62/818,423, filed on Mar. 14, 2019.

(30) Foreign Application Priority Data

Mar. 22, 2019 (LU) ........................ 101 162

(51) Int. Cl.
*B62D 31/02* (2006.01)
*B60R 25/31* (2013.01)
(Continued)

(52) U.S. Cl.
CPC ............ *B62D 31/02* (2013.01); *B60R 25/102* (2013.01); *B60R 25/1018* (2013.01);
(Continued)

(58) Field of Classification Search
CPC ...... B60H 1/00792; B60N 2/002; B60Q 9/00; B60R 16/037; B60R 21/01512;
(Continued)

(56) References Cited

U.S. PATENT DOCUMENTS 5,869,907 A * 2/1999 Marler ............... B62J 11/19
307/10.1
6,204,772 B1 * 3/2001 DeMay ............. B60R 25/102
340/686.1
(Continued)

FOREIGN PATENT DOCUMENTS

WO WO-2015-060868 A1 * 10/2013 ............. H04W 4/22
WO 2015140333 A1 9/2015
(Continued)

OTHER PUBLICATIONS

Luxembourg Search Report corresponding to Luxembourg application No. LU 101162, dated Dec. 2, 2019, 3 pages.
(Continued)

*Primary Examiner* — Stephen R Burgdorf
(74) *Attorney, Agent, or Firm* — Reising Ethington P.C.

(57) ABSTRACT

A vehicle occupant detection system and method for using the same. The vehicle occupant detection system includes: a controller; a plurality of life detection sensors, wherein the plurality of life detection sensors are installed within an interior cabin of a mass-transit vehicle and are each associated with a life detection zone; a local warning system having at least one human-machine interface (HMI) output device; and a vehicle interface that communicatively couples the controller to a vehicle electrical system of the mass-transit vehicle. The vehicle occupant detection system is configured to: (i) acquire sensor data by scanning the life detection zone using the plurality of life detection sensors; (ii) determine whether an occupant is present based on the sensor data; and (iii) provide an indication to a user that an occupant is present using the HMI output device when it is determined that an occupant is present.

4 Claims, 29 Drawing Sheets

(51) Int. Cl.
*B60R 25/102* (2013.01)
*G01S 19/13* (2010.01)
*G01S 13/04* (2006.01)
*B60R 25/34* (2013.01)
*B60R 25/10* (2013.01)
*G01S 7/02* (2006.01)

(52) U.S. Cl.
CPC ............... *B60R 25/31* (2013.01); *B60R 25/34* (2013.01); *G01S 7/0232* (2021.05); *B60R 2325/308* (2013.01); *G01S 7/023* (2013.01); *G01S 13/04* (2013.01); *G01S 19/13* (2013.01)

(58) Field of Classification Search
CPC .......... B60R 21/01556; B60R 25/1018; B60R 25/102; B60R 25/31; B60R 25/34; B60R 2325/308; B62D 31/02; G01S 7/023; G01S 13/04; G01S 13/878; G01S 19/13; G01S 19/14; G05B 19/0428; G06K 9/00369; G06K 9/00845; G07C 5/008; G08B 21/22
USPC ....................................................... 340/425.5
See application file for complete search history.

(56) References Cited

U.S. PATENT DOCUMENTS

| | | | | |
|---|---|---|---|---|
| 6,518,883 | B1* | 2/2003 | Benard | E05B 79/06 307/10.2 |
| 7,279,640 | B2* | 10/2007 | White | B60D 1/62 174/135 |
| 10,252,640 | B2* | 4/2019 | Cech | G08B 25/016 |
| 10,457,161 | B2 | 10/2019 | Lu-Dac et al. | |
| 10,636,276 | B2* | 4/2020 | Desai | G06K 9/00832 |
| 2006/0071763 | A1* | 4/2006 | Ramos | B60R 25/102 340/426.12 |
| 2009/0109010 | A1* | 4/2009 | Wiley | B60Q 9/00 340/433 |
| 2011/0180343 | A1 | 7/2011 | Decoster et al. | |
| 2015/0262198 | A1* | 9/2015 | Bai | G06Q 30/0201 705/7.31 |
| 2016/0096412 | A1* | 4/2016 | Mankame | B60H 1/00792 165/11.2 |
| 2016/0311388 | A1 | 10/2016 | Diewald | |
| 2016/0379459 | A1* | 12/2016 | Trang | G08B 21/24 340/457 |
| 2017/0282828 | A1 | 10/2017 | Carenza et al. | |
| 2019/0054841 | A1 | 2/2019 | Cech et al. | |
| 2019/0057596 | A1 | 2/2019 | Desai | |
| 2019/0088103 | A1 | 3/2019 | Lebron et al. | |
| 2019/0088104 | A1* | 3/2019 | Crewe | G06K 9/00369 |
| 2019/0143944 | A1* | 5/2019 | Park | B60R 25/1001 340/426.24 |
| 2020/0050874 | A1 | 2/2020 | Lorenz et al. | |
| 2020/0217942 | A1* | 7/2020 | Asmar | G01S 13/886 |

FOREIGN PATENT DOCUMENTS

WO WO-2016-181395 A1 * 5/2016 ........... B60R 21/015
WO WO2018054823 A1 3/2018

OTHER PUBLICATIONS

Written Opinion corresponding to Luxembourg application No. LU 101162, dated Dec. 2, 2019, 7 pages.

* cited by examiner

Bus VIN: _____
BUS GPS Location: _____
Time of Events: _____
Date of Events: _____
Bus Temperature: _____ X°F
Message: There has been detected a motion indicating a lifeform on Bus X. The Bus is location at coorinates X, Y, Z. Please dispatch and search for potion child left on bus.
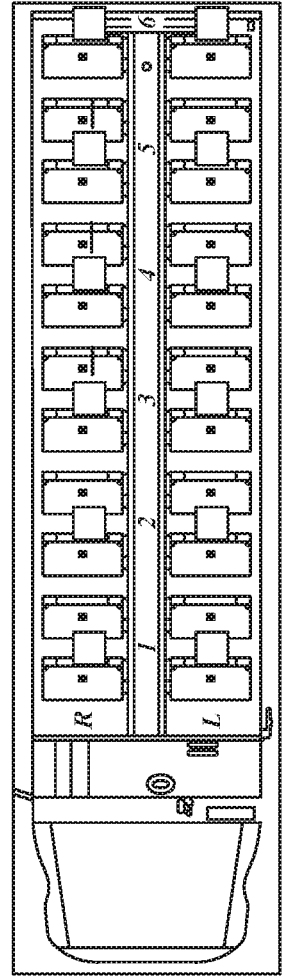
Child Location
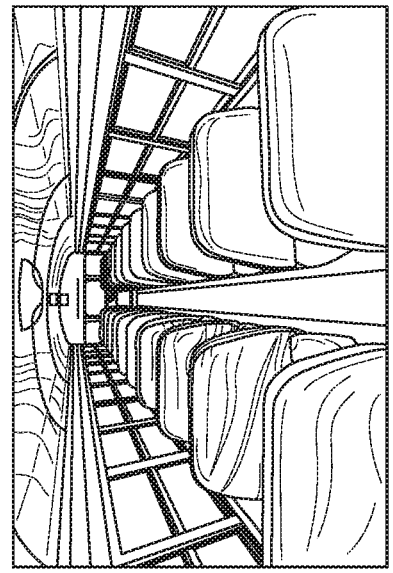
Bus Interior Picture / Video
*FIG. 11*

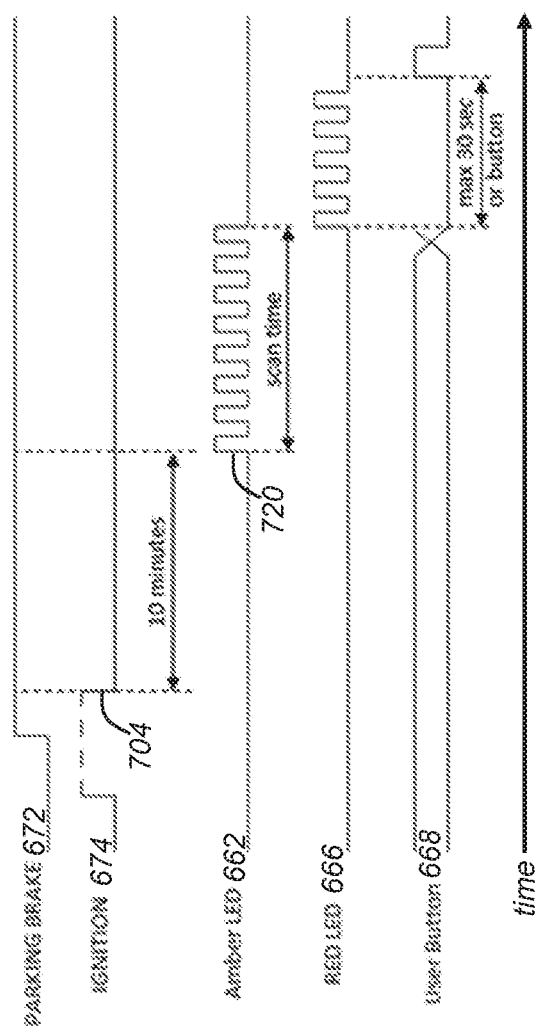

FIG. 27
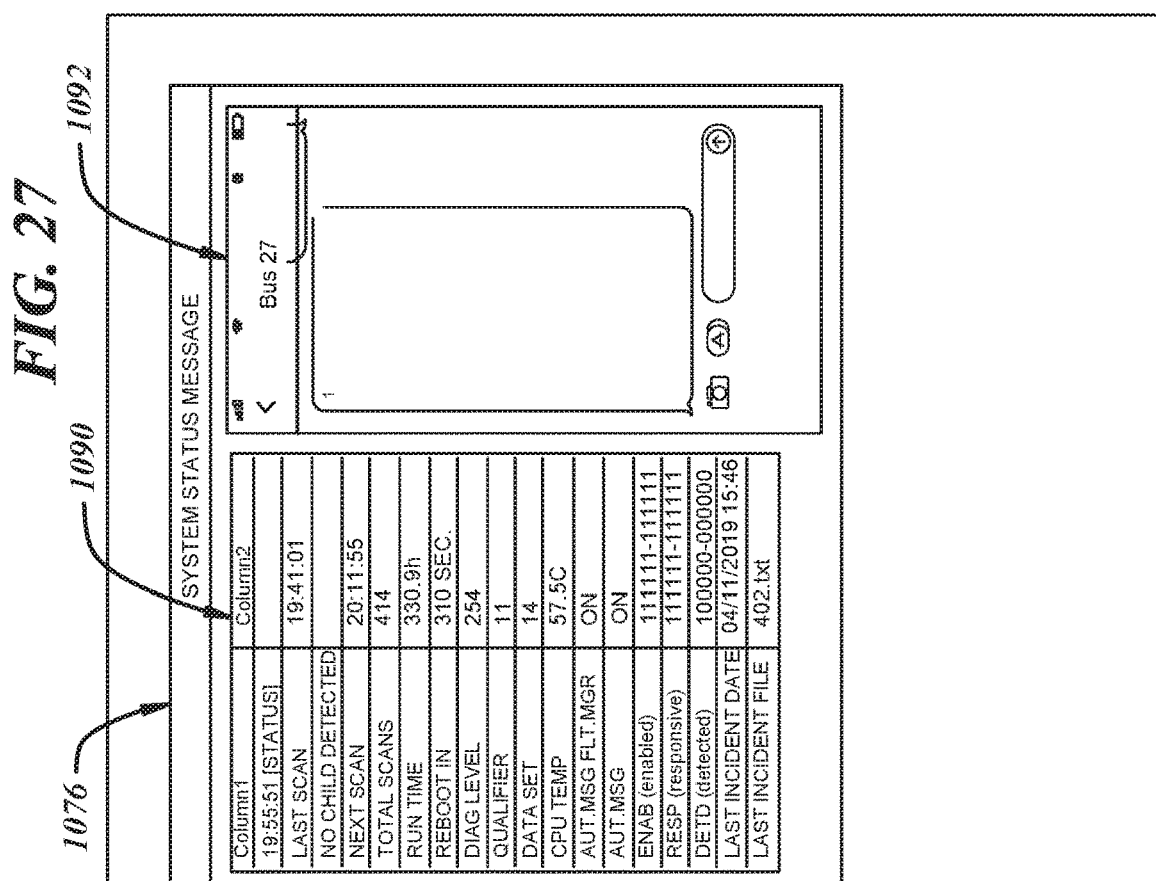
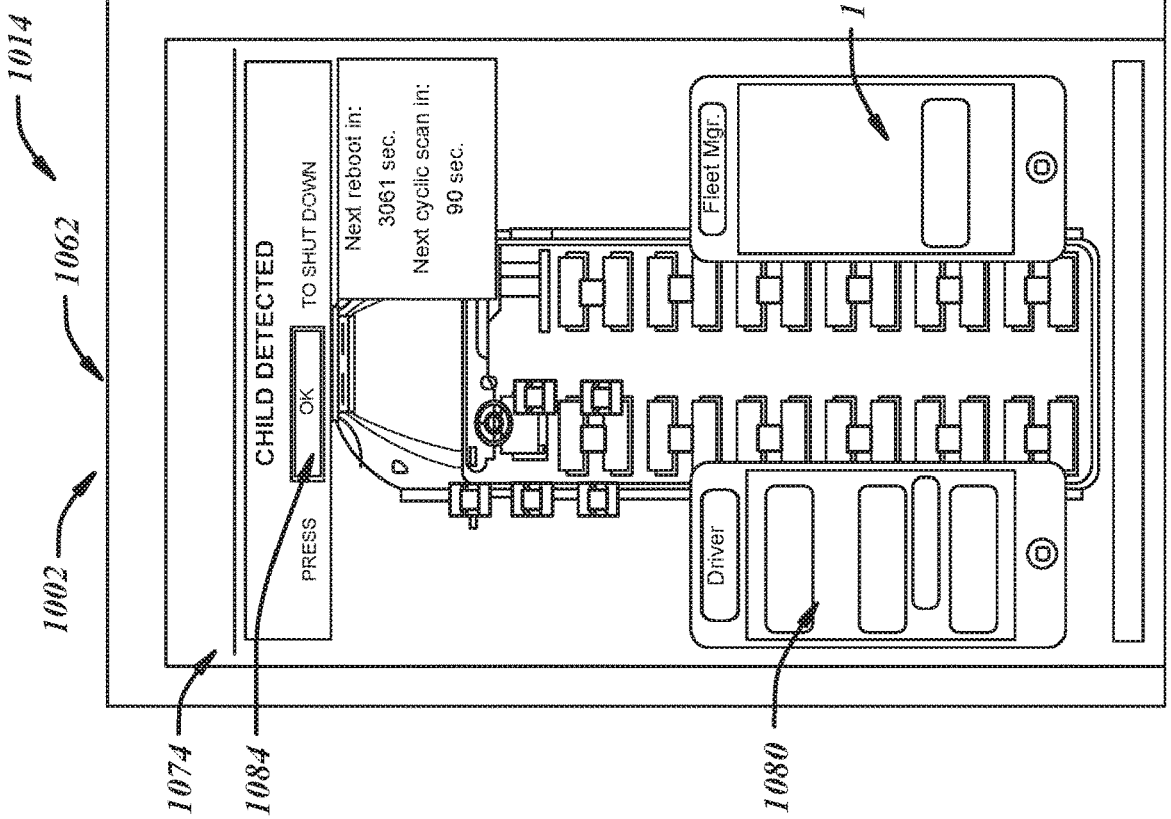

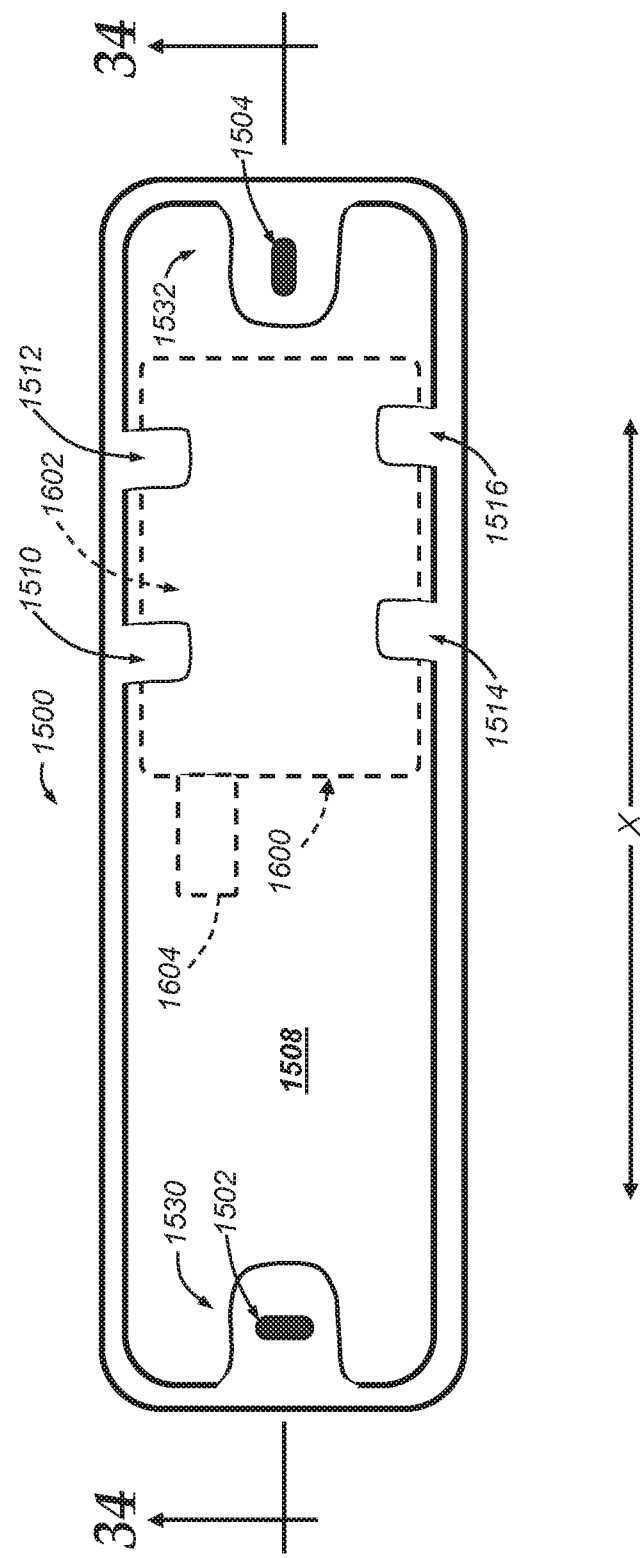

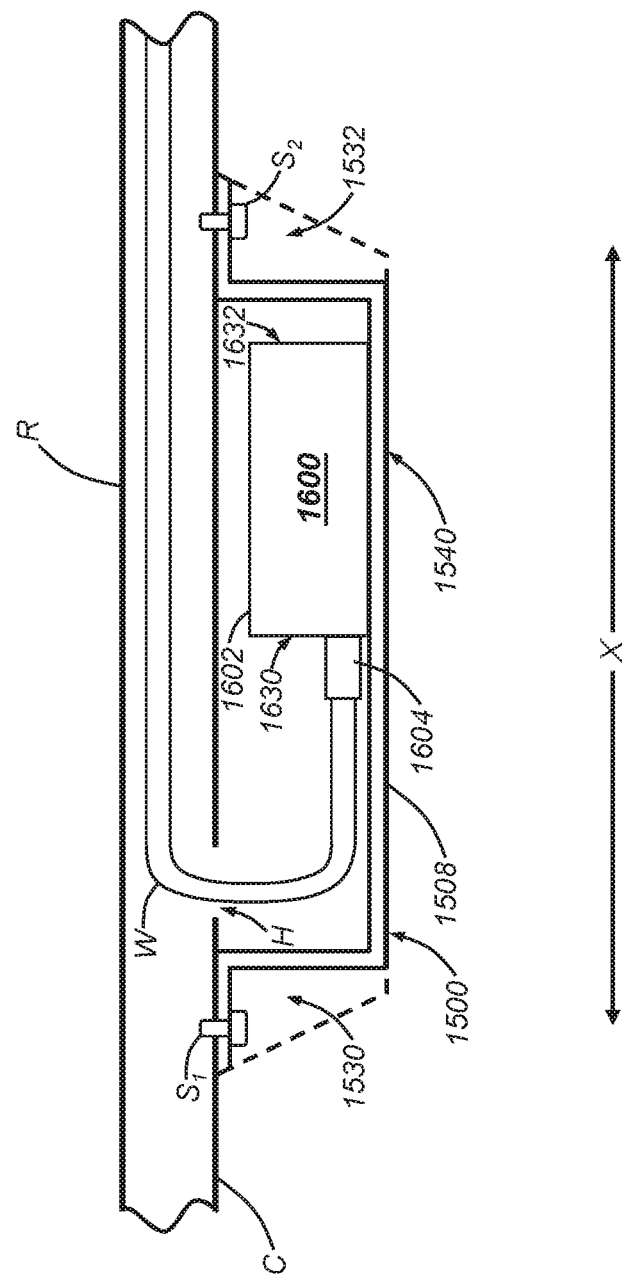

VEHICLE OCCUPANT DETECTION

TECHNICAL FIELD

This disclosure relates to detecting occupants within mass-transit vehicles such as school buses.

BACKGROUND

Mass-transit vehicles, such as school busses, transport many passengers that can each have different departure and/or arrival locations. In some scenarios, it may be beneficial to determine whether one or more passengers remain on the vehicle after the route of the vehicle ends, such as when a bus driver has completed their designated route and is parking the bus for the night. While the driver may manually check the passenger cabins or compartments of the vehicle for passengers at this time, the driver may overlook or miss observing the presence of a passenger, such as by not seeing a small child under the seat of a bus.

Moreover, there has been many cases in which a child was left on a bus after the bus driver had parked the bus and left. This can be and has proven to be a dangerous scenario and can lead to harm to the passenger. Thus, there is a need to automatically ensure that no passengers are left on a mass-transit vehicle without relying on a driver manually checking for the presence of passengers.

SUMMARY

According to one aspect of the invention, there is provided a vehicle occupant detection system, comprising:
- a controller and a memory storing computer instructions, wherein the controller includes a processor and that is communicatively coupled to the memory;
- a plurality of life detection sensors, wherein the plurality of life detection sensors are installed within an interior cabin of a mass-transit vehicle and are each associated with a life detection zone, and wherein the plurality of life detection sensors are communicatively coupled to the controller;
- a local warning system having a human-machine interface (HMI) output device, wherein the HMI output device is used to indicate a result of an occupant detection scanning process carried out using the plurality of life detection sensors;
- a vehicle interface that communicatively couples the controller to a vehicle electrical system of the mass-transit vehicle;
- wherein the controller, when executing the computer instructions using the processor, causes the vehicle occupant detection system to:
  - detect a mass-transit service termination event based on vehicle data received via the vehicle interface;
  - in response to detecting the mass-transit service termination event, acquire sensor data by scanning the life detection zone using the plurality of life detection sensors;
  - determine whether an occupant is present based on the sensor data; and
  - provide an indication to a user that an occupant is present using the HMI output device when it is determined that an occupant is present.

According to various embodiments, this system may further include any one of the following features or any technically-feasible combination of some or all of these features:
- the controller is configured to detect one or more vehicle conditions of the vehicle electrical system via the vehicle interface, and wherein the one or more vehicle conditions include a parking brake status and/or an ignition status;
- the HMI output device includes a plurality of light sources;
- the local warning system includes a driver interface that includes the HMI output device, and wherein the driver interface includes an HMI input device;
- the HMI output device of the driver interface comprises an electronic display device that presents a graphical user interface (GUI), and wherein the electronic display device is communicatively coupled to the controller;
- the HMI input device is a physical pushbutton;
- the local warning system includes one or more interior notification devices and/or one or more exterior notification devices;
- the vehicle occupant detection system further comprises a remote warning system that includes a cellular chipset and/or a short-range wireless communications controller;
- the cellular chipset is configured to carry out any one or more of the following: sending a short message service (SMS) message, sending a multimedia messaging service (MMS) message, sending other text message(s), establishing a voice over internet protocol (VoIP) connection, sending information or data using an IP, sending an email, establishing a voice call, sending sensor data, sending log files or log data, sending a scan result of the occupant detection scanning process, sending video or images captured using a camera, sending a geographic location of the vehicle occupant detection system and/or the vehicle, sending information pertaining to the occupant detection scanning process, sending system settings, and sending vehicle status information pertaining to the one or more vehicle conditions;
- the cellular chipset is configured to send the SMS message, the MMS message, and/or the email, and wherein the SMS message, the MMS message, and/or the email includes information or data indicating a scan result of the occupant detection system;
- the vehicle occupant detection system further comprises a dedicated battery that is separate from the vehicle electrical system and that is used to provide power to at least part of the vehicle occupant detection system;
- the vehicle occupant detection system is an aftermarket device that is retrofitted to the vehicle;
- the mass-transit vehicle is a bus;
- the mass-transit vehicle is an airplane or other aerial passenger vehicle, a train or other locomotive, or a boat or other marine vehicle;
- the mass-transit vehicle is a school bus and the plurality of life detection sensors are installed on a ceiling or any other suitable location of a passenger cabin of the school bus, and wherein each of the plurality of life detection sensors have a field of view that covers its associated life detection zone;
- each of the plurality of life detection sensors are associated with a different one of the life detection zones and wherein the life detection zones include seating locations within the school bus;
- the vehicle occupant detection system further comprises a global navigation satellite system (GNSS) receiver that is used to determine a geographic location of the vehicle occupant detection system.

According to another aspect of the invention, there is provided a method of carrying out a remedial action in response to detecting an occupant within a vehicle, wherein the method is carried out by a vehicle occupant detection system, and wherein the method comprises:

detecting a mass-transit service termination event at the vehicle occupant detection system;

in response to detecting the mass-transit service termination event, carrying out an occupant detection scanning process using a plurality of life detection sensors installed in the vehicle, wherein each of the plurality of life detection sensors obtains sensor data as a part of the occupant detection scanning process;

determining whether an occupant is present at the vehicle based on the sensor data; and providing a notification that indicates whether an occupant is present at the vehicle.

The notification may include indicating one or more life detection zones in which an occupant was detected.

According to another aspect of the invention, there is provided a vehicle occupant detection system, comprising:

a controller and a memory storing computer instructions, wherein the controller includes a processor and that is communicatively coupled to the memory;

a plurality of life detection sensors, wherein the plurality of life detection sensors are installed within an interior cabin of a mass-transit vehicle and are each associated with a life detection zone, and wherein the plurality of life detection sensors are communicatively coupled to the controller;

a local warning system having a human-machine interface (HMI) output device, wherein the HMI output device is used to indicate a result of an occupant detection scanning process carried out using the plurality of life detection sensors;

wherein the HMI output device of the local warning system comprises an electronic display device presenting a graphical user interface (GUI) that is configured to provide a graphical representation of results of the occupant detection scanning process for each of the plurality of life detection zones;

wherein the controller, when executing the computer instructions using the processor, causes the vehicle occupant detection system to:

acquire sensor data by scanning the life detection zone using the plurality of life detection sensors;

for each of the plurality of life detection zones, determine whether an occupant is present in the life detection zone based on the sensor data; and for each of the plurality of life detection zones, provide a graphical indicator to a user indicating whether an occupant is present in the life detection zone using the electronic display device, wherein the graphical indicator is provided via the GUI on the electronic display device.

According to various embodiments, the system of the preceding paragraph may further include any one of the following features or any technically-feasible combination of some or all of these features:

the HMI output device comprises a part of a driver interface of the local warning system, and wherein the driver interface includes an HMI input device;

the electronic display device is a touchscreen, and wherein the touchscreen comprises both the HMI output device and the HMI input device;

the vehicle occupant detection system further comprises a remote warning system that includes a cellular chipset and/or short-range wireless communications circuitry, and wherein the controller is further configured to, when executing the computer instructions using the processor, cause the vehicle occupant detection system to: (i) after providing the graphical indicator to the user, determine whether the HMI input device has received a confirmatory input from the primary operator within a first predetermined amount of time, and (ii) when the first predetermined amount of time has passed without receiving a confirmatory input from the primary operator, transmit a wireless message indicating the results of the occupant detection scanning process to a remote device using the remote warning system;

the remote device is a portable electronic device having cellular communication capabilities, and wherein the wireless message is a short message service (SMS) message or a multimedia messaging service (MMS) message that is transmitted using the cellular chipset;

the remote device is an electronic computer, and wherein the electronic computer is configured to notify a fleet manager or other stationed, remote user of the results of the occupant detection scanning process;

the controller is further configured to, when executing the computer instructions using the processor, display a graphical depiction of the mass-transit vehicle that identifies, for each of the plurality of life detection zones, an area corresponding to the life detection zone, and, display for each of the plurality of life detection zones, the graphical indicator over the area corresponding to the life detection zone so as to indicate whether an occupant is present in the life detection zone.

According to yet another aspect of the invention, there is provided a vehicle occupant detection system, comprising:

a controller and a memory storing computer instructions, wherein the controller includes a processor and that is communicatively coupled to the memory;

a plurality of life detection sensors, wherein the plurality of life detection sensors are installed within an interior cabin of a mass-transit vehicle and are each associated with a life detection zone, and wherein the plurality of life detection sensors are communicatively coupled to the controller via a modular wire harness that has a plurality of modular wire harness segments and that enables additional life detection sensor(s) to each be added to the vehicle occupant detection system in a modular fashion through connecting an additional wire harness segment to one of the plurality of module wire harness segments;

a local warning system having a human-machine interface (HMI) output device, wherein the HMI output device is used to indicate a result of an occupant detection scanning process carried out using the plurality of life detection sensors;

wherein the controller, when executing the computer instructions using the processor, causes the vehicle occupant detection system to:

acquire sensor data by scanning the life detection zone using the plurality of life detection sensors;

determine whether an occupant is present based on the sensor data; and provide an indication to a user that an occupant is present using the HMI output device when it is determined that an occupant is present.

According to another aspect of the invention, there is provided a vehicle occupant detection system, comprising:
- a controller and a memory storing computer instructions, wherein the controller includes a processor and that is communicatively coupled to the memory;
- a plurality of life detection sensors, wherein the plurality of life detection sensors are communicatively coupled to the controller, wherein the plurality of life detection sensors are installed within an interior cabin of a mass-transit vehicle and are each associated with a life detection zone, and wherein at least two of the plurality of life detection sensors are provided within a single housing that includes corresponding sensor view portions, which each provide an opening or transmissive portion through which signals are sent from and/or received at one of the at least two life detection sensors;
- a local warning system having a human-machine interface (HMI) output device, wherein the HMI output device is used to indicate a result of an occupant detection scanning process carried out using the plurality of life detection sensors;
- wherein the controller, when executing the computer instructions using the processor, causes the vehicle occupant detection system to:
  - acquire sensor data by scanning the life detection zone using the plurality of life detection sensors;
  - determine whether an occupant is present based on the sensor data; and
  - provide an indication to a user that an occupant is present using the HMI output device when it is determined that an occupant is present.

The mass-transit vehicle may include an aisle extending longitudinally through a middle of the interior cabin, wherein the housing having the at least two life detection sensors is installed to a portion of a ceiling of the interior cabin that is aligned with the aisle of the mass-transit vehicle, and wherein a first one of the at least two life detection sensors has a field of view directed to a seating area that is located to a first side of the aisle and a second one of the at least two life detection sensors has a field of view directed to a seating area that is located to a second side of the aisle that is located on an opposing side of the aisle relative to the first side.

In some embodiments, the life detection sensors may include at least four life detection sensors used to monitor four life detection zones.

According to yet another aspect of the invention, there is provided a vehicle occupant detection system, comprising:
- a controller and a memory storing computer instructions, wherein the controller includes a processor and that is communicatively coupled to the memory;
- a plurality of life detection sensors, wherein the plurality of life detection sensors are installed within an interior cabin of a mass-transit vehicle and are each associated with a life detection zone, and wherein the plurality of life detection sensors are communicatively coupled to the controller;
- a local warning system having at least one human-machine interface (HMI) output device, wherein the at least one HMI output device is used to indicate a result of an occupant detection scanning process carried out using the plurality of life detection sensors;
- a remote warning system having a cellular chipset and/or a short-range wireless communications circuitry;
- wherein the controller, when executing the computer instructions using the processor, causes the vehicle occupant detection system to:
  - acquire sensor data by scanning the life detection zone using the plurality of life detection sensors;
  - determine whether an occupant is present based on the sensor data;
  - locally provide a first indication to a primary operator indicating that an occupant is present using a first one of the at least one HMI output device when it is determined that an occupant is present;
  - wait a first predetermined amount of time for a confirmatory input to be received locally from the primary operator; and
  - wirelessly transmit an indication that an occupant is present to a remote user using the remote warning system when it is determined that an occupant is present and when the confirmatory input is not received locally from the primary operator.

According to various embodiments, the system of the preceding paragraph may further include any one of the following features or any technically-feasible combination of some or all of these features:
- the controller is further configured to, when executing the computer instructions using the processor, cause the vehicle occupant detection system to wait the first predetermined amount of time beginning at a time based on when the first indication is locally provided to the primary operator;
- the controller is further configured to, when executing the computer instructions using the processor, cause the vehicle occupant detection system to wait the first predetermined amount of time beginning at a time based on when it is determined that an occupant is present based on the sensor data;
- the controller is further configured to, when executing the computer instructions using the processor, cause the vehicle occupant detection system to wait the first predetermined amount of time beginning at a time based on when results of the occupant detection scanning process are obtained;
- the at least one HMI output device includes the first HMI output device and a second HMI output device, wherein the first HMI output device is an interior HMI output device that is used to provide notifications to the primary operator when inside the vehicle and the second HMI output device is an exterior HMI output device that is used to provide notifications to the primary operator when outside the vehicle, wherein the first indication is provided using the interior HMI device, and wherein the controller is further configured to, when executing the computer instructions using the processor, cause the vehicle occupant detection system to, when it is determined that an occupant is present after a second predetermined amount of time, locally provide a second indication to the primary operator indicating that an occupant is present using the exterior HMI output device;
- the system is configured to notify an emergency services system in response to determining that no action has been taken within a third predetermined amount of time;
- the third predetermined amount of time begins at a time based on any one or more of: when the first indication is locally provided to the primary operator, when it is determined that an occupant is present based on the sensor data, when results of the occupant detection scanning process are obtained, and when the second indication is provided or received.

According to another aspect of the invention, there is provided a vehicle occupant detection system, comprising:
- a controller and a memory storing computer instructions, wherein the controller includes a processor and that is communicatively coupled to the memory;
- a plurality of life detection sensors, wherein the plurality of life detection sensors are installed within an interior cabin of a mass-transit vehicle and are each associated with a life detection zone, and wherein the plurality of life detection sensors are communicatively coupled to the controller;
- a local warning system having a human-machine interface (HMI) output device, wherein the HMI output device is used to indicate a result of an occupant detection scanning process carried out using the plurality of life detection sensors;
- a vehicle interface that is retrofitted to the mass-transit vehicle and that communicatively couples the controller to a vehicle electrical system of the mass-transit vehicle;
- wherein the controller, when executing the computer instructions using the processor, causes the vehicle occupant detection system to:
  - acquire sensor data by scanning the life detection zone using the plurality of life detection sensors;
  - determine whether an occupant is present based on the sensor data; and
  - provide an indication to a user that an occupant is present using the HMI output device when it is determined that an occupant is present.

The vehicle occupant detection system may initially be provided as an after-market package that is configured to be retrofitted to the mass-transit vehicle so as to enable use of the vehicle occupant detection system within the mass-transit vehicle.

According to yet a further aspect of the invention, there is provided a vehicle occupant detection system, comprising:
- a controller and a memory storing computer instructions, wherein the controller includes a processor and that is communicatively coupled to the memory;
- a plurality of life detection sensors, wherein the plurality of life detection sensors are installed within an interior cabin of a mass-transit vehicle and are each associated with a life detection zone, wherein the plurality of life detection sensors are communicatively coupled to the controller, wherein a first one of the plurality of life detection sensors is mounted to a ceiling within the interior cabin of the mass-transit vehicle by a cover that protects the at least one life detection sensor, and wherein the cover includes a sensor view portion that is comprised of a transmissive material that allows the first life detection sensor to obtain sensor data through the transmissive material;
- a local warning system having a human-machine interface (HMI) output device, wherein the HMI output device is used to indicate a result of an occupant detection scanning process carried out using the plurality of life detection sensors;
- wherein the controller, when executing the computer instructions using the processor, causes the vehicle occupant detection system to:
  - acquire sensor data by scanning the life detection zone using the plurality of life detection sensors;
  - determine whether an occupant is present based on the sensor data; and
  - provide an indication to a user that an occupant is present using the HMI output device when it is determined that an occupant is present.

According to various embodiments, the system of the preceding paragraph may further include any one of the following features or any technically-feasible combination of some or all of these features:
- the sensor view portion is comprised of an optically opaque, RF transmissive material;
- the first life detection sensor is communicatively coupled to the controller at least in part by one or more electrical wires that run through a space formed between the ceiling and a roof of the mass-transit vehicle;
- the cover is at least partially received within a hole that is provided within the ceiling of the mass-transit vehicle;
- the cover of the first life detection sensor is flush-mounted within the ceiling of the interior cabin of the mass-transit vehicle;
- the cover of the first life detection sensor includes a protruding portion that projects downward from the ceiling of the interior cabin when mounted to the ceiling;
- the protruding portion holds the first life detection sensor such that the first life detection sensor is disposed beneath the ceiling of the mass-transit vehicle when mounted to the ceiling, and wherein a hole is provided in the ceiling so that the one or more electrical wires are able to pass from the space formed between the ceiling and the roof to an interior portion of the cover in which the life detection sensor resides;
- the entire cover is disposed below the ceiling when mounted to the ceiling.

According to yet another aspect of the invention, there is provided a vehicle occupant detection system, comprising:
- a controller and a memory storing computer instructions, wherein the controller includes a processor and that is communicatively coupled to the memory;
- a plurality of life detection sensors, wherein the plurality of life detection sensors are installed within an interior cabin of a mass-transit vehicle and are each associated with a life detection zone, and wherein the plurality of life detection sensors are communicatively coupled to the controller;
- a local warning system having a human-machine interface (HMI) output device, wherein the HMI output device is used to indicate a result of an occupant detection scanning process carried out using the plurality of life detection sensors;
- a remote warning system having a cellular chipset and/or a short-range wireless communications circuitry; and
- a physical secret alarm trigger provided within the mass-transit vehicle;
- wherein the controller, when executing the computer instructions using the processor, causes the vehicle occupant detection system to:
  - receive an input triggering the physical secret alarm trigger; and
  - in response to receiving the input triggering the physical secret alarm trigger, sending a wireless message using the remote warning system indicating a potential active threat at the mass-transit vehicle.

According to various embodiments, the system of the preceding paragraph may further include any one of the following features or any technically-feasible combination of some or all of these features:
- the secret alarm trigger is a button or switch provided within the mass-transit vehicle in an area proximate to a driver position and mounted in a manner such that the secret alarm trigger is capable of being triggered without being perceived by passengers located in a passenger seating area of the mass-transit vehicle;

a door of the mass-transit vehicle is provided on a first side of the driver position and the secret alarm trigger is provided on a second side of the driver position such that a driver, when in the driver position, is disposed between the secret alarm trigger and the door of the mass-transit vehicle;

the driver position includes a driver's seat, and wherein the secret alarm trigger is provided or embedded within the driver's seat a side of the driver seat that is provided at the second side of the driver position;

the local warning system is communicatively coupled to a silent exterior alarm device, and wherein the controller, when executing the computer instructions using the processor, causes the vehicle occupant detection system to activate the silent exterior alarm device in response to receiving the input triggering the physical secret alarm trigger;

the silent exterior alarm device is communicatively coupled to the vehicle occupant detection system via a vehicle interface that is provided between a vehicle electrical system of the mass-transit vehicle and the vehicle occupant detection system;

the vehicle occupant detection system further comprises a vehicle interface that couples the vehicle occupant detection system to a vehicle electrical system of the mass-transit vehicle, and wherein the controller, when executing the computer instructions using the processor, causes the vehicle occupant detection system to activate a vehicle disable switch via the vehicle interface such that the mass-transit vehicle is disabled from being started, driven, and/or propelled;

the controller, when executing the computer instructions using the processor, causes the vehicle occupant detection system to activate the vehicle disable switch in response to receiving an indication from a remote device to disable the mass-transit vehicle from being started, driven, and/or propelled;

the vehicle occupant detection system further comprises a camera positioned so as to have a field of view within a passenger compartment of the mass-transit vehicle, and wherein the controller, when executing the computer instructions using the processor, causes the vehicle occupant detection system to record image data using the camera in response to receiving the input triggering the physical secret alarm trigger;

the vehicle occupant detection system further comprises at least one camera-microphone package including a first camera-microphone package having the camera and a microphone, and wherein the controller, when executing the computer instructions using the processor, causes the vehicle occupant detection system to record audio data using the microphone in response to receiving the input triggering the physical secret alarm trigger;

the controller, when executing the computer instructions using the processor, causes the vehicle occupant detection system to send the recorded image data and recorded audio data to a remote device for immediate playback at the remote device;

the at least one camera-microphone package includes a second camera-microphone package having a camera that is positioned so as to have a field of view within the passenger compartment of the mass-transit vehicle;

the passenger compartment is elongated along a first axis and has a first end and a second end first taken along the first axis, and wherein the camera of the first camera-microphone package is positioned at an area proximate the first end of the passenger compartment and has a field of view facing toward the second end of the passenger compartment, and wherein the camera of the second camera-microphone package is positioned at an area proximate the second end of the passenger compartment and has a field of view facing toward the first end of the passenger compartment;

the mass-transit vehicle is a bus, and wherein the area proximate the first end of the passenger compartment where the camera of the first camera-microphone package is positioned is near a driver position and the area proximate the second end of the passenger compartment where the camera of the second camera-microphone package is positioned is proximate a rear end of the bus;

the controller, when executing the computer instructions using the processor, causes the vehicle occupant detection system to transit a signal to an electronically-controlled door lock that causes the door lock to disengage a locking mechanism thereby permitting access to a storage compartment of a lock box.

BRIEF DESCRIPTION OF DRAWINGS

One or more embodiments of the invention will hereinafter be described in conjunction with the appended drawings, wherein like designations denote like elements, and wherein:

FIG. 11 illustrates an exemplary emergency medical services (EMS) notification that can be sent by the vehicle occupant detection system according to one embodiment;

FIGS. 19-22 are timing diagrams illustrating certain functionality of the vehicle occupant detection system according to one embodiment;

FIG. 27 depicts a vehicle screen of a data management hub interface that can be displayed by the vehicle occupant detection data management system of FIG. 25;

FIG. 33 is a plan view of an interior portion of a cover that holds a life detection sensor and that is to be mounted to a vehicle; and FIG. 34 is a diagrammatic cross-sectional view of the cover and life detection sensor taken along the 34-34 line of FIG. 33 and mounted to the ceiling of the vehicle.

DETAILED DESCRIPTION

There is provided a vehicle occupant detection system and method that enables detection of occupants within a vehicle cabin of a mass-transit vehicle such as a bus, train, or plane. The vehicle occupant detection system and method can be used to carry out one or more remedial actions in response to detecting an occupant within the vehicle cabin—for example, by sending a notification to a driver of the vehicle informing the driver that an occupant (or lifeform) has been detected. In at least some embodiments, the vehicle occupant detection system includes carrying out an occupant detection scanning process in which one or more life detection sensors scan a vehicle cabin to detect one or more occupants (or other lifeforms). In one embodiment, when the occupant detection scanning process indicates the presence of an occupant, an alarm escalation process can be carried out, which can include providing local notification(s) at the vehicle so that a driver (or other user) is notified that an occupant is (or may be) present, as well as providing remote notification(s) to one or more remote individuals (e.g., a fleet manager) or systems (e.g., EMS services).

In at least some embodiments, the vehicle occupant detection system is configured to detect a child left behind on a school bus. The vehicle occupant detection system includes a controller (or central control unit (CCU)) that is connected to at least one life detection sensor and, in many embodiments, a plurality of such life detection sensors. According to at least some embodiments, the life detection sensors are electromagnetic sensors that transmit electromagnetic signals (e.g., microwave sensors) and receive a reflected electromagnetic signal. In a particular embodiment, the life detection sensors use microwaves to detect breathing (or a breathing motion) of a lifeform through carrying out an occupant detection scanning process in which the life detection sensors scan the vehicle cabin. As used herein, "scan", "scanning", and its other various forms refers to operating the life detection sensors so as to capture information indicative of the presence of an occupant. The controller can receive sensor data from the life detection sensors and generates a scan result that indicates whether an occupant is present within the vehicle and, if so, one or more remedial actions (e.g., providing notifications pursuant to an alarm escalation process) can be carried out.

Figure 1:
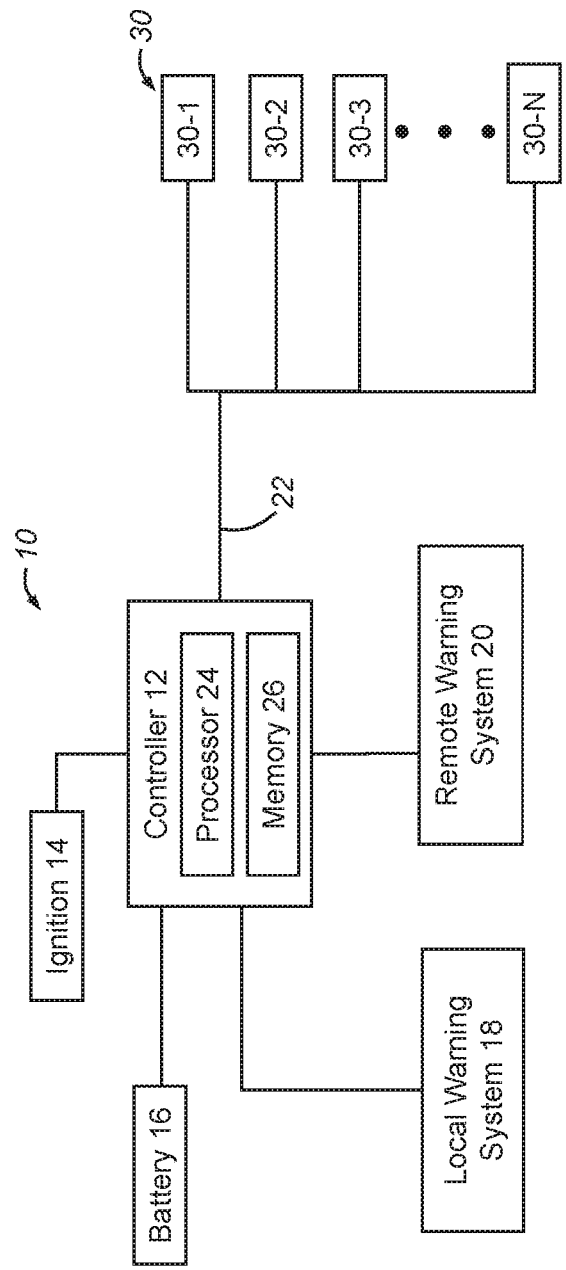
FIG. 1 is a block diagram depicting an embodiment of a vehicle occupant detection system.

With reference to FIG. 1, there is shown an embodiment of a vehicle occupant detection system 10 that includes a controller 12, a battery 16, a local warning system 18, a remote warning system 20, and a plurality of life detection sensors 30. The vehicle occupant detection system 10 can be installed on a vehicle, including motorcycles, trucks, sports utility vehicles (SUVs), recreational vehicles (RVs), busses, trains, other locomotives, marine vessels, aircraft, other mass-transit vehicles, etc.

The controller (or central control unit (CCU)) 12 controls certain aspects of the vehicle occupant detection system 10. According to various embodiments, the controller 12 can detect a vehicle occupant detection system activation event, obtain sensor data from the plurality of life detection sensors 30, and carry out one or more remedial actions. The controller 12 includes a processor 24 and memory 26 that includes computer instructions. The processor 24 can execute the computer instructions stored on the memory 26 so as to carry out one or more operations or features of the vehicle occupant detection system 10. The processor 24 of the controller 12 can be any type of device capable of processing electronic instructions including microprocessors, microcontrollers, host processors, controllers, vehicle communication processors, and application specific integrated circuits (ASICs). The memory 26 of the controller 12 may be a computer-readable medium, such as a powered temporary memory or any suitable computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives. Although the memory 26 is illustrated as being a part of the controller 12, in other embodiments, the memory 26 can be a part of another device and can be communicatively coupled to the controller 12. As user herein, two devices being "communicatively coupled" means that at least one of the devices is able to send data and/or commands directly and/or indirectly to the other device.

The controller 12 is communicatively coupled to the plurality of life detection sensors 30 and, in at least some embodiments, is communicatively coupled to the life detection sensors 30 via a wired communications bus 22. In at least one embodiment, the controller 12 can direct the life detection sensors 30 to capture sensor data through sending a sensor capture request to the life detection sensors 30 via the communications bus 22. In one embodiment, the sensor capture request (or other message sent from the controller 12) can specify certain sensor operating parameters. The sensor capture request can be provided as a part of an occupant detection scanning process in which the life detection sensors 30 are operated to capture sensor data pertaining to one or more interior vehicle locations, such as areas in which an occupant may be present (e.g., bus seats). In another embodiment, the life detection sensors 30 may be operated so as to continuously or repeatedly send sensor data without a capture request needed. Or, in addition to or in lieu of a capture request, the controller 12 can switch on operating power to the life detection sensors 30 when scanning is desired and switch the power back off once the scan is complete. The life detection sensors 30 can send the sensor data to the controller 12, which can include sampled sensor data or other information pertaining to the detection of an occupant (or lifeform), which will be discussed more below.

Also, according to various embodiments, the controller 12 is communicatively coupled to the ignition unit 14 of the vehicle via a wired connection (e.g., a direct connection, via a communications bus) or wirelessly. The ignition unit 14 is an ignition unit of the vehicle on which the vehicle occupant detection system 10 is installed. The ignition unit 14 can include circuitry that controls the ignition of the vehicle. The controller 12 can receive an indication that the ignition has been turned off and/or that the ignition has been turned on. In embodiments where the vehicle is an electric vehicle or hybrid vehicle, the controller 12 can be coupled to a primary propulsion control unit or a vehicle start system so that the controller 12 can receive an indication of a change in the primary propulsion of the vehicle or an indication that the vehicle has been started. In one embodiment, when it is detected that the vehicle has been started (e.g., detecting that the ignition has been started), the vehicle occupant detection system can be turned on or activated, which can include executing a self-test (described more below). When the vehicle occupant detection system is activated, the vehicle occupant detection system is in a state in which the system listens for an occupant detection scanning process initiation event (also referred to as a "scanning initiation event"). When a scanning initiation event is detected, the occupant detection scanning process can be carried out (or may be carried out after a predetermined amount of time (e.g., ten (10) minutes)). In one embodiment, the scanning initiation event is a mass-transit service change event, which is an event where the mass-transit vehicle is taken out of service or placed into service. In at least some embodiments, the scanning initiation event is a mass-transit service termination event where the mass-transit vehicle is placed out of service, and examples of a mass-transit service termination event include, for example, either or both of detecting when the ignition is turned off and/or when the vehicle enters a parking state (e.g., a parking brake is engaged). The parking state is a state in which the vehicle is in a parking transmission gear (e.g., the Park gear of PRNDL) or when a parking brake of the vehicle is engaged. Other types of mass-transit service termination events may be used, such as receiving an indication via the vehicle interface (e.g., a driver operating an HMI input device (e.g., a pushbutton or other HMI input device provided as a part of a driver interface that was originally manufactured as a part of the vehicle) that indicates the mass-transit vehicle is, or is to be placed, out of service) and/or determining the vehicle is at a particular location (e.g., a mass-transit parking facility), which can be carried out by or based on determining the presence of a particular wireless signal (e.g., a Wi-Fi™ signal having a predetermined or specified SSID), determining that the vehicle's GPS location is at or within a predetermined threshold distance of a predetermined location (e.g., a mass-transit parking facility), etc. In some embodiments, multiple conditions can be used to verify that the mass-transit vehicle has been placed out of service. For example, a two-condition verification used for verifying that the mass-transit vehicle has been placed out of service includes determining that the vehicle is at a predetermined location and determining that the vehicle's ignition has been turned off. Also, other types of scanning initiation event can be used, such as when a driver (or other user) presses a pushbutton or provides other input to command the system to start the occupant detection scanning process.

According to various embodiments, the controller 12 is communicatively coupled to the local warning system 18 and the remote warning system 20. The local warning system 18 can include any of a variety of local notification devices that notify an individual at or around the vehicle. Moreover, these local notifications can be either or both of interior vehicle notifications or exterior vehicle notifications. Interior vehicle notifications are those notifications presented within an interior cabin of the vehicle, or those that are directed to individuals within an interior cabin of the vehicle. Exterior vehicle notifications are those notifications presented outside the vehicle, or those that are directed to individuals located outside of the vehicle. Examples of local notification devices include audio speakers, vehicle horn(s), lights (e.g., light emitting diodes (LEDs), headlights, turn signals, cabin lights, other vehicle lights), and haptic sensors (e.g., haptic sensors installed in a driver's seat that cause vibrations when activated). In one embodiment, any one or more of the local notification devices can be those installed as a part of manufacturing of the vehicle or those installed as a part of the vehicle occupant detection system 10.

Figure 9:
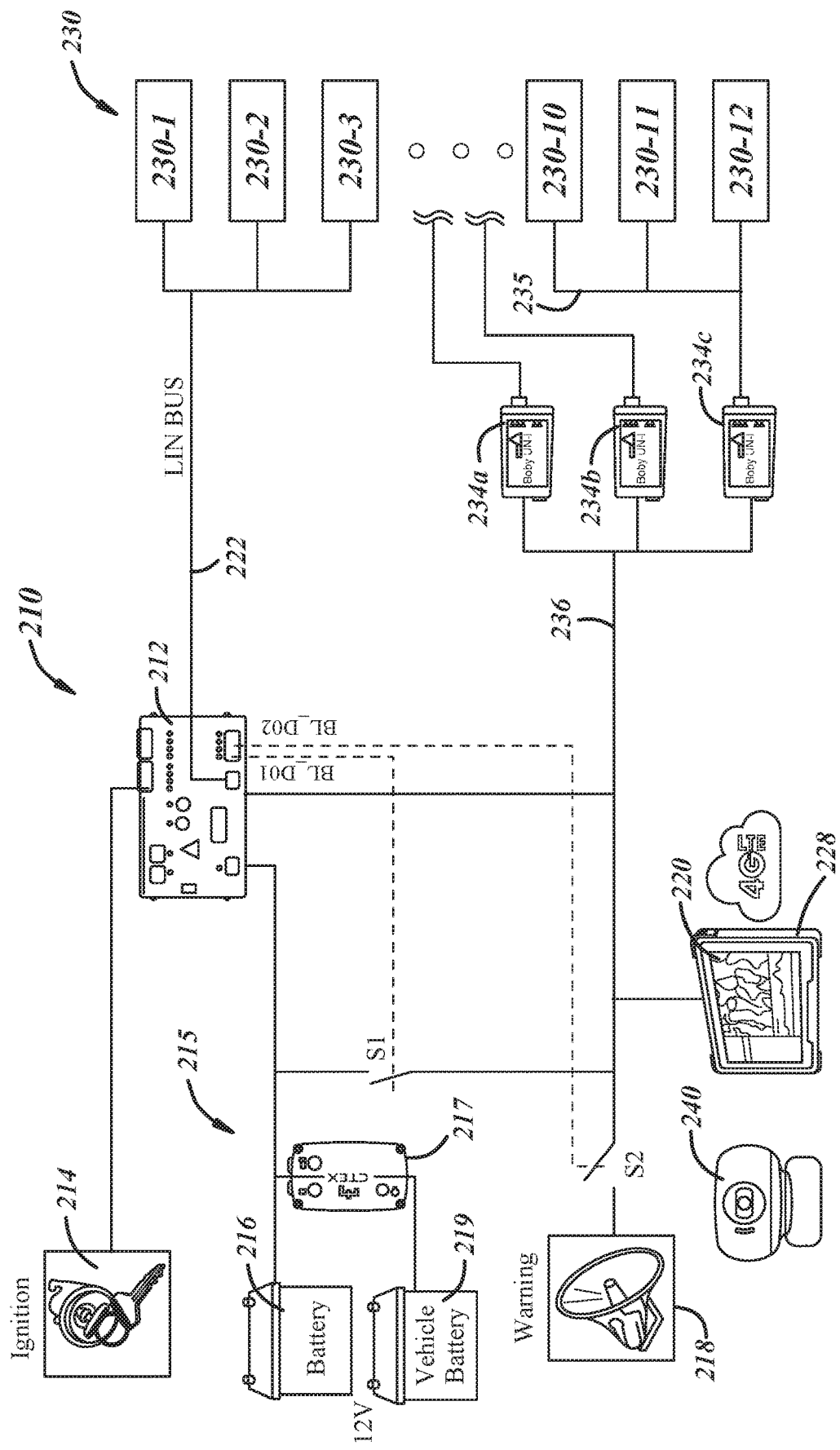
FIG. 9 is a block diagram depicting a second embodiment of a vehicle occupant detection system.

The vehicle occupant detection system 10 also includes a battery 16. The battery 16 provides electrical power to various components of the vehicle occupant detection system 10, including, for example, the controller 12, the life detection sensors 30, the local warning system 18, and the remote warning system 20. In one embodiment, the battery 16 can be a vehicle battery—e.g., a 12V battery that is included as a part of the vehicle electrical system. In other embodiments, such as the illustrated embodiment, the battery 16 can be a separate battery that is dedicated for the vehicle occupant detection system 10, which can be an after-market device/system that is installed on a vehicle. For example, FIG. 9 illustrates another exemplary embodiment of the vehicle occupant detection system in which a dedicated battery is provided for purposes of powering components of the vehicle occupant detection system including the controller and the life detection sensors.

The remote warning system 20 can include any of a variety of remote notification devices that notify an individual that is located remotely from the vehicle. An example of a remote notification device is a cellular chipset that can send messages over a cellular network to other devices, such as a cellular telephone (e.g., smartphone), a remote server, or other remote device. In one embodiment, the cellular chipset can be used to send a short message service (SMS) message and/or an email to one or more designated individuals, such as a fleet manager, which is discussed more below. Additionally or alternatively, the cellular chipset can be used to make a voice call to one or more designated individuals, such as the fleet manager. And, in another embodiment, the cellular chipset can be used to send information or data to a remote server, such as a backend vehicle occupant detection system server that provides remote (or cloud) functionality for the vehicle occupant detection system 10. Additionally or alternatively, a short-range wireless communications (SRWC) circuit or chipset can be used to provide the system 10 with SRWC capabilities, which can be used to send and/or receive messages between a remote user and the system 10. Various SRWC technologies can be used including Wi-Fi™ Bluetooth™ (including Bluetooth™ Low Energy), Zigbee™, Z-wave, other IEEE 802.11 techniques, other IEEE 802.15 techniques, infrared techniques, etc. For example, a Wi-Fi™ router can be provided at a bus depot and the system 10 can establish a Wi-Fi™ connection with the Wi-Fi™ router. In at least some embodiments, the Wi-Fi™ router can be connected to one or more devices, and can be used to connect the system 10 to the Internet or other network. As another example of a remote notification device, a two-way radio can be used. Circuitry for implementing the two-way radio can be installed as a part of the vehicle occupant detection system 10 and used to provide communications between the system 10 and one or more remote users. Various other remote notification devices and/or techniques can be used as will be appreciated by those skilled in the art.

The plurality of life detection sensors 30 can be used to detect an occupant (or lifeform) within a particular region of the vehicle. The vehicle occupant detection system 10 can include any number N of life detection sensors. Although the present embodiment 10 of the vehicle occupant detection system includes a plurality of life detection sensors, in other embodiments, a single life detection sensor can be used. In one embodiment, each of the life detection sensors 30-1 to 30-N can be an active sensor that includes a transmitter that emits electromagnetic signals toward a seating area (or other area in which an occupant may be located) within an associated life detection zone. One or more reflected electromagnetic signals are then received at a receiver of the life detection sensor 30-1 to 30-N, and these reflected signal(s) can be sampled and/or otherwise processed by the life detection sensor. In one embodiment, the life detection sensors 30-1 to 30-N are each a radar unit that uses microwave technology. The radar unit can be any of a variety of radar units and, in one embodiment, can include a plurality of antenna elements for transmitting the electromagnetic signals and/or a plurality of antenna elements for receiving reflected electromagnetic signal(s). In one particular example, the radar includes a 4×2 antenna array; however, other configurations, including those with a different number of antennas, can be used. In some embodiments, separate antennas can be used for transmitting and receiving; however, in other embodiments, a single antenna can be used for both transmitting and receiving. In another embodiment, acoustic signals can be transmitted and received. In yet another embodiment, a passive sensor for the life detection sensors can be used in which the life detection sensors do not transmit acoustic or electromagnetic waves, but receive signals (e.g., electromagnetic waves, acoustic waves), such as a camera or microphone.

At least in one embodiment, the life detection sensors 30-1 to 30-N each have a field of view defined by the shape and/or configuration of the antenna. Within this field of view, the sensor measures distances to objects and can use a proprietary algorithm to determine if there is motion from the breathing of a child (or other occupant) within its field of view, at least according to some embodiments. An example of a life detection sensor can be found in PCT Patent Application Publication No. WO2015/140333A1. In one particular embodiment, the life detection sensors 30-1 to 30-N are each calibrated to detect an occupant that meets certain predetermined attributes, and these predetermined attributes can be empirically derived. In one embodiment, these predetermined attributes can be configured so that when they are applied to the sensor data or otherwise used by the vehicle occupant detection system, the vehicle occupant detection system detects whether an occupant is present, such as a child. For example, certain predetermined attributes can be developed through empirical testing and used to detect an occupant that is a 3 year old or greater. Although certain individuals may vary in size, the predetermined attributes can be developed based on a 50-percentile human weight and/or height for a particular target age of occupant(s) to be detected. Various predetermined attributes can be developed to detect individuals of various types, sizes, positions, orientations, etc. and/or can be based on the particular vehicle in which the sensors are used. The target occupant that is to be detected (or attempted to be detected by the system 10) can be unique to a particular context in which the system 10 is used or intended on being used. In some embodiments, the predetermined attributes can also be used to detect animals other than humans that may be present within the vehicle. In at least one embodiment, the detection of these non-human animals can be treated the same as the detection of a human. Moreover, in some instances, the life detection sensors 30-1 to 30-N may not be configured to distinguish between humans and non-human animals; however, in other embodiments, the life detection sensors 30-1 to 30-N can be configured to distinguish between humans and non-human animals.

Figure 2:
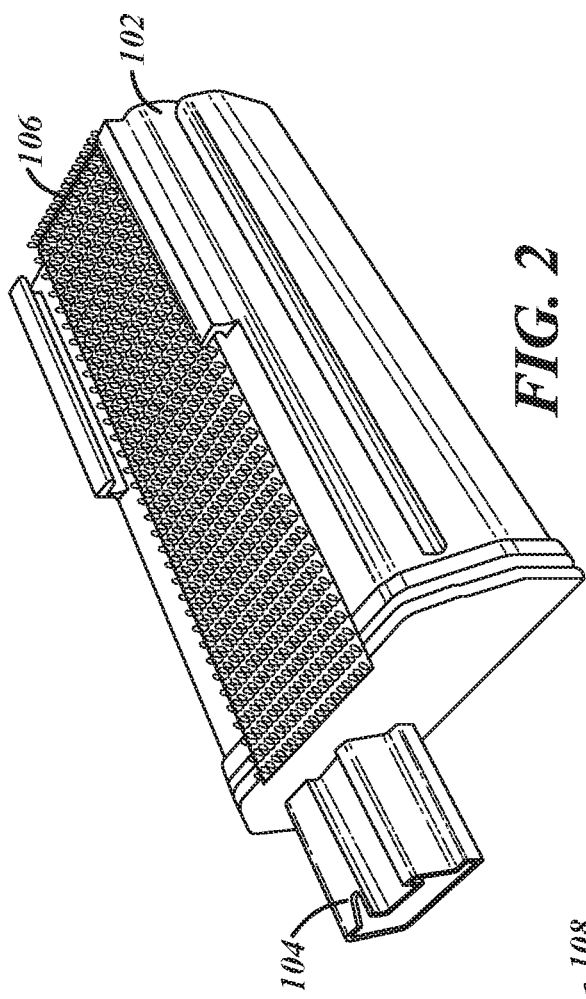
FIG. 2 is a perspective view of an embodiment of a life detection sensor that can be used as a part of a vehicle occupant detection system according to one embodiment.
Figure 3B:
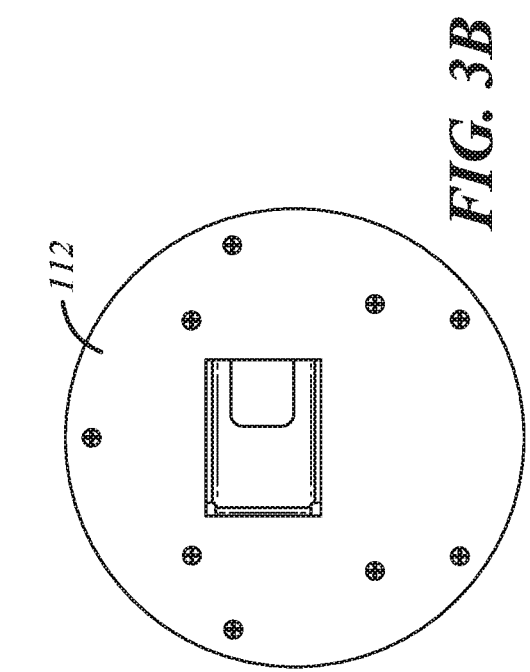
FIG. 3B is a plan view of a second portion of a mounting apparatus or cover that can be used to mount the life detection sensor of FIG. 2 to a vehicle.
Figure 3A:
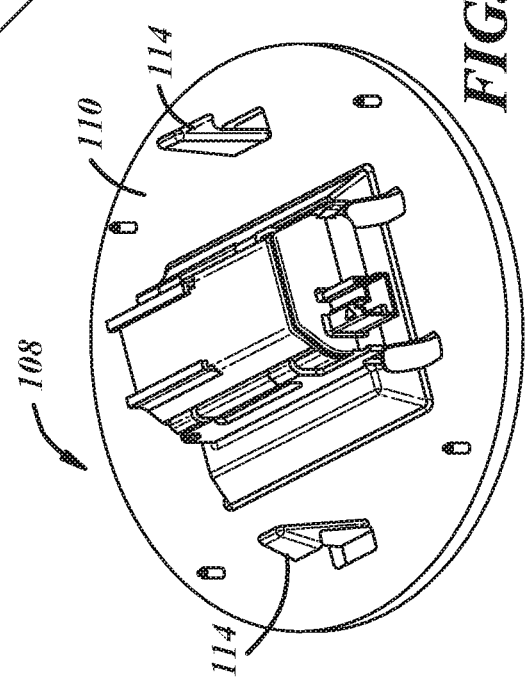
FIG. 3A is a perspective view of a first portion of a mounting apparatus or cover that can be used to mount the life detection sensor of FIG. 2 to a vehicle.

With reference to FIGS. 2 and 3A-3B, there is shown an embodiment of a life detection sensor that can be used with the system 10. The life detection sensors 30-1 to 30-N can each include a housing 102 (FIG. 2) that is configured to engage with a bracket 108 (FIGS. 3A-3B), which can then be mounted to the interior side of the ceiling of the vehicle, for example. Of course, other mounting locations can be used as well. The housing 102 can include a cable connector portion 104 that is used to connect to a communication cable, as well as a hook and loop fastener portion 106 that is used to hold (or aid in holding) the housing 102 to the bracket 108. The bracket 108 can include a first portion 110 to engage and hold the housing 102 of the sensor, and can include a second portion 112 that is attached (e.g., via screws, adhesives, or hook and loop fasteners) to the ceiling (or other portion) of the interior of the vehicle. The first portion 110 and the second portion 112 can include complementary locking portions 114 (only shown on the first portion 110) that can be used to hold the first portion 110 to the second portion 112, which thereby holds the sensor in place fixedly with respect to the ceiling (or other interior portion of the vehicle to which the second portion 112 is connected to).

Figure 4:
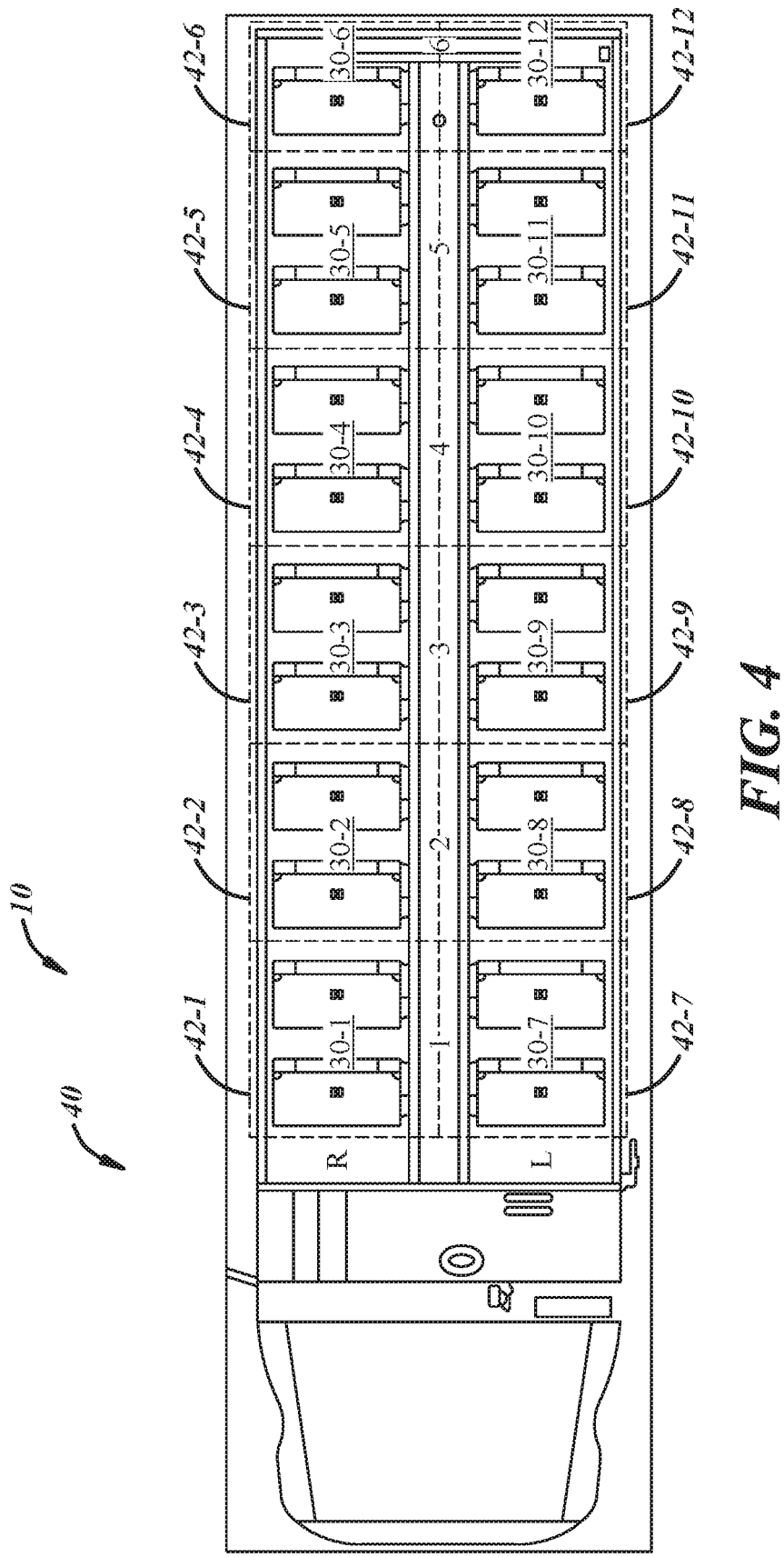
FIG. 4 is a plan view of an embodiment in which the vehicle occupant detection system of FIG. 1 is installed on a bus.

With reference to FIG. 4, there is shown an exemplary embodiment in which the vehicle occupant detection system 10 is installed on a bus 40. In the depicted embodiment, the vehicle occupant detection system 10 includes twelve (12) life detection sensors 30-1 to 30-12, each of which is associated with a single life detection zone 42-1 to 42-12. Although FIG. 4, the description thereof, and other subsequent descriptions below may refer to a particular number of life detection sensors (e.g., twelve (12) life detection sensors), any suitable number N of life detection sensors can be used. In the illustrated embodiment, a first life detection sensor 30-1 is installed in or on a ceiling of the bus cabin in the middle of the first life detection zone 42-1. The other life detection sensors 30-2 to 30-12 are installed in a likewise manner with respect to life detection zones 42-2 to 42-12. The life detection sensors 30-1 to 30-12 can be installed in other positions, and can be directed such that the field of view of sensor (or the "sensor field of view") covers a location corresponding to the life detection zones 42-1 to 42-12. The life detection zones can vary in size based on, for example, the sensor field of view or other properties of the vehicle occupant detection system 10 as implemented or configured for a particular application. Multiple different arrangements of sensors are possible to fit various implementation needs. In the illustrated embodiment, most of the life detection zones cover two bus bench seats. Each life detection sensor 30-1 to 30-12 can obtain sensor data that indicates whether (or a likelihood that) an occupant (or lifeform) is located within the associated life detection zone. As shown in FIG. 4, an occupant (or lifeform) has been detected in life detection zones 42-1 and 42-7 (indicated by the dark shading), and potentially in life detection zone 42-2 (indicated by light shading), but not in life detection zones 42-3 to 42-6 and 42-8 to 42-12 (indicated by medium shading). In one embodiment, the life detection sensors 30-1 to 30-12 can be arranged or positioned to ensure detection of breathing motion within the entire passenger compartment of the vehicle.

Figure 5:
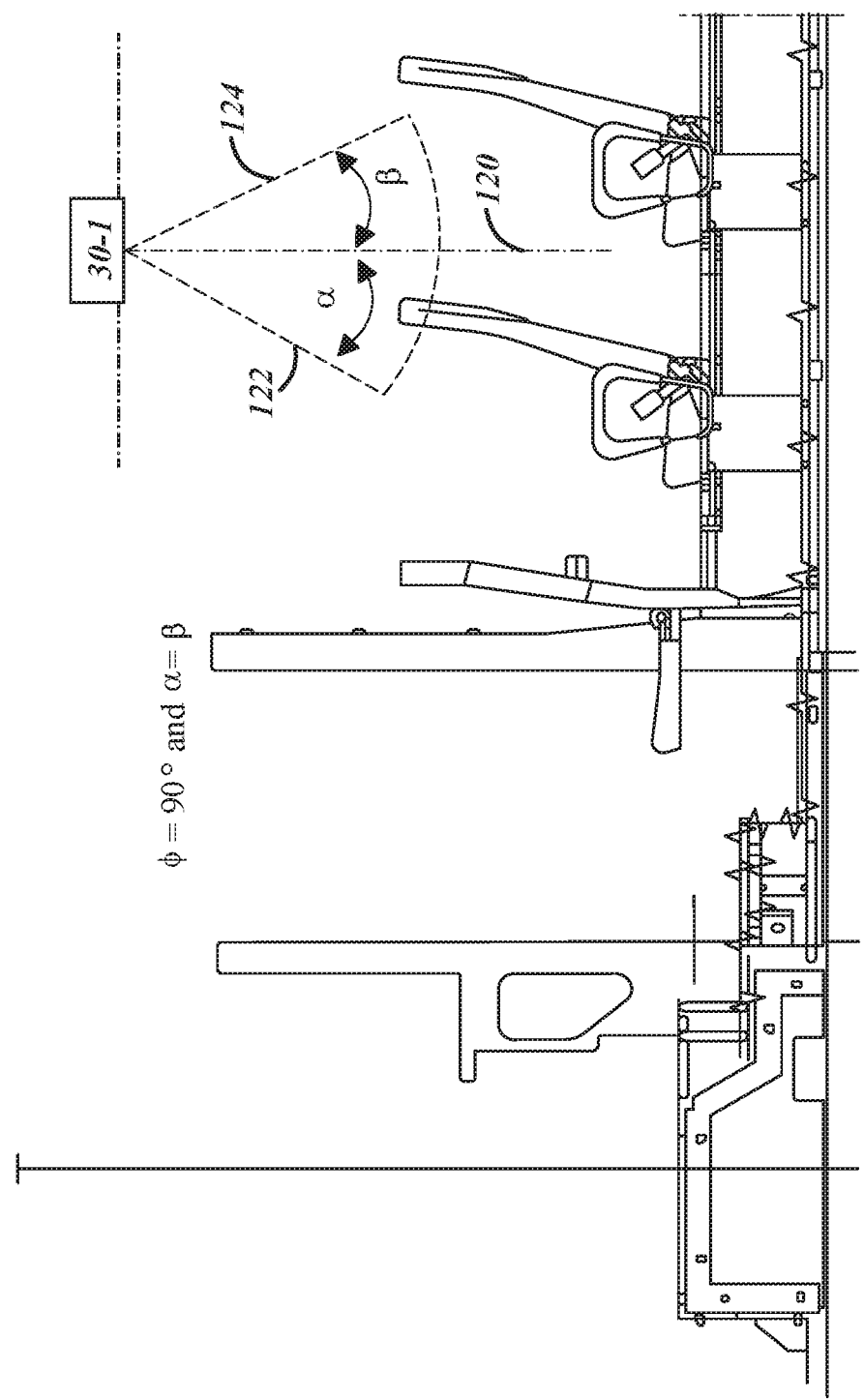
FIG. 5 is a side view cross-section of the bus of FIG. 4 that illustrates an extent of a field of view of a life detection sensor according to one embodiment.

The life detection sensors 30-1 to 30-12 can each be positioned to have their field of view encompassing two rows of seats (such as is shown in FIG. 4 of embodiments where the vehicle occupant detection system is installed on a bus). As shown in FIG. 5, each of the life detection sensors 30-1 to 30-12 include a field of view (and/or life detection zone) that is defined by a first angle $\alpha$ and a second angle $\beta$. The first angle $\alpha$ and the second angle $\beta$ can be defined as shown in FIG. 5, which illustrates a side view cross-section of the bus. A vertical reference line 120 is illustrated as extending straight down, and the first angle $\alpha$ is the angle between this vertical reference line 120 and a first field of view reference line 122 in which the field of view extends forward along the periphery (or outside) of the field of view. The second angle $\beta$ is the angle between this vertical reference line 120 and a second field of view reference line 124 in which the field of view extends backward along the periphery (or outside) of the field of view.

Figure 6:
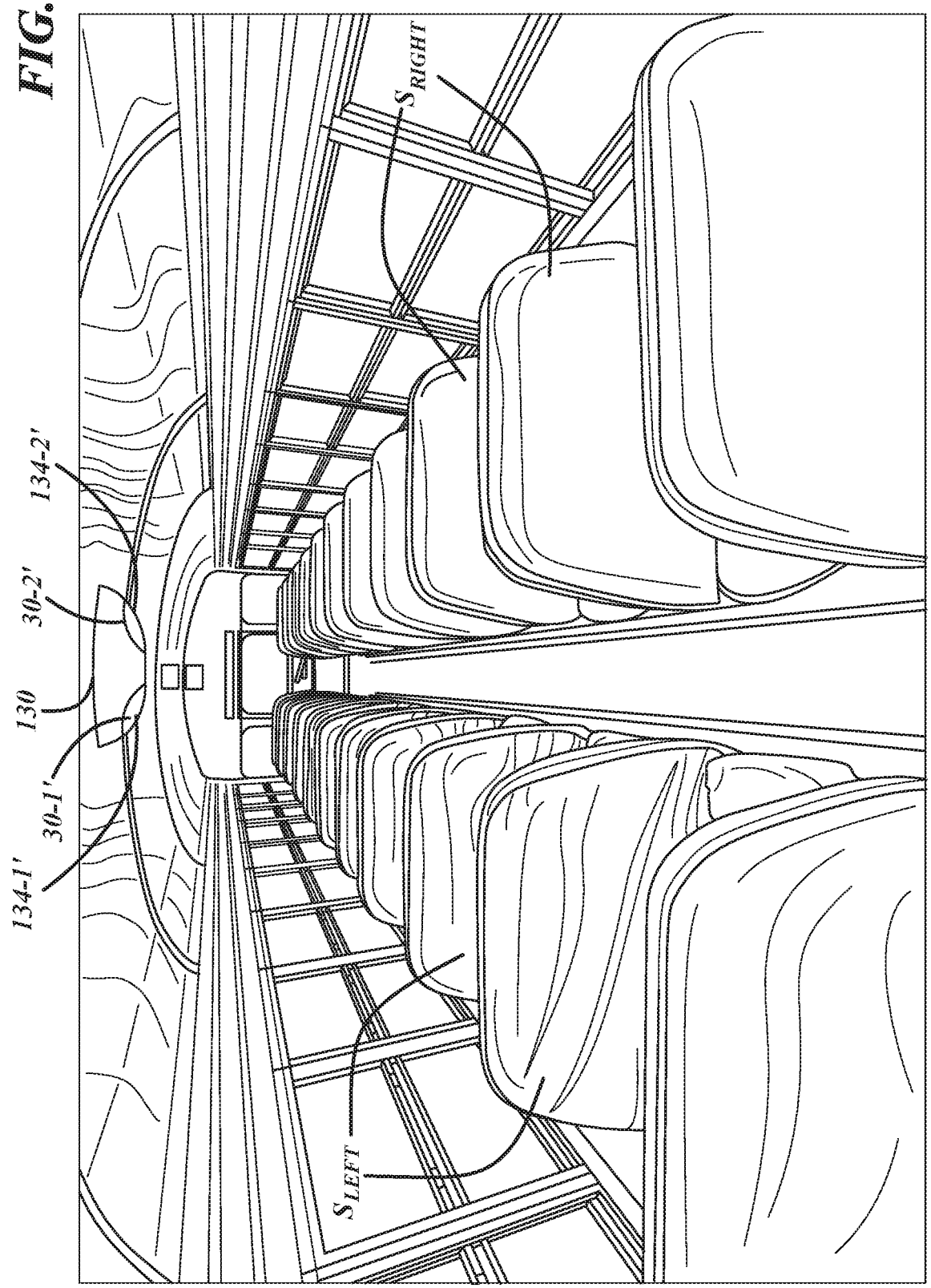
FIG. 6 is a perspective view of an interior cabin of a bus in which with two exemplary life detection sensors are installed together within a dual sensor bracket mounted to the ceiling of the interior cabin.

In some embodiments, the life detection sensors 30 can be mounted on the ceiling and in the center (or the aisle) of the bus, and can be positioned or angled so as to aim toward seats located on the right side or the left side. For example, with reference to FIG. 6, there is shown a front view of an interior cabin with two exemplary life detection sensors 30-1', 30-2' that are installed together within a dual sensor bracket 130. The first sensor 30-1' has a field of view directed to seats $S_{LEFT}$ on the left and the second sensor 30-2' has a field of view directed to seats $S_{RIGHT}$ on the right. Moreover, in at least one embodiment where a bus or other similar vehicle is used, each life detection sensor 30-1', 30-2' can cover (or have a field of view that includes) four (4) to six (6) benches or seats. The dual-sensor bracket 130 can include a housing 132 as well as two sensor view portions 134-1', 134-2', each of which provides an opening or transmissive portion through which signals (e.g., radio frequency signals) from the life detection sensors 30-1', 30-2' can be transmitted. The transmissive portion can be comprised of a material that does not interfere (or that negligibly interferes) with electromagnetic signals (or other signals) transmitted by the life detection sensors 30-1', 30-2' that are used as a part of the occupant detection scanning process. Various elastomers that are transmissive to radio frequency signals and/or other suitable electromagnetic wave frequencies used by the sensors are known to those skilled in the art.

Figure 7:
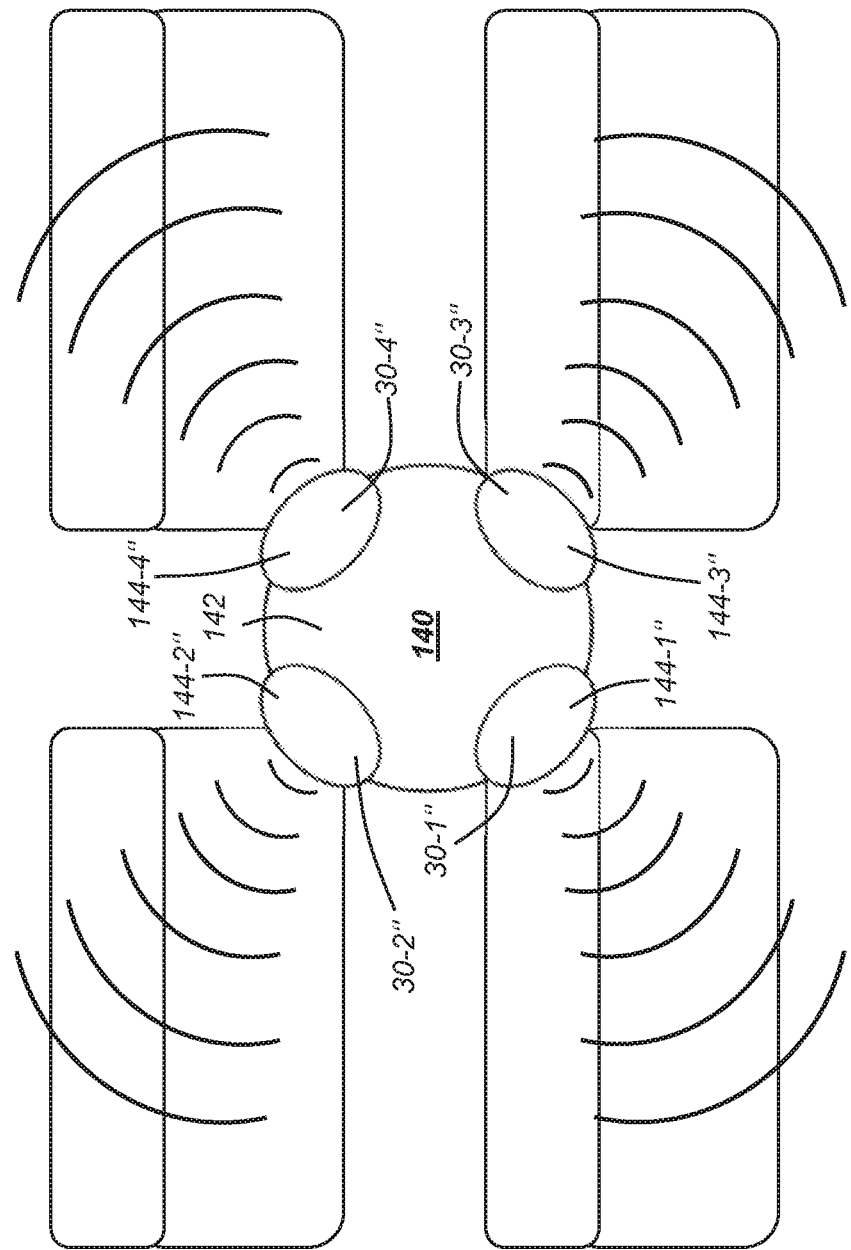
FIG. 7 is a plan view of a quad-sensor bracket that includes four exemplary life detection sensors that are mounted together.

As another example, as shown in the top-view illustration of FIG. 7, a quad-sensor bracket 140 can be used in which four (4) life detection sensors 30-1" to 30-4" are mounted together. It should be noted that the ceiling of the bus and the floor of the bus are not shown in FIG. 7. The quad-sensor bracket 140 can include a housing 142 as well as four sensor view portions 144-1" to 144-4", each of which provides an opening or transmissive portion through which signals from the life detection sensors 30-1" to 30-4" can be transmitted. The quad-sensor bracket 140 can be installed on the ceiling above the center aisle of the bus, for example. In some embodiments, such configuration can be used so that the sensor field of view of the four life detection sensors 30-1" to 30-4" in the quad-sensor bracket covers sixteen (16) or more benches or seats. Other life detection sensor configurations and brackets can be used as well, such as a six-sensor bracket, an eight-sensor bracket, etc.

Figure 8:
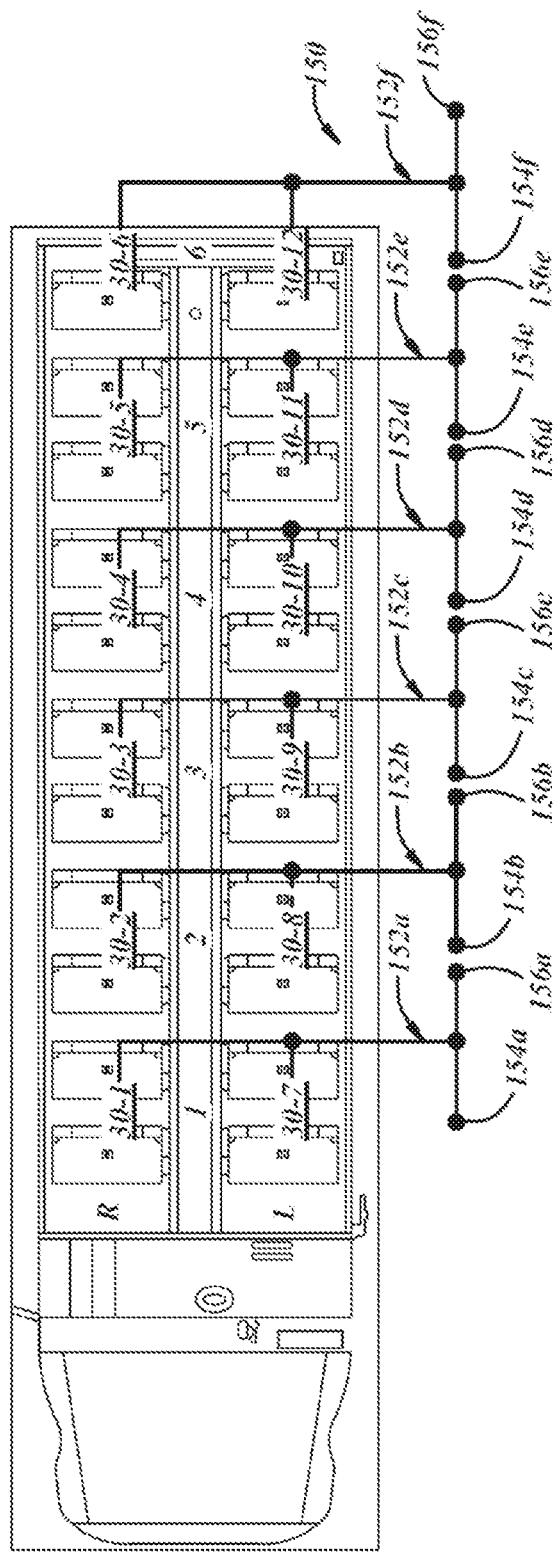
FIG. 8 depicts a schematic of a modular wire harness that can be used to connect the life detection sensors to a controller of the vehicle occupant detection system.

In one embodiment, the life detection sensors 30-1 to 30-12 can be connected by a modular wire harness 150, such as that which is shown in FIG. 8. The modular wire harness 150 can enable or allow scalable system size (e.g., number of sensors), which can depend on the size of the vehicle. For example, the modular wire harness 150 can include one or more segments, with each segment corresponding to one or more life detection sensors 30-1 to 30-12. For example, the first modular wire harness segment 152a corresponds to the life detections sensor 30-1 and the life detection sensor 30-7, the second modular wire harness segment 152b corresponds to the life detections sensor 30-2 and the life detection sensor 30-8, etc. Each modular wire harness segment 152a-f can include a first connector 154a-154f and a second connector 156a-156f. The first connector 154a-154f can engage the second connector of another adjacent modular wire harness segment 152. For example, the first connector 154b of the second modular wire harness segment 152b is a male connector that engages with the second connector 156a of the first modular wire harness segment 152a, which is a female connector that is complementary to the first connector 154b of the modular wire harness segment 152b. Other types of modular wire harnesses can be used as well.

In one embodiment, the life detection sensors 30-1 to 30-12 can each have and/or be associated with a unique identifier (ID) that is used for communications over the communications bus 22. Also, in one embodiment, each sensor 30-1 to 30-12 is configured to operate over a unique or designated frequency band so that interference between sensors is avoided or reduced. The following information can be communicated from the sensor when requested by the controller 12: seat (or life detection zone) occupancy (e.g., empty, occupied), sensor status (e.g., working properly, powered on, powered off), an R value (e.g., value(s) indicating motion and/or a degree of motion), breathing confidence (e.g., regularity of motion), supply voltage, and sensor temperature as observed at the sensor (which can include a digital thermometer or other temperature sensing means). In one embodiment, the sensor status, supply voltage, and/or a sensor temperature can be provided from each of the life detection sensors as a part of a self-test, which is discussed more below. Also, in one embodiment, the life detection sensors 30-1 to 30-12 can each include one or more light emitting diodes (LEDs), or other light source that can emit a light to indicate whether an occupant is detected. For example, in one embodiment, each life detection sensor 30-1 to 30-12 can have LED(s) that emits a red, yellow, and/or green light depending on whether an occupant was detected by that life detection sensor or in an associated life detection zone—of course, in other embodiments, other colors and indicators can be used. In one embodiment, the LED is integrated into the housing 102 (FIG. 2) of the life detection sensor and in a manner such that the LED (or the light emitted thereby) is visible to an individual within the vehicle. After scanning is carried out by the sensor, then an occupant scanning detection process result (also referred to as a "scan result") (e.g., whether an occupant is detected in the associated life detection zone) can be indicated by the LED(s)—for example, with reference to FIG. 4, the LED(s) of the life detection sensors 30-1 and 30-7 can emit a red light, the LED(s) of the life detection sensor 30-2 can emit a yellow light, and the LED(s) of the life detection sensors 30-3 to 30-6 and 30-8 to 30-12 can emit a green light. In other embodiments, only those sensors that detected any kind of life (or occupant) can emit a light—that is, for example with respect to the illustration of FIG. 4, only the LED(s) associated with the life detection sensors 30-1, 30-3, and 30-7 emit a light.

With reference to FIG. 9, there is shown another embodiment of a vehicle occupant detection system 210 that includes a controller 212 (that corresponds to controller 12 of vehicle occupant detection system 10), a battery 216 (that corresponds to battery 16), a local warning system 218 (that corresponds to local warning system 18), a remote warning system 220 (that corresponds to remote warning system 20), and a plurality of life detection sensors 230 (that corresponds to life detection sensors 30). Other components of FIG. 9 that include similar reference numerals to those of FIG. 1 denote like elements (e.g., ignition 214 is analogous or corresponds to ignition 14 of FIG. 1). The description of those like components will not be repeated here for the sake of brevity. It should be appreciated that any technically-feasible combination of the components of the vehicle occupant detection system 10 and the components of the vehicle occupant detection system 210 can be used according to various embodiments.

The vehicle occupant detection system 210 includes a battery system 215, which includes a dedicated battery 216 and a battery charger 217. The dedicated battery 216 is a battery that is provided as a part of the vehicle occupant detection system 210 specifically for purposes of providing this system 210 electrical power, as opposed to a vehicle battery that provides electrical power to many components of a vehicle and that is manufactured by the OEM. Thus, in at least one embodiment, the vehicle occupant detection system 210 is a separate, aftermarket system that is provided and installed separately from other portions of the vehicle that are installed by an OEM of the vehicle. In some embodiments, the vehicle occupant detection system 210 can be installed onto school busses that do not include means for detecting an occupant (or an occupant other than the driver). In such embodiments, the vehicle occupant detection system 210 can be retrofitted to the vehicle, and this can include connecting an electrical wire between electronics of the vehicle and electronics of the vehicle occupant detection system 210, such as through breaking an electrical wire of the vehicle electronics and then reconnecting this broken wire to itself and to a branching wire that provides an electrical path to the controller 212. The dedicated battery 216 can be any type of electrical battery that is suitable for providing electrical power to the components of the vehicle occupant detection system 210.

The battery charger 217 is a device that can be controlled to charge the dedicated battery 216 using an electrical power source, which is illustrated as a vehicle battery 219. The vehicle battery 219 can be a 12V battery that is typically used to power various electrical components of the vehicle. Other power sources instead of the vehicle battery 219 can be used as well to provide power to the dedicated battery 216. The controller 212 can control the battery charger 217, and can be used to electrically couple the dedicated battery 216 to the vehicle battery 219 or other electrical power source, such as an alternator, so as to charge the battery 216. The battery charger 217 can be powered when the dedicated battery 216 has a low state of charge (SoC) and/or when the vehicle is being driven and/or other receiving or generating electrical power.

The battery system 215 can also include one or more battery sensors, which can be implemented as a part of the controller 212 and/or the battery charger 217. In other embodiments, the battery sensor(s) can be integrated with another component of the vehicle occupant detection system 210, or the battery sensor(s) can be separate from these other components. The battery sensor(s) can measure or capture a variety of information pertaining to the state of the battery system 215, including various metrics of the dedicated battery 216. In one embodiment, a battery state of charge (SoC) sensor can be provided to measure the SoC of the dedicated battery 216. This SoC information can be sent to the controller 212 and/or the battery charger 217, which can then modify the operation of the battery charger 217 (e.g., whether to charge the dedicated battery or not) based on the SoC information. Also, in one embodiment, when the SoC of the dedicated battery is low, such as below a predetermined threshold value, then the vehicle occupant detection system 210 can notify the driver (or other user) using the local warning system 218 so that the driver (or other user) can take other actions to ensure that no occupants (e.g., children) are left on the vehicle at the end of the trip.

In the illustrated embodiment of the vehicle occupant detection system 210, the controller 212 is a BABY-LIN-RM-II module that is manufactured by LIPOWSKY INDUSTRIE-ELEKTRONIK. This controller 212 can perform certain processing, and can connect to a first subset of the life detection sensors using a LIN bus 222. A second set, a third set, and a fourth set of the life detection sensors can each be coupled to an adapter 234a-c, which is then connected to the controller 212 via a USB connection 236 shown in red. The particular controller 212 illustrated in FIG. 9 is only capable of carrying out LIN communications with three (3) sensors 30-1 to 30-3 of the first set. The adapters 234a-c, which are BABY-LIN-II modules that are manufactured by LIPOWSKY INDUSTRIE- ELEKTRONIK, are used to convert communications sent over the LIN bus 235 to a USB protocol so that the controller 212 can communicate with the second, third, and fourth sets of sensors. For example, as shown in FIG. 9, the third adapter 234c connects to the fourth set of life detection sensors 30-10 to 30-12 using a LIN connection 235. The third adapter 234c then connects to the controller 212 via the USB connection 236. The first adapter 234a and the second adapter 234b are also used in a similar or the same way to connect the second and third sets of the life detection sensors 30-4 to 30-6 and 30-7 to 30-9 (respectively) to the controller 212, although this is not explicitly shown in FIG. 9. Although the vehicle occupant detection system 210 uses particular modules and a particular configuration, other embodiments can employ various different communication architectures, modules, devices, configurations, etc., as the vehicle occupant detection system 210 is but one embodiment.

The camera 240 can be any electronic digital camera that is suitable for capturing images or video, and for providing such image/video information to the controller 212. The camera 240 may include a memory device and a processing device to store and/or process data that it captures, and can be any suitable camera type (e.g., charge coupled device (CCD), complementary metal oxide semiconductor (CMOS), etc.) with any suitable lens. Although only a single camera 240 is shown and described herein, any number of cameras can be used with the system 210, including one or more exterior-facing cameras and/or interior-facing cameras. In one embodiment, the camera 240 can be mounted so as to face a passenger area or location in which one or more occupants may reside (or typically resides) while riding in the vehicle. In another embodiment, a plurality of cameras can be mounted and each can face a passenger area location in which one or more occupants may reside while in the vehicle. In one embodiment, one or more cameras can be positioned so as to face one or more life detection zones or a driver seating location. For example, according to some embodiments, the camera 240 can be used to detect a driver departure indication, which indicates that the driver has departed the vehicle.

Also, in some embodiments, the camera 240 can be used to provide a video or images to a user, such as a remote user (e.g., a fleet manager, an EMS operator). These videos and/or images can include a view of within a vehicle cabin ("interior cabin picture or video"), and can be sent using the cellular chipset 228 to the fleet manager or other user. The remote user can then view the video and/or images using an electronic display device. In one embodiment, video is captured by the camera 240 and continuously streamed to the remote user and displayed for this remote user in a live or real-time manner so that the remote user can observe the interior of the vehicle cabin in real-time. In one embodiment, video and/or images that are captured using the camera 240 can be stored in a log file and/or sent from the system 210 to a remote server, which can then log and/or store the video and/or images. Also, in at least one embodiment, the system 210 can employ object recognition techniques so that occupants can automatically be identified. Thus, according to some embodiments, the system 210 can use the camera 240 to verify, confirm, or otherwise assess the scan results of the occupant detection scanning process that are produced by the life detection sensors 30-1 to 30-12, and/or to verify, confirm, or otherwise assess a driver departure indication, as mentioned above.

Figure 10:
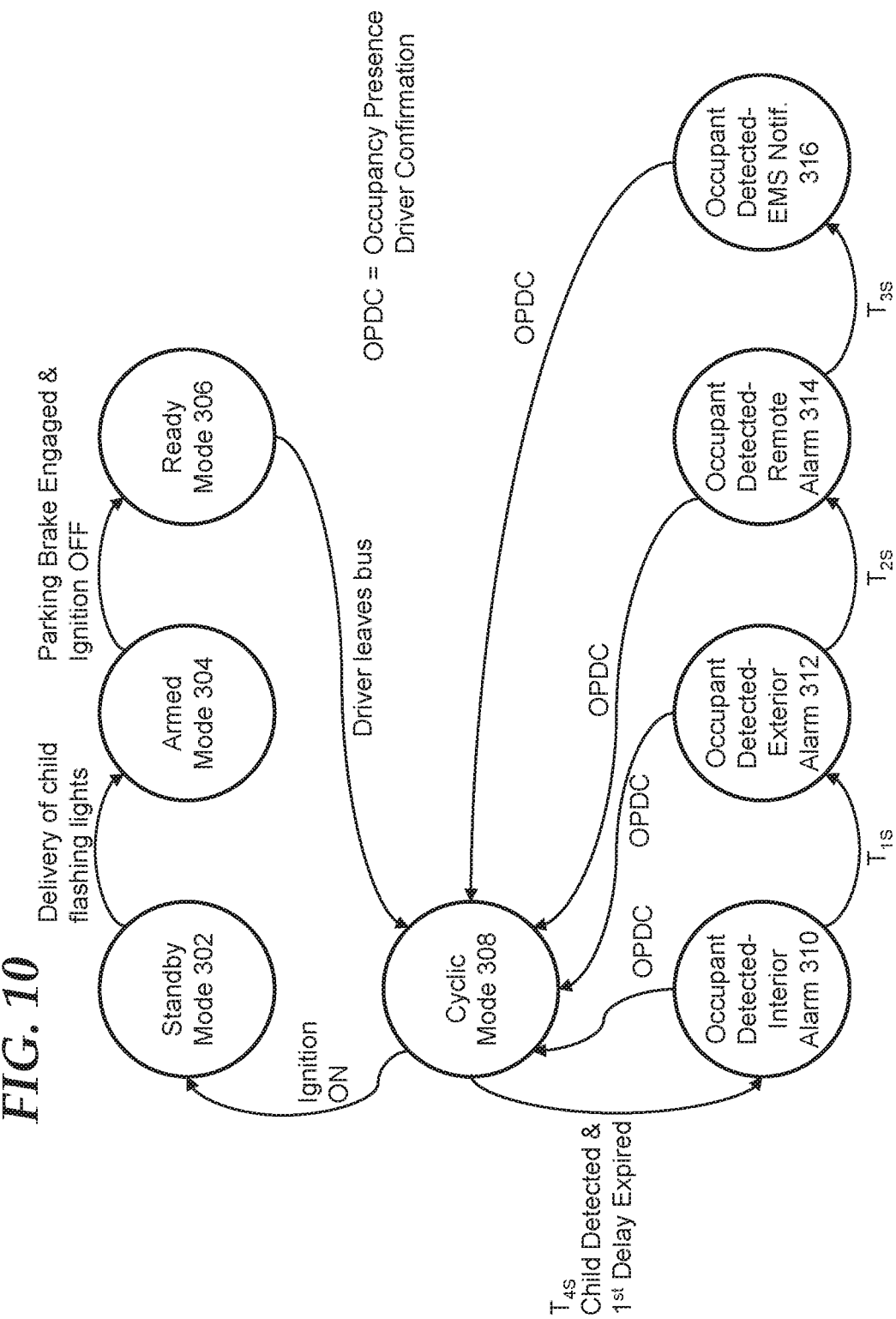
FIG. 10 is a state diagram of illustrating operation (or states) of the vehicle occupant detection system according to one embodiment.
Figure 17:
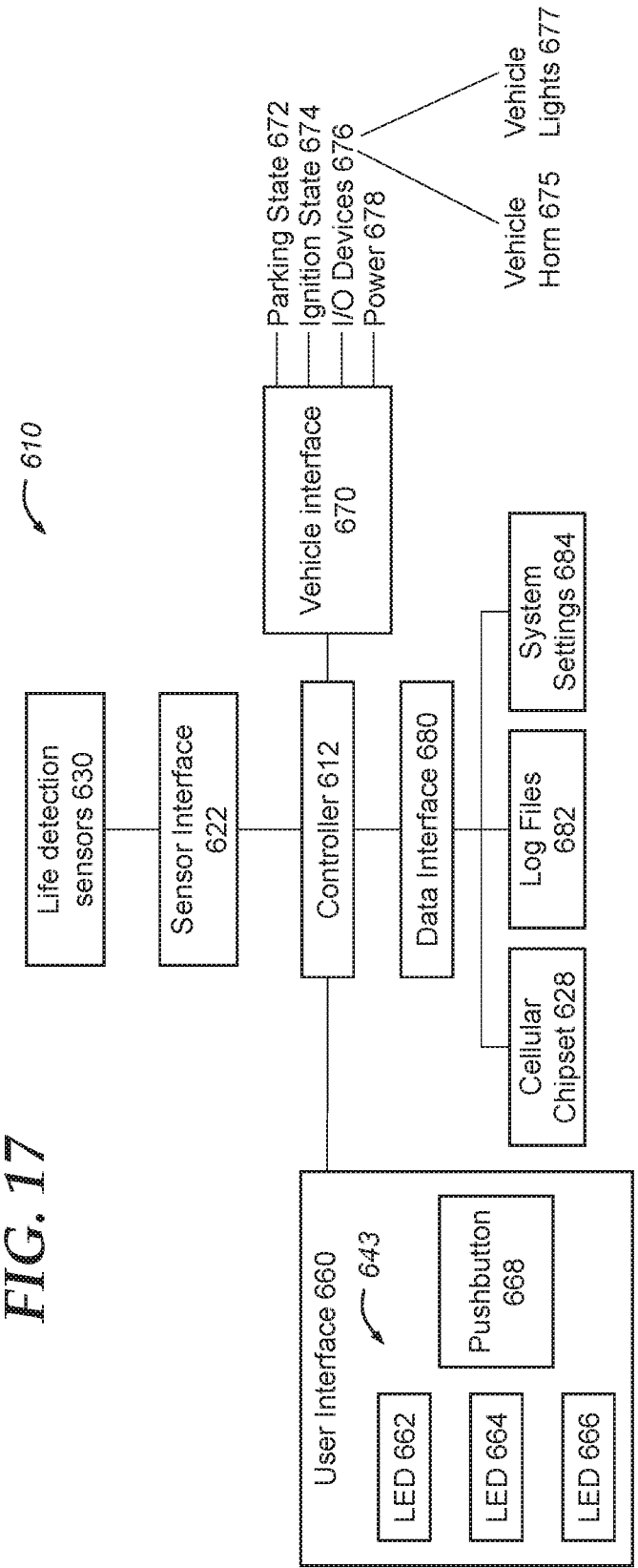
FIG. 17 is a block diagram depicting a fourth embodiment of a vehicle occupant detection system.

With reference to FIG. 10, there is shown an overview of the operation (or states) of the vehicle occupant detection system. Although the discussion below is discussed with respect to the system 210, this operation applies equally to other embodiments of the vehicle occupant detection system, including the vehicle occupant detection system 10 (FIG. 1), the vehicle occupant detection system 410 (FIG. 12), and the vehicle occupant detection system 610 (FIG. 17). When the ignition is turned on, the system 210 enters a standby mode 302. During the standby mode 302 and/or after the ignition is turned on, the battery charger 217 can be placed into a charge mode in which the dedicated battery 216 is charged, and/or the system 210 can run a self-test to ensure sensors are working properly, for example.

Then, when the vehicle receives an indication of a potential occupant departure/arrival, the system will enter armed mode 304. This indication can be, for example, an indication that emergency flashers (or other lights/notification devices) of the vehicle are activated, which are typically done so by the driver when the driver stops the bus to pick up or drop off an occupant in the case that the vehicle is a school bus. Of course, other predetermined events or indicators can be defined and used to provide an indication of a potential occupant departure/arrival or to otherwise enter the armed mode 304. When the system 210 is armed or in the armed mode 304, and then the vehicle is placed into a parking state and/or the ignition is turned off (or upon the occurrence of another mass-transit service termination event), the system 10 moves into a ready state 306. The ready state is a state of the system in which the system is ready to search for occupants, which can take place in response to a scanning initiation event, which can be detected by the controller 212, for example. In the illustrated embodiment, the scanning initiation event is an event in which the driver leaves the bus, which can be detected using a life detection sensor with a life detection zone containing a driver seat or operating location, pressure sensor in a driver seat, seatbelt or buckle sensor in the driver's seat or a passenger's seat, a door sensor that indicates when the door is opened or closed, the camera 240 (e.g., using object recognition techniques), and/or other mechanisms, some of which are listed below. When the system 210 enters the ready state 306, the system 210 can start listening for a driver departure indication, which is an indication that the driver has left or departed the vehicle. According to various embodiments, several strategies can be used to detect a driver departure indication (or detect that the driver has left the bus), including the following:

1. determining that the ignition is off for a predetermined amount of time (or T seconds);
2. in embodiments where the driver seat is equipped with a driver presence detection sensor (e.g., a pressure sensor embedded in the driver seat) and associated logic: determining that the driver seat is empty AND that a predetermined amount of time (or T seconds) has passed;
3. when the bus is parked, the life detection sensors 230 are used to track the driver position and detect when he/she leaves the bus, and then the search is initiated a predetermined amount of time (or T seconds) after driver has left;
4. in embodiments where the vehicle is operated by a smart key (e.g., a key that is connected to the controller 212, such as through using Bluetooth™ and associated circuitry at the system 210) that is paired to the system 210, detecting that the key is not present; and/or
5. receiving a manual occupant detection scanning process command (or "manual start command" for short) to start the search, such as by the driver pressing a button or operating another human-machine interface used to provide input into the system 210.

In some embodiments, after a predetermined amount of time (or T seconds) has passed since receiving the scanning initiation event, the system will enter a cyclic search mode 308. In embodiments and/or scenarios where a manual start command is provided, then the system 210 can immediately begin the occupant detection scanning process without waiting a predetermined amount of time.

In the cyclic search mode 308, the life detection sensors 30-1 to 30-12 are used to determine whether an occupant is present and/or other information pertaining to the life detection zones. When a child or other occupant is detected (as indicated at 310), an interior alarm can be activated. The interior alarm can be provided by a human-machine interface (HMI) output device that is a part of the local warning system 218 and that is directed to providing notifications to an interior cabin or area of the vehicle. The driver (or other operator) can then confirm that there is not an occupant within the vehicle via use of one or more human-machine interfaces, such as a microphone, pushbutton, etc. This confirmation is referred to as an occupancy presence confirmation, which is a confirmation by the driver or other designated individual that the occupant detection result of the scanning process is correct or at least that the driver or other designated individual ("primary operator") is aware of the result of the scanning process. This confirmation is also an occupancy presence driver confirmation, which is an occupancy presence confirmation directed to a driver of the vehicle.

If the driver (or other operator) confirms that there is not an occupant within the vehicle, the driver can indicate this to the system 210 (e.g., using one or more of the human-machine interfaces) and then the interior alarm can be deactivated. After a predetermined amount of time has passed (denoted as $T_{1S}$) and the driver (or other operator) has not confirmed that there is not an occupant within the vehicle, an exterior alarm can be activated (as indicated at 312). The exterior alarm is provided by an exterior alarm device which can be an output device that is a part of the local warning system 218 and that is directed to providing notifications to an area external from the vehicle, such as to an outside area surrounding the vehicle. This exterior alarm device can be flashing red lights (or brake lights/turn signals) and/or cyclic or repeated activation of a vehicle horn or other audio device. The driver (or other operator) can provide an occupancy presence driver confirmation via use of one or more human-machine interface (HMI) input devices that confirms that there is not an occupant within the vehicle and, if this occupancy presence driver confirmation is provided, the exterior alarm (and/or interior alarm if still activated) is/are deactivated.

In some embodiments, after search complete, the driver can perform a visual check by walking to the back of the bus. In some embodiments, a pushbutton (e.g., that is separate from the driver interface) can be provided at a back portion of an interior cabin of the bus (or other vehicle), and this button can be used to provide a confirmation that the driver (or other user) has confirmed that no occupants (other than themselves) are on the vehicle. This button can be communicatively coupled to the controller 212 (e.g., via a USB connection, a LIN connection, a CAN connection, wirelessly). This button at the back of the bus is an HMI input device that enables the driver (or other operator) to provide an occupancy presence driver confirmation.

After a second predetermined amount of time (denoted as $T_{2S}$) has passed since the system entered state 312, a message can be sent to a fleet manager (or other designated individual) using the remote warning system 220, for example (as indicated at 314). This message can be an SMS (short message service) message or email. Other notifications and remote communication technologies can be used as well. The driver (or other operator) can confirm via use of one or more human-machine interfaces that there is not an occupant within the vehicle and, if so, the exterior alarm (and/or interior alarm if still activated) is/are deactivated.

Figure 12:
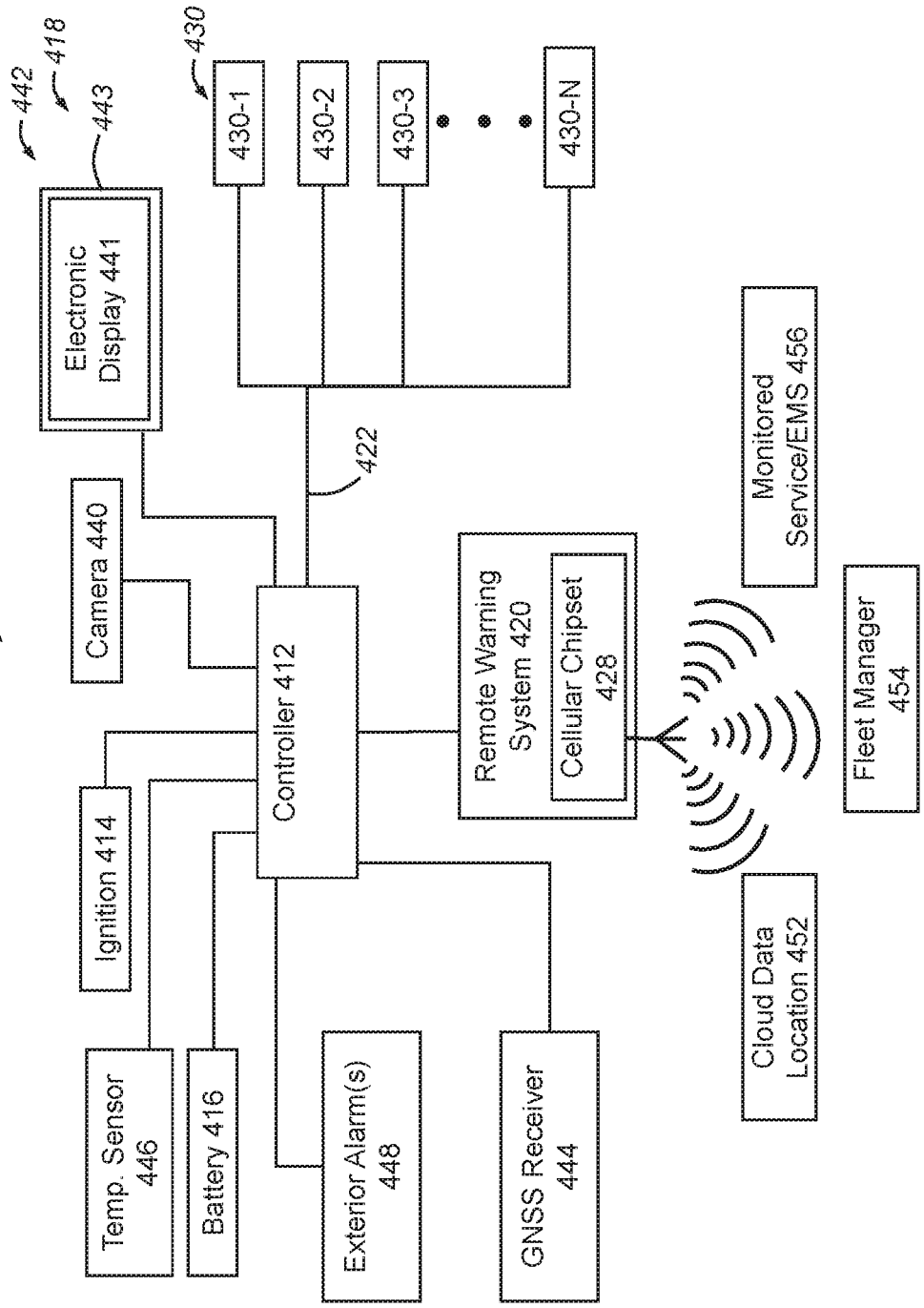
FIG. 12 is a block diagram depicting a third embodiment of a vehicle occupant detection system.

After a third predetermined amount of time (denoted as $T_{3S}$) has passed since the system entered state 314, emergency services or another monitoring service can be contacted, and an emergency medical services (EMS) notification can be provided as indicated at 316. As shown in the exemplary EMS notification of FIG. 11, the EMS notification can include a VIN (or other unique identifier) of the vehicle, a geographic location (e.g., a GPS location) of the vehicle, a time of the event (or detection process), a date of the event (or detection process), a temperature of the vehicle, a message body, an interior cabin picture or video, and an occupant location indicator (e.g., a graphical representation of the location of one or more detected occupants, an identifier of a life detection zone in which an occupant was detected). The geographic location can be a location that is determined using any of a variety of location services, such as triangulation techniques implemented by a cellular network and/or the cellular chipset 228. Additionally, or alternatively, the geographic location can be a global navigation satellite system (GNSS) location (e.g., a GPS location), which can be determined by a GNSS receiver that is provided as a part of the vehicle occupant detection system, such as the GNSS receiver 444 of the vehicle occupant detection system 410 (FIG. 12). The temperature of the vehicle can be determined by a temperature sensor, which can be included as a part of some embodiments of the vehicle occupant detection system, such as the temperature sensor 446 of the vehicle occupant detection system 410 (FIG. 12) discussed below. The occupant location indicator can be a graphical representation of the location of one or more detected occupants, such as a top view of the vehicle that includes providing an indicator for the life detection zone(s) to indicate that an occupant was detected (or not detected) within that life detection zone. The time of the event can be determined using an electronic clock of the vehicle, or that is provided separately with the vehicle occupant detection system. In one embodiment, a GNSS receiver can be used to obtain a present time based on receiving GNSS signal(s). The progression of states 310-316 is one embodiment of an alarm escalation process.

With reference to FIG. 12, there is shown a third embodiment of a vehicle occupant detection system 410. The vehicle occupant detection system 410 includes a controller 412, an interface to the vehicle ignition (referred to herein as a "vehicle ignition interface") 414, a battery 416, a local warning system 418, a remote warning system 420 (including cellular chipset 428), a communications bus 422, a plurality of life detection sensors 430, a camera 440, a global navigation satellite system (GNSS) receiver 444, and a temperature sensor 446, and one or more exterior alarm devices 448 (which can be a part of the local warning system 418). The local warning system 418 includes an interior alarm device 442 that comprises a driver interface 443 which may be implemented using an electronic display device 441 that presents a graphical user interface (GUI) for interior alarms and other notifications to the driver, as well as to receive driver input. The components of FIG. 12 that include similar reference numerals to those of FIGS. 1 and/or 9 denote like elements. The description of those like components will not be repeated here for the sake of brevity. For example, controller 412 is analogous or corresponds to the controller 12 of the vehicle occupant detection system 10 (FIG. 1), and the plurality of life detection sensors 430 are analogous or corresponds to the plurality of life detection sensors 30 of the vehicle occupant detection system 10 (FIG. 1). It should be appreciated that any technically-feasible combination of the components of the vehicle occupant detection system 10, the components of the vehicle occupant detection system 210, and/or the vehicle occupant detection system 410 can be used according to various embodiments.

The battery 416 represents a battery that is used to provide electrical power to the controller, and potentially as well as to other components of the vehicle occupant detection system 410. The battery 416 can be a vehicle battery—e.g., a 12 V battery that is included as a part of the vehicle electrical system, and/or can be a separate battery that is dedicated for the vehicle occupant detection system 410, such as battery 216 of the vehicle occupant detection system 210.

The GNSS receiver 444 can be used to provide geographical coordinates of the vehicle occupant detection system 410. According to at least some embodiments, the GNSS receiver 444 receives a plurality of GNSS signals from a plurality of GNSS satellites, which are then used to derive or otherwise obtain a GNSS location, which can be represented as geographical coordinates. The geographical coordinates can specify latitudinal, longitudinal, and/or elevation information. The GNSS receiver can be configured to comply with regulations or other requirements of a particular location in which the vehicle occupant detection system 410 is to be used or is anticipated as being used. Also, various GNSS systems use different names, such as global positioning system (GPS) in the United States and Galileo in Europe. The GNSS data obtained or derived from the GNSS signals can also be used to inform the system 410 of the current time, at least in some embodiments.

The temperature sensor 446 is a digital thermometer or other device that can measure a temperature of the vehicle occupant detection system 410 or the surrounding area, and that can report the temperature to the controller 412 in an electronic format. In one embodiment, the temperature sensor 446 can be used to detect an ambient temperature of a vehicle cabin, such as a passenger compartment. The detected temperature can be sent to a remote user, and/or can be used to assess the severity of leaving an individual (or other lifeform) within the vehicle. In some embodiments, multiple temperature sensors 446 can be used.

The vehicle occupant detection system 410 can also include a remote warning system 420, which is analogous to the remote warning system 20 of the vehicle occupant detection system 10 (FIG. 1) and the remote warning system 220 of the vehicle occupant detection system 210 (FIG. 9). In particular, the remote warning system 420 can include a cellular chipset 428, which can be used to communicate with one or more remote systems 452-456. In one embodiment, a cellular voice call can be placed over the cellular chipset 428 to a remote system/device. Additionally or alternatively, the cellular chipset 428 can be used to send one or more notifications or other electronic messages to one or more remote systems/devices. For example, the controller 412 can collect data concerning the operation and/or status of the vehicle occupant detection system 410, which can then be reported via the cellular chipset 428 to a backend server that stores records or logs of the system 410 (and/or other instances of the system 410), as indicated at 452. In another example, the controller 412 can generate and send a message to a fleet manager concerning the detection of one or more occupants on the vehicle, as well as other information (e.g., status information), as indicated at 454. And, in yet another example, the controller 412 can prepare and send a notification or other message to an EMS system as indicated at 456. Although not depicted in FIG. 12, the cellular chipset 428 can send messages to these one or more remote systems 452-456 using a cellular carrier network, which can provide remote connectivity such as through the Internet.

The vehicle occupant detection system 410 can also include a local warning system 418, which is analogous to the local warning system 18 of the vehicle occupant detection system 10 (FIG. 1) and the local warning system 218 of the vehicle occupant detection system 210 (FIG. 9). The local warning system 418 includes one or more interior alarm devices 442 (e.g., the driver interface 443 with its electronic display device 441) and one or more exterior alarm devices 448 (e.g., vehicle horn, exterior lights). The electronic display device 441 and the driver interface 443 are discussed in more detail below. The one or more interior alarm devices 442 can include any devices, components, or modules that can provide an interior vehicle notification, which are those notifications presented within an interior cabin of the vehicle, or those that are directed to individuals within an interior cabin of the vehicle. As illustrated in FIG. 12, the interior alarm device(s) 442 can include the electronic display device 441. Other examples of interior alarm devices are discussed above, and include lights associated with the life detection sensors 430 and speakers within the vehicle cabin. The one or more exterior alarm devices 448 can include any devices, components, or modules that can provide an exterior vehicle notification, which are those notifications presented outside the vehicle, or those that are directed to individuals located outside of the vehicle.

In this embodiment, the driver interface 443 comprises an HMI output device in the form of an electronic display device 441 that is a part of the local warning system 418. Driver interface 443 presents a graphical user interface (GUI) on the electronic display device 441. The electronic display device 441 can be any suitable display screen device for presenting graphics and, in one embodiment, can include at least one HMI input device to provide user input capabilities, which can be in the form of touch-screen capabilities or separate pushbuttons, knobs, dials, etc. that are coupled to the electronic display device or otherwise coupled to the controller 412. In one embodiment, the electronic display device 441 can be integrated into one or more components of the vehicle, such as a center console. Or, in another embodiment, the electronic display device 441 can be a separate device (or provided as a part of a separate device), such as a tablet, smartphone, other handheld computer, etc. In such embodiments where the electronic display device 441 is provided separately and not hardwired to the vehicle occupant detection system 410 (e.g., to the controller 412), the electronic display device 441 (or other device containing the electronic display device 441) can communicate wirelessly with the vehicle occupant detection system 410, such as through the use of short-range wireless communications, such as Bluetooth™ or Wi-Fi™, and/or through the user of long-range wireless communications, such as cellular communications. In such embodiments, the electronic display device 441 (or other device containing the electronic display device 441) can include suitable circuitry needed to carry out such wireless communications. Alternatively, or additionally, the electronic display device 441 (or other device containing the electronic display device 441) can be connected to the system 410 using a wired connection, such as a communications bus connection or a USB connection.

Figure 13:
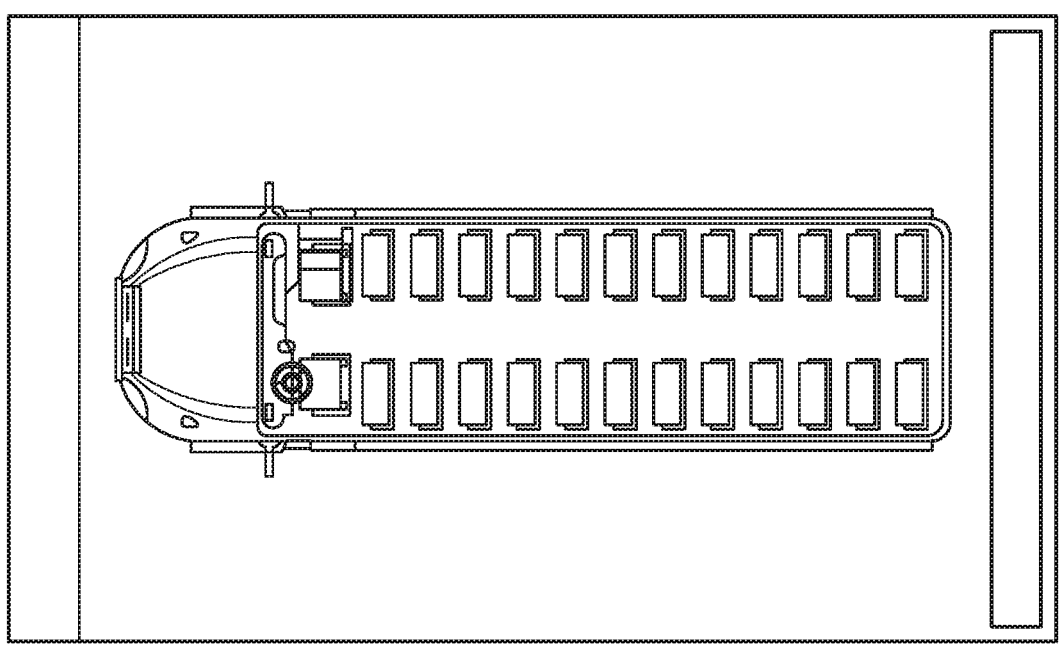
FIG. 13 depicts an occupant detection scanning process start screen that may be used as a part of an interface of the vehicle occupant detection system.

With reference to FIGS. 13-16, there are shown various different screens or graphics that can be presented via the GUI of the electronic display device 441 of the driver interface 443. With reference to FIG. 13, there is shown an occupant detection scanning process start screen (also referred to herein as "start screen") 500 that can be part of the GUI of the driver interface 443. The graphic presented on the start screen 500 depicts a top-view (or overview) of the vehicle as well as the various seats within the vehicle— in this example, the vehicle is a bus, although other vehicles can be used as well. The graphic can be selected or configured to resemble the layout of the vehicle on which the vehicle occupant detection system 410 is installed. In one embodiment, the electronic display device 441 can be in a low power state or off state prior to initiating an occupant detection scanning process in which the vehicle occupant detection system 410 uses the plurality of sensors 430 for detecting the presence or absence of occupants (or life) on the vehicle.

The start screen 500 on the driver interface 443 can be activated in response to (or after) an occupant detection scanning process initiation signal (or "scanning initiation signal" for short), which can indicate that a scanning initiation event, such as a mass-transit service termination event, has been detected. For example, in one embodiment, the driver (or other operator) can press a pushbutton (not shown) that is coupled to the controller 412, which indicates to begin the occupant detection scanning process. In another example, a graphical button can be presented on the electronic display device 441 and, in response to the driver (or other operator) pressing this graphical button (e.g., a "START" button), the occupant detection scanning process can begin and the start screen 500 can be displayed. In another embodiment, the scanning initiation signal can be certain predefined sensor information or signals that are received automatically based on processing sensor information. For example, the controller 412 can determine that the vehicle has arrived at a predefined geographic location (e.g., a bus depot, a bus station, a location along a route that is after the last bus stop) by comparing the geographic location (e.g., GPS coordinate(s)) of the vehicle to the predefined geographic location. In another embodiment, the vehicle can detect the presence of a particular wireless signal (e.g., a Wi-Fi™ signal), and can compare information contained in this signal (e.g., a service set identifier (SSID)) to predetermined information and, upon such information of this wireless signal matching the predetermined information, this signal can be considered a scanning initiation signal. As another example, the scanning initiation event may be based on a door sensor that indicates whether the door is open or closed, an ignition signal indicating the ignition has been switched off or on, and/or a seatbelt or buckle sensor, such as those used for providing seatbelt reminders. In response to the scanning initiation signal, the controller 412 can begin the occupant detection scanning process.

Figure 14:
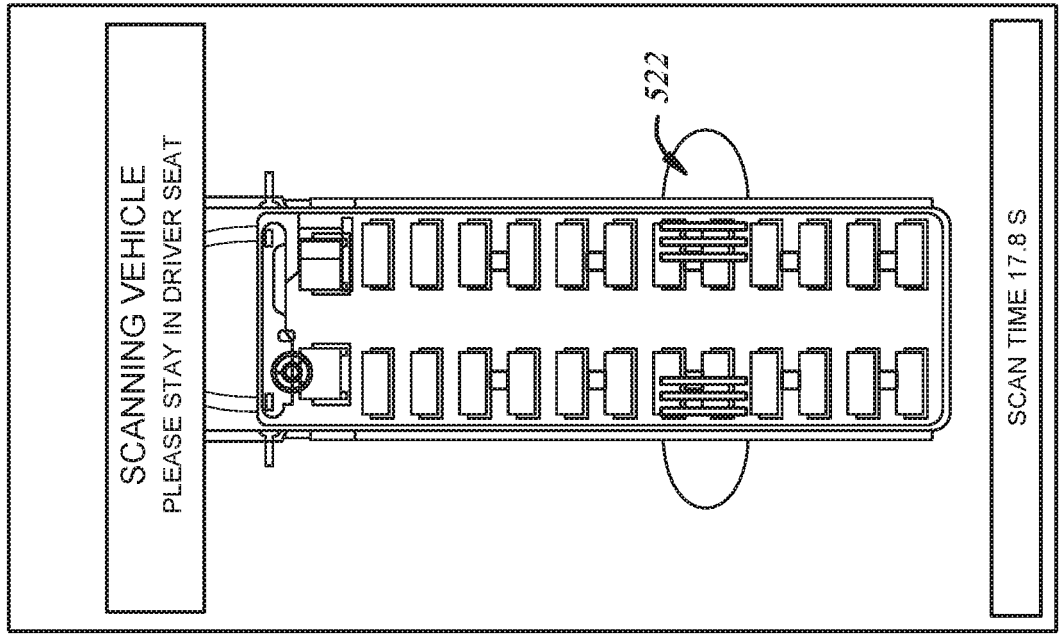
FIG. 14 depicts a scanning-in-progress screen that may be used as a part of an interface of the vehicle occupant detection system.

With reference to FIG. 14, there is shown a scanning-in-progress screen 520 that can be displayed as the occupant detection scanning process is being carried out. For example, after the system is initialized (e.g., in response to the occupant detection scanning process initiation signal), the occupant detection scanning process is carried out and the driver interface 443 can then display the scanning-in-progress screen 520. In one embodiment, if (or when) the vehicle ignition is engaged (or re-engaged) during the occupant detection scanning process, then the vehicle occupant detection system 410 enters a standby mode, enters a low-power or sleep mode, or may turn off.

In one embodiment, the occupant detection scanning process can be carried out from one end of the vehicle to the other, such as by first using the life detection sensors 30 at the front of the bus first, and then using the next set of adjacent life detection sensors 30 so that the scanning process progress from the front of the bus toward the back of the bus. In some embodiments, the life detection sensors 430 can scan (or obtain sensor information) simultaneously and, in such embodiments, the life detection sensors 430 can use various channel separation/modulation/collision-avoidance techniques so as to not create (or to reduce) interference between the various microwaves (or other electromagnetic waves) used by the life detection sensors 430. In other embodiments, a single life detection sensor can be operated (or can scan) at a given time, or a subset of life detection sensors can be operated (or can scan) at a given time. The scanning process can also be carried out multiple times for the same location for redundancy purposes. For example, the occupant detection scanning process can be carried out from the front of the vehicle to the back, and then from the back to the front. The scanning-in-progress screen 520 can provide information concerning the occupant detection scanning process, including the scan time (e.g., the amount of time the scan has taken so far and/or the overall time taken to complete the scan), warnings or other notifications (e.g., directions for the driver, such as informing the driver to stay seated in the driver seat), a scan progress indicator, and/or other information. In one embodiment, the scanning-in-progress screen 520 can include an animation that shows the area of the vehicle (or life detection zones) that is/are currently being scanned. For example, as shown in FIG. 14, the scanner lines 522 indicate the portion of the vehicle that is currently being scanned. The animation can then progress (e.g., the green scanner lines can move) in accordance with the life detection sensors 430 that are being operated at the present time as a part of the occupant detection scanning process.

Figure 16:
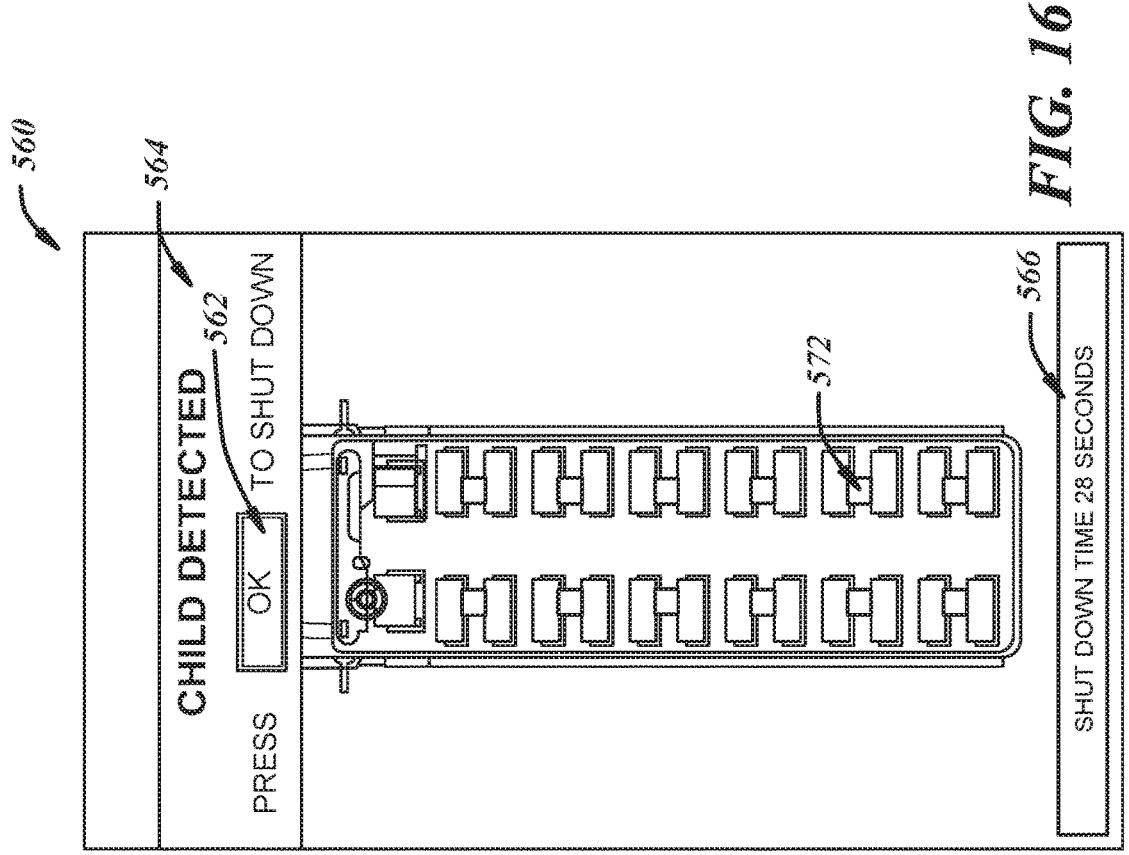
FIG. 16 depicts an occupant-detected result screen that may be used as a part of an interface of the vehicle occupant detection system.
Figure 15:
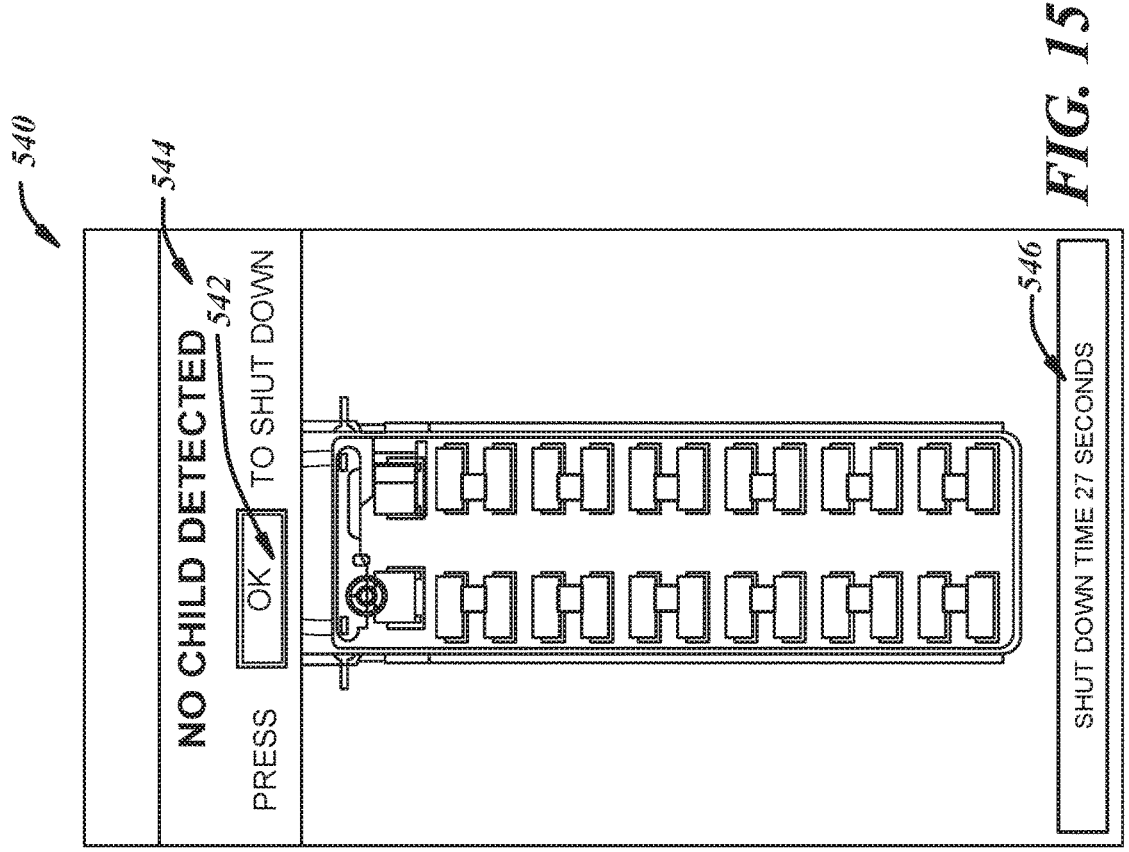
FIG. 15 depicts an occupant-not-detected result screen that may be used as a part of an interface of the vehicle occupant detection system.

With reference to FIGS. 15 and 16, once the occupant detection scanning process is complete, then the driver interface 443 can present an occupant detection scanning process result screen (also referred to herein as a "scanning result screen") 540, 560. FIG. 15 depicts an embodiment of a scanning result screen and, specifically, an occupant-not-detected result screen 540 that shows the results of the occupant detection scanning process in which no occupant (e.g., child) was detected. FIG. 16 depicts an embodiment of a scanning result screen and, specifically, an occupant-detected result screen 560 that shows the results of the occupant detection scanning process in which an occupant (e.g., child) was detected. The occupant-detected result screen 560 can provide an occupant location indicator 572, which indicates a life detection zone or other area in which an occupant was detected, and/or which indicates one or more life detection sensors that detected an occupant. In general with respect to FIGS. 15-16, the lighter-shaded squares indicate that the life detection sensor at that location (at the location of the square) did not detect an occupant (e.g., child) and the darker-shaded squares indicate that the life detection sensor at that location (at the location of the square) did detect an occupant (e.g., child), such as is shown in FIG. 16 at 572. As illustrated, a graphic of the vehicle from a top-view can be presented and the sensor locations can be identified by a square or other indicator, which can then be colored or changed to reflect the results of the scanning process, such as that which is shown in FIGS. 15 and 16.

Each of the scanning result screens 540, 560 include a confirmation button 542, 562 that, when selected by the driver (or other operator), the vehicle occupant detection system 410 shutdowns, or enters a low power mode or standby mode. In embodiments when the electronic display device is a touchscreen display, the confirmation button 542, 562 can include graphics presented on the screen 540, 560. These confirmation buttons can be used to provide an occupancy presence driver confirmation. In other embodiments, other human machine interface (HMI) input devices can be used to provide this occupancy presence driver confirmation, such as a physical pushbutton or voice input that is received by a microphone. These occupant detection scanning process result screens 540, 560 can also include other information such as an overall scanning result indicator 544, 564 (e.g., "NO CHILD DETECTED" (FIG. 15), "CHILD DETECTED" (FIG. 16)). The overall scanning result indicator 544, 564, the color scheme of the screen 540, 560, or other graphics of the screen 540, 560 can be green (or other predetermined color) when no child (or other occupant) is detected and red (or other predetermined color) when a child (or other occupant) is detected.

In one embodiment, when no occupant is detected, the system 410 will automatically shut-down (or enter a low power mode or standby mode) after a predetermined amount of time even when an occupancy presence driver confirmation is not received from the driver (or other operator). And, in one embodiment, when an occupant is detected, the system 410 will automatically initiate an alarm sequence (e.g., internal warnings, external warnings, acoustical signals, email, SMS message). After the alarm sequence (or after an occupancy presence driver confirmation is received), the system 410 can shutdown (or enter a low power mode or standby mode). This predetermined amount of time can be represented by a timer (as indicated at 546, 566) that is displayed and continuously updated (e.g., every second the number is decremented) until the system automatically shutdowns, at which time the electronic display device 441 can enter a low-power or standby mode, or may turn off. The timer can be adjusted so as to change the predetermined amount of time using a system settings or configuration menu, as will be discussed in more detail below.

In some embodiments, in addition to the occupant detection scanning process screens (e.g., start screen 500, the scanning-in-progress screen 520, and the scanning result screens 540, 560), the driver interface 443 can include a settings screen that is used for modifying various settings of the vehicle occupant detection system 410 and/or the occupant detection scanning process. The settings screen (not shown) can be accessed by an operator (e.g., the driver) through entering credentials, or other authorization and/or authentication information. For example, a username and password pair (or other credentials (e.g., a 4 or 6 digit pin)) can be inputted by the operator using one or more HMI input devices, such as by using an onscreen keyboard that is presented on the electronic display device 441 in the case that the electronic display device 441 is a touchscreen or a physical keypad. In another embodiment, a physical key can be used to permit an operator access to the settings screen. For example, the vehicle occupant detection system 410 can include a key cylinder that can be engaged by a physical key. The key cylinder can also include circuitry or electronics that report the status of the key cylinder (e.g., whether the cylinder is in a locked (or rotated) state) to the controller 412. The controller 412 can then direct the driver interface 443 to display the settings screen. In yet another embodiment, a two (2) point (or 2-factor) authorization process can be used, such as that which requires a physical key and user credentials (e.g., username, password, pin, combination thereof).

As mentioned above, the settings screen can be used to modify various settings, such as settings for an alarm escalation sequence or process, the remote warning system, the local warning system, intrusion detection process, vehicle identification information, other vehicle information, and system testing process. For example, with respect to the remote warning system and/or the alarm escalation sequence or process (referred to herein as "alarm escalation process"), the settings screen can enable an operator to specify certain individuals to be notified in the case that an occupant is detected and/or to specify one or more means of communications (e.g., selecting between email, SMS, and/or a mobile application notification). As another example, with respect to the local warning system, the settings screen can enable an operator to specify one or more particular human-machine interface (HMI) output devices to be used in presenting warnings or other notifications locally at the vehicle, which can include speakers and lights. The settings screen can also enable an operator to start or carry out a calibration process for one or more of the life detection sensors 430.

In one embodiment, the settings screen can be provided to a fleet manager or other remote user that is authorized using a remote user interface. The settings screen can be presented at the remote user interface using a computer application and can include a graphical user interface (GUI). The settings can then be modified by the remote user and sent to the vehicle occupant detection system using cellular communications or other remote communications. In one embodiment, the fleet manager or other authorized remote user can access settings screens for a fleet of vehicles, and may modify or change settings for a group of vehicles. For example, the remote user can select a group of vehicle occupant detection systems and then change or modify settings, which can then be applied to the selected group. Various groupings can be used, such as those school busses that are a part of a particular school system. The remote user (e.g., fleet manager) can also access a user interface (e.g., a graphical user interface (GUI) presented on an electronic display device) that shows the current status of one or more vehicle occupant detection systems, such as for a fleet of vehicles. For example, in one scenario, the remote user can be a fleet manager that can view the current status of vehicle occupant detection systems installed on a plurality of school busses. The current status can be a location of the busses, one or more scan results of the occupant detection scanning process, and/or other information obtained from the vehicle occupant detection system.

The system testing process can be used to test the functionality of one or more processes or steps, such as the alarm escalation sequence. For example, a user can press a "TEST" button on the settings screen or other screen of the driver interface 443. The system can then run a test by carrying out a test alarm escalation sequence, which can include sending messages (e.g., SMS, email) to one or more specified devices or individuals. Other parts or operations of the vehicle occupant detection system 410 can be tested as well, such as the local warning system, the intrusion detection process, the alarm escalation process, etc.

In one embodiment, when the settings screen is activated (or accessed), one or more processes can be suspended or stopped. For example, when an operator initiates access of the settings screen while the life detection sensors 430 are scanning as a part of the intrusion detection process, the intrusion detection process is suspended or stopped. After the operator ends access of the settings screen (e.g., navigates to another screen or logs out), the intrusion detection process can resume or be restarted, at least according to one embodiment.

In one embodiment, the vehicle occupant detection system 410 logs information pertaining to the operation of the vehicle occupant detection system 410. The information that is logged (referred to as the "log information") can include results of the occupant detection scanning process, including information indicating which zones an occupant was or was not detected in, sensor information (e.g., raw sensor data, sampled sensor data) from the life detection sensors 430 as well as from other sensors, user interaction with the system 410 (including human-machine interface (HMI) input, and actuation of one or more components of the system by a user (e.g., engaging the vehicle's ignition)), alarm sequence history (e.g., operation of the alarm escalation process in response to a detected occupant), user setting changes, self-test results or data, etc. Any one or more of the events (or any portions of the log information) that are logged can include various types of metadata, including a time indicator (e.g., a timestamp), which can be associated with a time in which the event occurred, a time in which the event was logged, or both, for example. The log information can be stored in one or more log files, and these log files can be "read only" files that are not editable except by the vehicle occupant detection system 410. The one or more log files can be sent to a remote server using the cellular chipset 428, for example. Or, in another embodiment, a fleet manager (or other authorized individual) can locally copy or move the log files from memory of the vehicle occupant detection system 410 to another device that is external from the vehicle occupant detection system 410, such as a portable electronic device (e.g., a smartphone). Access to the log files can be restricted using a password, physical key, other security mechanisms, and/or a combination thereof. In one embodiment, an operator can access the log files (or the log information) locally using the driver interface 443, such as through use of the settings screen.

With reference to FIG. 17, there is shown a fourth embodiment of a vehicle occupant detection system 610. The components of FIG. 17 that include similar reference numerals to those of FIGS. 1, 9, and/or 12 denote like elements. The description of those like components will not be repeated here for the sake of brevity. The vehicle occupant detection system 610 includes an electronic control unit (ECU) or controller (referred to herein as "controller") 612, a sensor interface 622, one or more life detection sensors 630, a user interface 660, a driver interface 643 including plurality of light indicators (e.g., LEDs 662, 664, 666) and a pushbutton 668, a vehicle interface 670, and a data interface 680. The sensor interface 622, the user interface 660, the vehicle interface 670, and the data interface 680 are physical interfaces that are connected to (or a part of) the controller 612. In one embodiment, the controller 612 can include a separate physical interface for each of these four interfaces. In another embodiment, any one or more of these interfaces can be integrated with one another, can include more than one physical interface, or any combination thereof.

The sensor interface 622 corresponds to the communications bus 22 of the vehicle occupant detection system 10 (FIG. 1). In one embodiment, the sensor interface 622 can be a communications bus (e.g., a LIN bus, a CAN bus) that extends between the one or more life detection sensors 630 and the controller 612, and which can be comprised of one or more communication cables. In another embodiment, the sensor interface 622 can be a wireless interface, such as that which uses SRWC (e.g., Bluetooth™, Wi-Fi™). The life detection sensor(s) 630 correspond to the life detection sensors 30, 230, 430 of the vehicle occupant detection system 10, 210, 410 (FIGS. 1, 9, 12), respectively. In at least some embodiments, the sensor interface 622 can also be used to provide electrical power to the life detection sensor (s) 630. In one embodiment, power and data can be provided over a single cable, such as through using Power over Ethernet (PoE).

The user interface 660 provides a connection between one or more human-machine interfaces (HMIs) that are used for communications between the vehicle occupant detection system 610 and an operator (e.g., the driver). In one embodiment, the user interface 660 includes one or more wires or cables that are connected between the controller 612 and the user interface devices 662-668. In at least one embodiment, the user interface 660 is used to inform the operator of the status of the system (e.g., using system status indicator 662), provide information pertaining to whether an occupant was detected (e.g., using occupant-not-present indicator 664, using occupant-present indicator 666), and receive input from the driver, such as an occupancy presence driver confirmation using the pushbutton 668. In the illustrated embodiment, the user interface 660 couples the system to one or more components of a driver interface 643, which is illustrated in FIG. 18.

Figure 18:
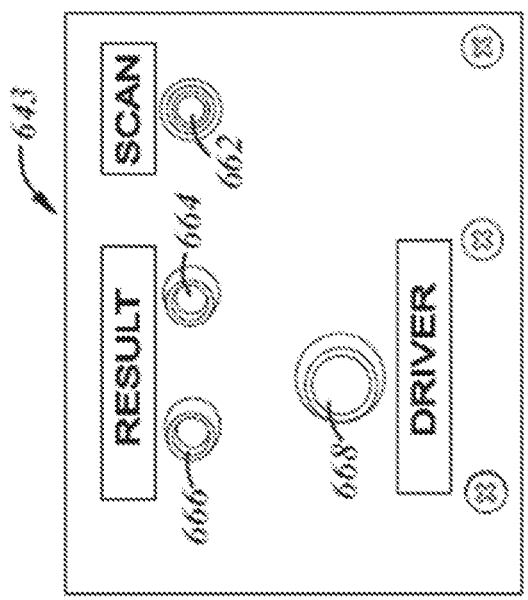
FIG. 18 is a perspective view of a driver interface that can be used as a part of the vehicle occupant detection system according to one embodiment.

As shown in FIGS. 17 and 18, the driver interface 643 includes the status indicator 662, the occupant-not-present indicator 664, the occupant-present indicator 666, and the pushbutton 668. The system status indicator 662, the occupant-not-present indicator 664, and the occupant-present indicator 666 are illustrated as each being a light emitting diode (LED), with the system status indicator 662 emitting an amber-colored light, the occupant-not-present indicator 664 emitting a green-colored light, and the occupant-present indicator 666 emitting a red-colored light. Other types of indicators can be used, including those that use one or more LEDs, other light sources, speakers, and/or other HMI output devices. In one embodiment, the pushbutton 668 is a physical switch that can be actuated through depressing a portion of the pushbutton 668. In other embodiments, other types of switches or electronic user input components can be used. Although the system status indicator 662, the occupant-not-present indicator 664, the occupant-present indicator 666, and the pushbutton 668 are discussed below with respect to certain functionality, in various embodiments, these components can be used in a variety of ways and for a variety of functionality, such as any of the HMI functionality discussed above with respect to other embodiments, including that which is discussed with respect to the local warning system 18, 218, 418 and the driver interface 443.

With reference back to FIG. 17, the vehicle interface 670 provides a connection between one or more electric or electronic components, devices, modules, or systems of the vehicle (collectively, the "vehicle electrical system") and the vehicle occupant detection system 610. In one embodiment, the vehicle interface 670 includes one or more wires or cables that are connected between the controller 612 and the vehicle electrical devices. In one embodiment, the vehicle interface 670 can be or include an onboard diagnostics (OBD) connector, such as an OBD II connector. In another embodiment, the vehicle interface 670 can include on or more wires, cables, or devices that are connected to one or more communication busses of the vehicle, such as to a CAN bus of the vehicle. And, in a particular embodiment, the vehicle interface 670 includes one or more electrical wires, connectors, and/or other components that is used to retrofit the vehicle occupant detection system 610 to the vehicle electrical system such as via one or more wires that branches from a wire or connector of the vehicle electrical system to the controller 612 of the vehicle occupant detection system 610. For example, a communications bus (e.g., CAN bus) of the vehicle electrical system may be connected to the vehicle occupant detection system 610 in a retrofitted manner so as to permit the controller 612 to receive and/or send communications over the communications bus of the vehicle. In such embodiments, the vehicle occupant detection system 10 (or portions thereof) are provided as an after-market product that is configured for being retrofit to a mass-transit vehicle (or other vehicle), such as a school bus. In some embodiments, the vehicle interface 670 can provide one or more direct connections between a vehicle electrical device and the controller 612. For example, an ignition unit of the vehicle can be directly wired to the controller 612, or other component or portion of the vehicle occupant detection system 610. In yet another embodiment, the vehicle interface 670 can be a wireless interface that uses, for example, short-range wireless communications, such as Wi-Fi™ and/or Bluetooth™.

The vehicle interface 670 is used to provide vehicle information to the vehicle occupant detection system 610, such as one or more vehicle conditions that can be used to, or as a basis for, carrying out certain functionality of the vehicle occupant detection system 610, such as to initiate the occupant detection scanning process. In one embodiment, the one or more vehicle conditions include an ignition status, a parking brake status of the vehicle, a door status (e.g., a status indicating whether the door main school bus door is open or closed), a disembark status (e.g., whether the vehicle is stopped, the door is open, and/or other information indicating someone is exiting the bus), and/or a seatbelt status (e.g., as determined via a seatbelt or buckle sensor). Also, in some embodiment, the vehicle interface 670 can be used to provide the vehicle occupant detection system 610 with access (or control) to one or more components of the vehicle, such as a vehicle horn and/or vehicle lights. As shown in FIG. 17, the vehicle interface 670 connects the controller 612 to portion of the vehicle electrical system that provides a parking state status as indicated at 672. The parking state status indicates whether the vehicle is in a parking state or not, and/or can provide a signal or indication when the parking state changes. Also, the vehicle interface 670 connects the controller 612 to portion of the vehicle electrical system that provides an ignition status as indicated at 674. The ignition status indicates whether the vehicle's ignition is activated or turned on/off, and/or can provide signal or indication when the ignition state changes. In other embodiments where the vehicle is an electric vehicle or a hybrid electric vehicle, the ignition status can indicate a status of the primary propulsion system. The vehicle interface 670 connects the controller 612 to portion of the vehicle electrical system that provides access to one or more output HMI devices of the vehicle as indicated at 676. As shown in the illustrated embodiment of FIG. 17, the one or more output devices can include a vehicle horn 675 and vehicle lights 677. The vehicle lights 677 can be lights that are provided on the interior of the vehicle cabin, and/or can be lights that are provided on the exterior of the vehicle (e.g., brake lights, turn signals, school bus stop sign lights, flashers, headlights).

The vehicle interface 670 can also be used to provide power from the vehicle electrical system to the vehicle occupant detection system 610 as indicated at 678. In one embodiment, the vehicle interface 670 can provide connect to one or more electric wires of the vehicle that deliver electric power. For example, the vehicle interface 670 can provide a connection between a vehicle battery (e.g., a 12V battery) and the controller 612. The controller 612 can then provide power to other components of the vehicle occupant detection system 610, such as the life detection sensor(s) 630. Or, the vehicle interface 670 can be used to provide power from the vehicle battery directly to these other components.

The data interface 680 provides a connection between the controller 612 and one or more data stores. The data stores can include one or more memory devices, any one or more of which can be located locally and/or as a part of the vehicle occupant detection system 610, or any one or more of which may be located remotely and which can be accessible using a remote data connection. In some embodiments where at least one of the memory devices is located remotely, the data interface 680 can provide a connection between the controller 612 and a cellular chipset 628. This cellular chipset 628 is analogous to the cellular chipset 228, 428 of the vehicle occupant detection system 210, 410, respectively, and that discussion above is incorporated herein and not repeated for the sake of brevity. In some embodiments, the data interface 680 can be used to receive remote commands via the cellular chipset 628, which can be received in the form of an email or SMS message. These remote commands can be commands to shut-off an alarm (e.g., such as to turn off or deactivate a local warning system). Also, as will be discussed more below, the system settings 684 can store remote user contact information, which can include phone numbers or email addresses of one or more designated remote users. In one embodiment, the system settings 684 stores remote user contact information for up to three remote users.

The data interface 680 is shown as providing access to log files 682 and system settings 684. The log files 682 and/or the system settings 684 can be stored locally at a memory device that is included as a part of the vehicle occupant detection system 610. In one embodiment, the memory device is separate from the controller 612 and, in some embodiments, the memory device is connected to the controller via a wired connection (e.g., a USB connection, a SATA connection). In another embodiment, the memory device on which the log files 682 and/or the system settings 684 are stored is included as a part of the controller 612. The log files 682 can include one or more electronic files, and can be accessed by the controller 612 and/or sent to a remote device, such as through an email using cellular chipset 628. The system settings 684 are used to define settings of the system and, in some embodiments, can define customer-specific settings and system behavior. For example, the system settings 684 can define certain parameters of the alarm escalation process and/or the intrusion alert process, which, in some embodiments, can be customized for the particular customer. Also, the system settings 684 can store remote user contact information, such as phone number(s) and/or email address(es), which, in some embodiments, can be customized for the particular customer.

With reference to FIGS. 19-22, there are shown various timing diagrams illustrating certain functionality of the vehicle occupant detection system 610. It should be appreciated that the exemplary functionality described below applies equally to other embodiments of the vehicle occupant detection system, including the vehicle occupant detection system 10 (FIG. 1), the vehicle occupant detection system 210 (FIG. 9), and the vehicle occupant detection system 410 (FIG. 12).

In one embodiment, the vehicle occupant detection system 610 is activated in response to a rising edge of the ignition signal 674. The vehicle occupant detection system 610 can receive an indication of a rising edge of the ignition via the vehicle interface 670. In other embodiments, other ignition status(es) can be used as providing an indication to activate the system 610. In the illustrated embodiment of FIG. 19, in response to the initial ignition signal 702, the plurality of light indicators 662-666 are illuminated for three (3) seconds to provide a system activation indication to a driver (or other local user). In other embodiments, the system 610 can activate other HMI output devices to provide the driver (or other local user) the system activation indication, which is an indication that the vehicle occupant detection system 610 has been (or is being) activated. The HMI output devices can provide this system activation indication for a predetermined amount of time, which is three (3) seconds in the illustrated embodiment. In at least some embodiments, the actual state of the ignition does not influence the activation of the system 610 after the system 610 has already observed a first rising edge of the ignition. For example, when the driver turns a vehicle key to start the ignition of the vehicle, the system 610 will activate regardless of whether the vehicle is successfully started. In response to activating the system 610, a self-test can be carried out, which is described in more detail below with respect to FIG. 23.

Figure 20:
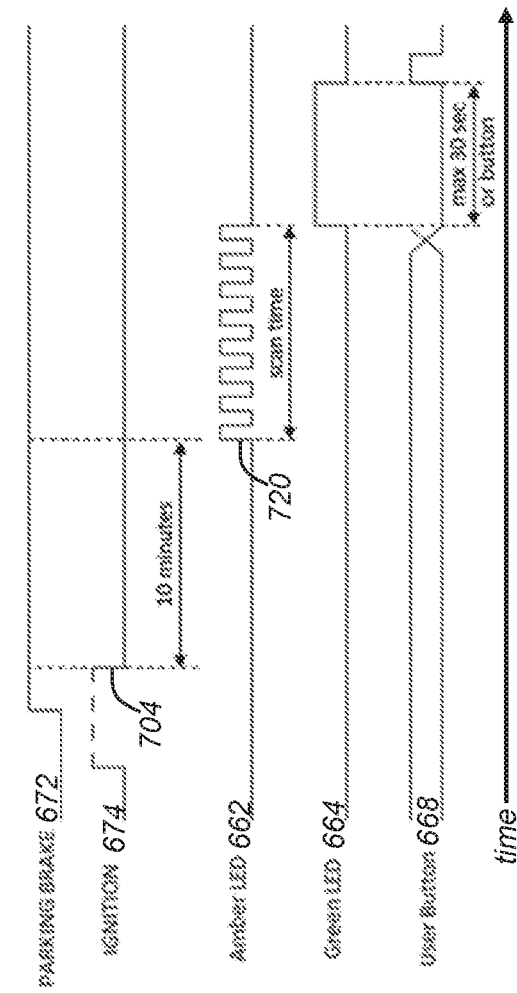
Figure 19:
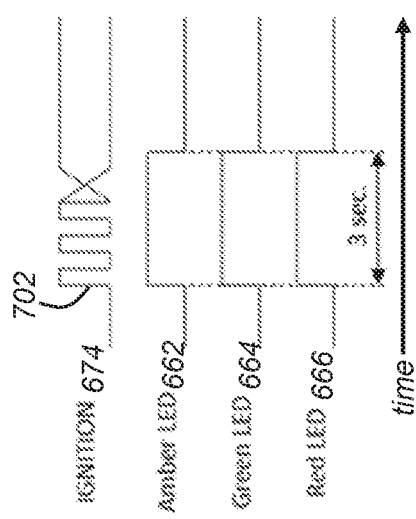

In at least some embodiment, the vehicle occupant detection system 610 carries out the occupant detection scanning process in response to a falling edge of the ignition signal 674 as indicated at 704. Also, in some embodiments, the occupant detection scanning process is not carried out unless the vehicle is in the parking state (e.g., parking brake is engaged), which can be determined based on the parking state signal 672, which is illustrated as a parking brake signal in the illustrated embodiment. As shown in FIGS. 20 and 21, in response to detecting a falling edge of the ignition signal 674 (indicated at 704) and that the vehicle is in the parking state as indicated by the parking state signal 672, the vehicle occupant detection system 610 can then initiate a countdown of a predetermined amount of time before beginning the occupant detection scanning process. This predetermined amount of time is ten (10) minutes in the illustrated embodiment. As indicated at 720, the occupant detection scanning process begins after this predetermined amount of time.

When the occupant detection scanning process begins, the system status indicator 662 can begin blinking and can continuing blinking until the occupant detection scanning process is completed. Other forms of output can be provided to the driver (or other local user) that indicate the occupant detection scanning process is currently being performed. In some embodiments, the occupant detection scanning process is stopped when the ignition signal 674 indicates that the ignition is being started, which can be detected as a rising edge of the ignition signal. In some embodiments, the occupant detection scanning process is stopped when the parking state signal 672 indicates that the vehicle is no longer in the parking state (e.g., the parking brake is no longer engaged).

Once the occupant detection scanning process is complete, a result of this scanning process can be provided to the driver (or other local user). In one embodiment, when there is not an occupant detected by the occupant detection scanning process, the occupant-not-present indicator 664 can be illuminated for a predetermined amount of time, which is thirty (30) seconds in the illustrated embodiment of FIG. 20. In one embodiment, when there is an occupant detected by the occupant detection scanning process, the occupant-present indicator 666 can be illuminated in a blinking manner for a predetermined amount of time, which is thirty (30) seconds in the illustrated embodiment of FIG. 21. In some embodiments, the occupant-not-present indicator 664 can be illuminated in a blinking manner, and/or the occupant-present indicator 666 can be illuminated in a steady manner. Also, other forms of output can be provided to the driver (or other local user) in response to completing the occupant detection scanning process, including audio output, graphical output, etc. The scanning result indication (e.g., occupant-not-present indicator 664, the occupant-present indicator 666) can be stopped or deactivated when the driver (or other local user) presses the pushbutton 668 or otherwise provides an occupancy presence driver confirmation.

Figure 22:
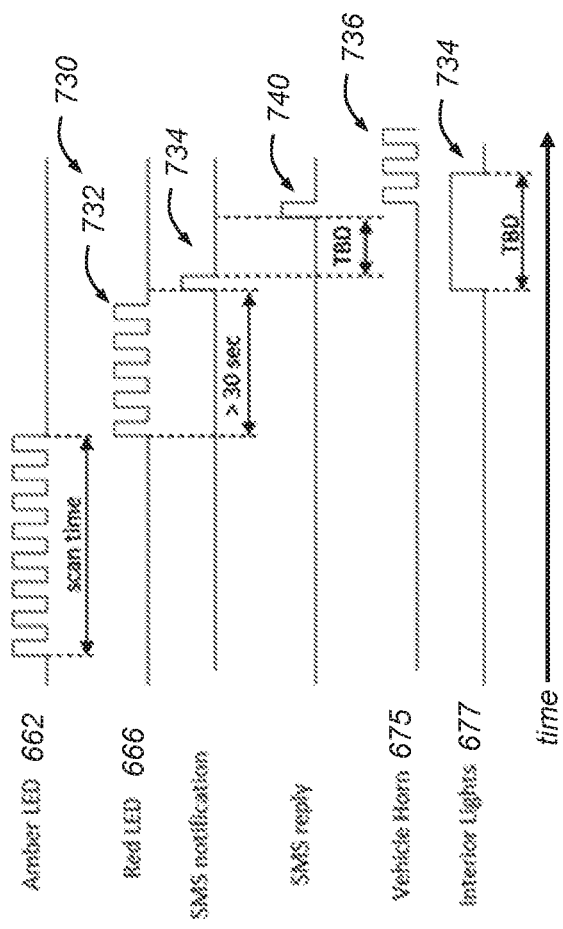

With reference to FIG. 22, there is shown a time diagram of an alarm strategy or alarm escalation process 730. In one embodiment, the alarm escalation process 730 is carried out in response to detecting an occupant as a result of the occupant detection scanning process. In general, the alarm escalation process 730 includes a plurality of stages in which various alarms and/or notifications are provided. In at least some embodiments, the alarm escalation process 730 is terminated when the pushbutton 668 is pressed, or when other input is received from the driver, other local user, or a remote user. The first stage 732 of the alarm escalation process 730 includes providing a local notification. The local notification can be an interior vehicle location and/or an exterior vehicle notification. For example, as shown in FIG. 22, the occupant-present indicator 666 is illuminated in a blinking fashion for thirty (30) seconds, as indicated at 732. In one embodiment, the first stage can include a first sub-stage in which an interior vehicle notification (e.g., the blinking red light of the occupant-present indicator 666) is provided for a first predetermined amount of time and, after this first predetermined amount of time, a second sub-stage can be carried out in which an exterior vehicle notification is provided, such as through use of the vehicle horn or exterior vehicle lights. After the first stage 732, a second stage 734 is carried out in which a remote user is contacted, such as via an SMS message that is sent using the cellular chipset 628. In one embodiment, the SMS message is sent to a fleet manager, or other designated individual or system. The SMS message can indicate an overall result of the occupant detection scanning process, as well as more detailed information, such as one or more life detection zones in which an occupant was detected. Other remote notifications can be provided as well. In addition, as a part of the second stage 734, interior vehicle lights can be illuminated, which can include controlling the vehicle lights using the controller 612 via the vehicle interface 670. If an SMS message or other input is received that indicates an individual is aware that an occupant has been detected in the vehicle (e.g., an occupancy presence driver confirmation is provided), then the alarm escalation process can be stopped. For example, as indicated at 740, a SMS reply message is received. In a scenario where no response is received within a predetermined amount of time, then the alarm escalation process 730 can escalate to the third stage 736 in which the vehicle horn can be activated and/or another exterior vehicle notification can be provided. Also, in one embodiment, when no response is received within a predetermined amount of time after beginning the second or third stage, then emergency medical services (EMS) can be notified, which can include placing a call or sending information using the cellular chipset 628. Any of the information sent to a remote user or system can also indicate a geographic location of the vehicle.

Figure 23:
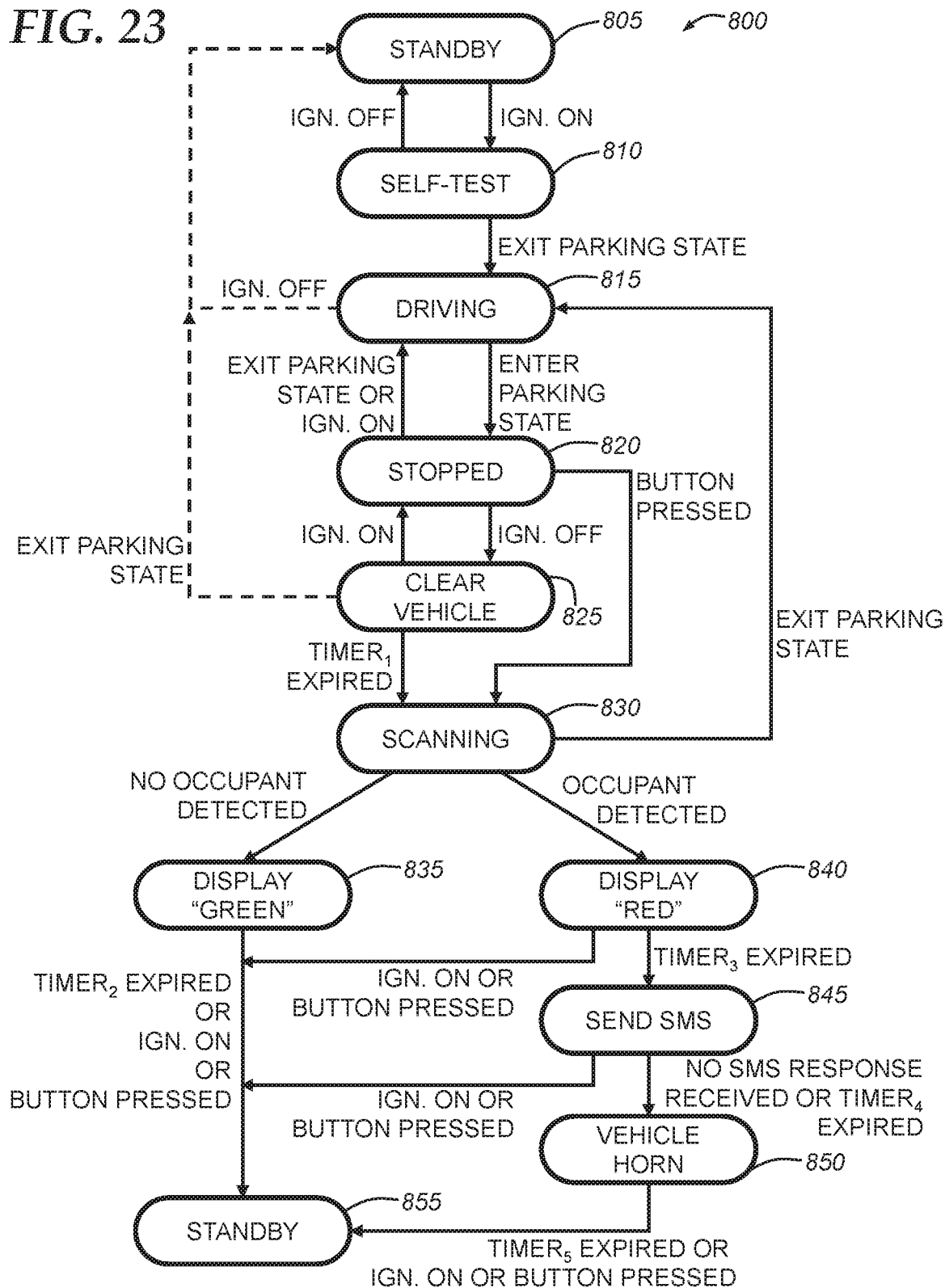
FIG. 23 depicts a flowchart illustrating a method of carrying out a remedial action in response to detecting an occupant within a vehicle according to one embodiment.

With reference to FIG. 23, there is shown a state diagram according to an embodiment 800 of a method of carrying out a remedial action in response to detecting an occupant within a vehicle. Although the method 800 is discussed with respect to the vehicle occupant detection system 610, the method 800 can be used with various other occupant detection systems, including the vehicle occupant detection system 10, the vehicle occupant detection system 210, and the vehicle occupant detection system 410.

The method 800 begins with the vehicle occupant detection system in a standby mode or state as indicated at 803. In the standby mode 803, the vehicle occupant detection system waits for a vehicle occupant detection system activation event (also referred to as a "system activation event"), which is an ignition ON signal as indicated in the illustrated embodiment. Then, when a vehicle occupant detection system activation event is detected (e.g., detecting that the vehicle ignition is ON), the method 800 proceeds to a self-test state 810 in which the vehicle occupant detection system performs a self-test. The self-test includes one or more operations in which the vehicle occupant detection system determines whether one or more devices and/or functions are operational and/or running correctly. During the self-test, if it is detected that the ignition is turned off, the method continues back to step 805 where the vehicle occupant detection system enters the standby mode. After the self-test, the vehicle occupant detection system enters a driving state 815 in which the vehicle is driven. In many embodiments, the driving state 815 is entered once the vehicle exits a parking state as depicted in the illustrated embodiment. As mentioned above, the parking state is a state in which the vehicle is in a parking transmission gear (e.g., the Park gear of PRNDL) or when a parking brake of the vehicle is engaged. The parking state is not explicitly shown as a separate element in FIG. 23 since the vehicle can be in a parking state while the vehicle and/or vehicle occupant detection system is in one of the states shown in FIG. 23. During the driving state, if the ignition is turned off prior to the vehicle being placed into the parking state, then the vehicle occupant detection system enters the standby mode 805. Otherwise, as indicated at the transition between state 815 and 820, once the vehicle is placed into the parking state, the vehicle is considered to be in a stopped state 820. In the stopped state 820, when the vehicle exits the parking state (e.g., a parking brake is released or disengaged, the vehicle is placed into a drive gear) and/or the ignition is turned off, the vehicle occupant detection system enters the clear vehicle state 825. Also, when the vehicle is in the stopped state 820, if a manual start command is provided, the vehicle occupant detection system enters the scanning state immediately (or, in some embodiments, after a predetermined amount of time). The manual start command is any manual input from a user that indicates to start the occupant detection scanning process, which is illustrated as "BUTTON PRESSED". In one embodiment, the pushbutton 668 can be used to provide the manual start command while the vehicle is in the stopped state 820.

The clear vehicle state 825 is a state in which the vehicle occupant detection system waits a first predetermined amount of time before carrying out the occupant detection scanning process. As illustrated in FIG. 23, once a first timer (TIMER$_1$) that is set to the first predetermined amount of time expires, the vehicle occupant detection system enters the scanning state 830 in which the occupant detection scanning process is carried out. As illustrated in FIG. 23, during the scanning state 830, if the vehicle exits the parking state then the occupant detection scanning process is stopped (or at least paused) and the vehicle then enters the driving state 815. In some embodiments, the vehicle ignition may be off at this time and so the system will enter the standby mode 805 as indicated by the transition between the driving state 815 and the standby mode 805. It should be appreciated that although FIG. 23 depicts that the system enters the driving state 815 when the parking state is exited while in the scanning state 830, the actual operation may be to enter the standby state 805 directly from the scanning state 830 when the parking state is exited. As a result of the occupant detection scanning process, a scan result is obtained and, when the scan result indicates that no occupant is detected, then the vehicle occupant detection system provides an occupant-not-present indication, which can be any indication that no occupant was detected. In the illustrated embodiment, the occupant-not-present indication is a green light that is displayed or otherwise provided as indicated at 835, which can be provided by the driver interface 643 using the occupant-not-present indicator 664. When the scan result indicates that an occupant has been detected, then the vehicle occupant detection system provides an occupant-present indication, which can be any indication that an occupant was detected. In the illustrated embodiment, the occupant-present indication is a red light that is displayed or otherwise provided as indicated at 840, which can be provided by the driver interface 643 using the occupant-present indicator 666. In some embodiments, when the scan results are unclear as to whether an occupant is present, the system can treat these results the same as if an occupant was detected. However, a separate indicator can be provided in some embodiments, such as a yellow light, a red blinking light, or illuminating both the green and the red light at the same time.

In the occupant-not-present state 835, the system waits a second predetermined amount of time before entering the standby state 855. This second predetermined amount of time is represented by the TIMER$_2$ in FIG. 23. Also, in at least some embodiments, when in the occupant-not-present state 835, if the ignition of the vehicle is turned on or an occupancy presence driver confirmation is provided (e.g., by pressing the pushbutton 668 of the driver interface 643 as represented in FIG. 23 as "BUTTON PRESSED"), then the vehicle occupant detection system enters the standby state 855. In the occupant-present state 840, after a third timer (TIMER$_3$) expires (i.e., after a third predetermined amount of time), the system enters the remote notification state 845 as indicated by the transition "TIMER$_3$ EXPIRED". In the remote notification state 845, the vehicle occupant detection system sends a remote notification to one or more remote users to inform them that an occupant is (or may be) present. If no acknowledgement or response is received after a fourth predetermined amount of time as indicated by "TIMER$_4$ EXPIRED", then the vehicle occupant detection system enters an exterior vehicle notification state 850, which is a state in which the vehicle occupant detection system provides an exterior vehicle notification (e.g., a vehicle horn as illustrated in FIG. 23). After a fifth predetermined amount of time as indicated by "TIMER$_5$ EXPIRED", the vehicle occupant detection system enters the standby state 855. Also, when the vehicle occupant detection system is in either state 840, 845, or state 850, if the ignition of the vehicle is turned on or an occupancy presence driver confirmation is provided, the vehicle occupant detection system enters the standby state 855. The standby state 855 is the same as the standby state 805. The progression of notifications provided in states 840-850 represents an embodiment of an alarm escalation process. It should be appreciated that the first predetermined amount of time, the second predetermined amount of time, the third predetermined amount of time, the fourth predetermined amount of time, and the fifth predetermined amount of time can all be the same amount of time, all be a different amount of time, or some combination thereof. Also, these predetermined amount of times can be configured for the particular application in which the vehicle occupant detection system is used, and may be modified by an authorized user using a driver interface.

Figure 24:
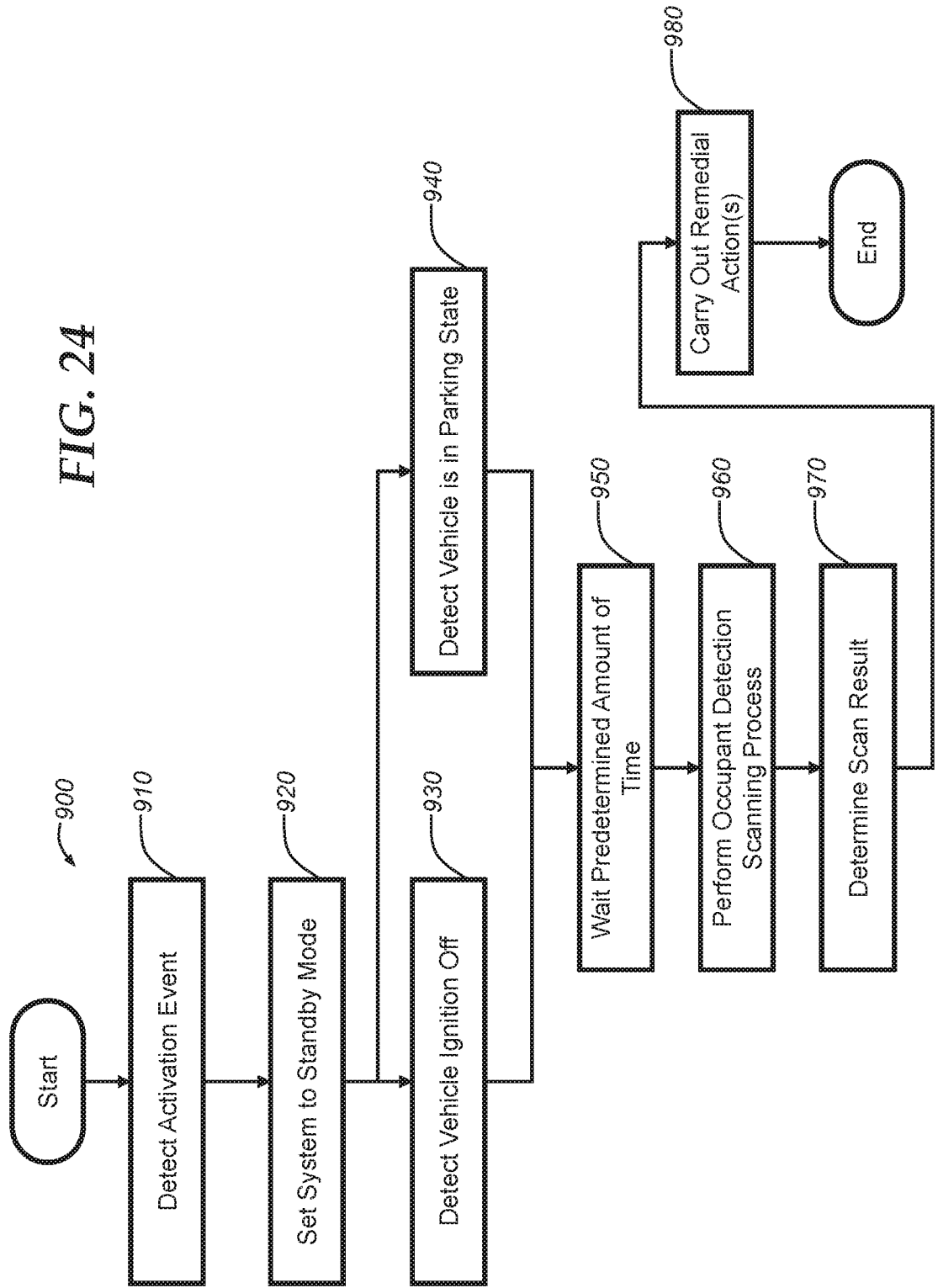
FIG. 24 is flowchart illustrating a method of carrying out a remedial action in response to detecting an occupant within a vehicle according to one embodiment.

With reference to FIG. 24, there is shown a flowchart illustrating an embodiment 900 of a method of carrying out a remedial action in response to detecting an occupant within a vehicle. The method 900 can be used with and/or carried out by various occupant detection systems, including the vehicle occupant detection system 10, the vehicle occupant detection system 210, the vehicle occupant detection system 410, and the vehicle occupant detection system 610.

The method 900 begins with step 910, wherein a vehicle occupant detection system activation event (also referred to as a "system activation event") is detected. As discussed above, in one embodiment, the system activation event is a rising edge of an ignition signal from a vehicle to which the vehicle occupant detection system is installed. In other embodiments, the system activation event can be the disengaging of a parking brake, the shifting of a transmission gear (e.g., shifting to or from one of PRNDL), opening or closing a vehicle door, the presence of a driver (e.g., which can be detected using a pressure sensor within a driver seat or other driver detection mechanism), the presence of voice within the vehicle (e.g., as detected using a microphone), etc. Any one or more of these events or other events can be detected by programming the vehicle occupant detection system to listen for certain signals that indicate the occurrence of such events. After the system activation event is detected, the method 900 proceeds to step 920

In step 920, in response to detecting the system activation event, the vehicle occupant detection system enters a standby mode. The standby mode is a mode in which the vehicle occupant detection system listens for a scanning initiation event. The scanning initiation event can be any event that is predetermined to cause the occupant detection scanning process to be carried out presently or after a predetermined amount of time (see step 950, for example). In one embodiment, the scanning initiation event is when the ignition is turned off and/or when a parking brake is engaged. Other types of scanning initiation event can be used, such as when a driver (or other user) presses a pushbutton or provides other input to indicate to start the occupant detection scanning process. The method 900 continues to step 930.

In steps 930 and 940, the scanning initiation event is detected and, in the illustrated embodiment, this includes detecting that the vehicle ignition is off (step 930) and detecting that the vehicle is in the parking state (e.g., parking brake of the vehicle is engaged) (step 940). In one embodiment, these detections can be performed by listening for one or more particular signals over a vehicle interface of the vehicle, such as through using the vehicle interface 670 described above with respect to the vehicle occupant detection system 610 (FIG. 17). Once it is detected that the vehicle ignition is off and that the vehicle is in the parking state (and/or another mass-transit service termination event or other scanning initiation event is detected), the method 900 continues to step 950.

In step 950, the vehicle occupant detection system waits a predetermined amount of time. The predetermined amount of time can be any amount of time, such as thirty (30) seconds, ten (10) minutes, etc. In some embodiments and/or scenarios, this waiting step can allow the driver of the vehicle (or other passengers who may still be present) to depart the vehicle. In some embodiments, this predetermined amount of time can be adjusted for the particular application and/or context in which the vehicle occupant detection system is used. In some embodiments, this step may be omitted and the occupant detection scanning process can be carried out after the scanning initiation event is detected, and/or in response to a manual start command. The method 900 then continues to step 960.

In step 960, the occupant detection scanning process is carried out in response to the detection of the scanning initiation event. The occupant detection scanning process includes using the plurality of life detection sensors to obtain sensor data that can be used to determine whether an occupant is present in the vehicle. In one embodiment, the scanning process causes the plurality of life detection sensors to transmit electromagnetic signals toward a life detection zone and to receive one or more reflected electromagnetic signals. The received reflected electromagnetic signal (s) can then be sampled or otherwise processed at the life detection sensor and sensor data derived from the received reflected electromagnetic signal(s) is sent to a controller (e.g., controller 12, 212, 412, 612), which can be a central control unit. In one embodiment, the plurality of life detection sensors can transmit electromagnetic signals at the same time and, in some instances, different modulation or channel separation techniques can be used so as to avoid or reduce interference between the electromagnetic signals.

In another embodiment, the plurality of life detection sensors can transmit electromagnetic signals at a different time than one another. For example, in one embodiment with reference to FIG. 4, a first life detection sensor (e.g., sensor 30-1) can perform a scan, then a second life detection sensor (e.g., sensor 30-7) can perform a scan, then a third life detection sensor (e.g., sensor 30-2) can perform a scan, then a fourth life detection sensor (e.g., sensor 30-8) can perform a scan, etc. In another embodiment, a first life detection sensor (e.g., sensor 30-1) can perform a scan at the same time as a second life detection sensor (e.g., sensor 30-10), then a third life detection sensor (e.g., sensor 30-7) and a fourth life detection sensor (e.g., sensor 30-4) can perform a scan at the same time, then a fifth life detection sensor (e.g., sensor 30-2) and a sixth life detection sensor (e.g., sensor 30-11) can perform a scan at the same time, etc. until all of the sensors have been operated. In some instances, each sensor can perform two scans so as to more effectively ensure that an occupant is not present or is present. In one embodiment, a first life detection sensor (e.g., sensor 30-1) scans, then a second life detection sensor (e.g., sensor 30-2) scans, etc. until the last life detection sensor scans (e.g., sensor 30-12) and, after all of the sensors have performed a first scan, a second scan can be performed by each of the sensors, which can be carried out in the same order as the first scan or in a reverse order of the first scan, for example. The method 900 continues to step 970.

In step 970, a scan result is determined from the sensor data obtained during the occupant detection scanning process. The scan result indicates whether an occupant is present (or is detected as being present). In at least some embodiments, the scan result can also indicate one or more life detection zones (or other locations) in which an occupant was detected. Also, in some embodiments, it may be unclear whether an occupant is present and, in such cases, the scan result can indicate this uncertainty. For example, as illustrated FIG. 4, an occupant was detected in life detection zones 42-1 and 42-7 as indicated by dark-shading, and it is unclear whether an occupant is present in life detection zone 42-2 as indicated by light-shading. In one embodiment, the scan result can be determined by a central control unit or a controller. In one embodiment, each life detection sensor can determine whether an occupant was detected in its associated life detection zone and then this information can be sent to a controller or central control unit. The method 900 continues to step 980.

In step 980, one or more remedial actions are carried out by the vehicle occupant detection system. The one or more remedial actions can include providing a local interior notification, a local exterior notification, and/or a remote notification. Various types of these notifications are discussed above, and can include emitting light using one or more light sources (e.g., LEDs on a driver interface, LEDs on the life detection sensors), operating the vehicle horn, presenting a notification on a driver interface, sending an SMS message or email to a remote device, notifying police or an EMS system, etc. In one embodiment, the one or more remedial actions can be a part of an alarm escalation process, such as that which is described above. The method 900 then ends.

In another embodiment, the method 900 can include carrying out an intrusion detection process, which further includes periodically (e.g., after waiting a predetermined amount of time after step 970 or 980) proceeding back to step 960 to perform the occupant detection scanning process so as to detect intruders (or other individuals who may enter the vehicle). When an occupant (or intruder) is detected, then the remedial action(s) of step 980 can include sending a remote notification to a designated individual, such as a fleet manager or a designated monitor. This intrusion detection process can be terminated when a system activation event is detected (see step 910).

In some instances, it may be desirable to carry out the occupant detection scanning process while the vehicle ignition is on, or in response to a scanning initiation event other than when the ignition is turned off and/or when the vehicle is placed into the parking state. For example, a bus driver may leave the bus idling and depart a bus while a child is on the bus for various reasons, such as to go the bathroom. In some embodiments, the scanning initiation event can be an event in which the driver (or other operator) departs the vehicle. The driver's departure can be detected using a driver presence detection sensor, which can be a pressure sensor within the driver's seat, a camera, and/or a life detection sensor directed to a driver seat or operating location.

In some embodiments, the vehicle occupant detection system can be installed on a vehicle that is an electric vehicle or a hybrid vehicle. Thus, according to such embodiments, instead of determining an ignition status (as discussed above according to various embodiments), the vehicle occupant detection system can determine a primary propulsion state of the vehicle, such as whether the vehicle is activated so as to be ready for being propelled.

In some embodiments, the vehicle occupant detection system can be installed on another vehicle besides a bus, such as a train. In one embodiment, each train car can include one or more life detection sensors (e.g., a plurality of life detection sensors) and a controller—in some embodiments, each of the train cars can be considered as having a vehicle occupant detection sub-system that is a part of a vehicle occupant detection system for the entire train. The train can also include a central control device that can receive scan results from each controller of each train car (or sub-system), which can then process these scan results and provide these results to a train operator and/or to a remote user using a cellular chipset or other remote communication device. Of course, such embodiments can be applied to other types of mass-transit vehicles as well, such as multi-cabin busses, ferries, other boats, etc.

Figure 25:
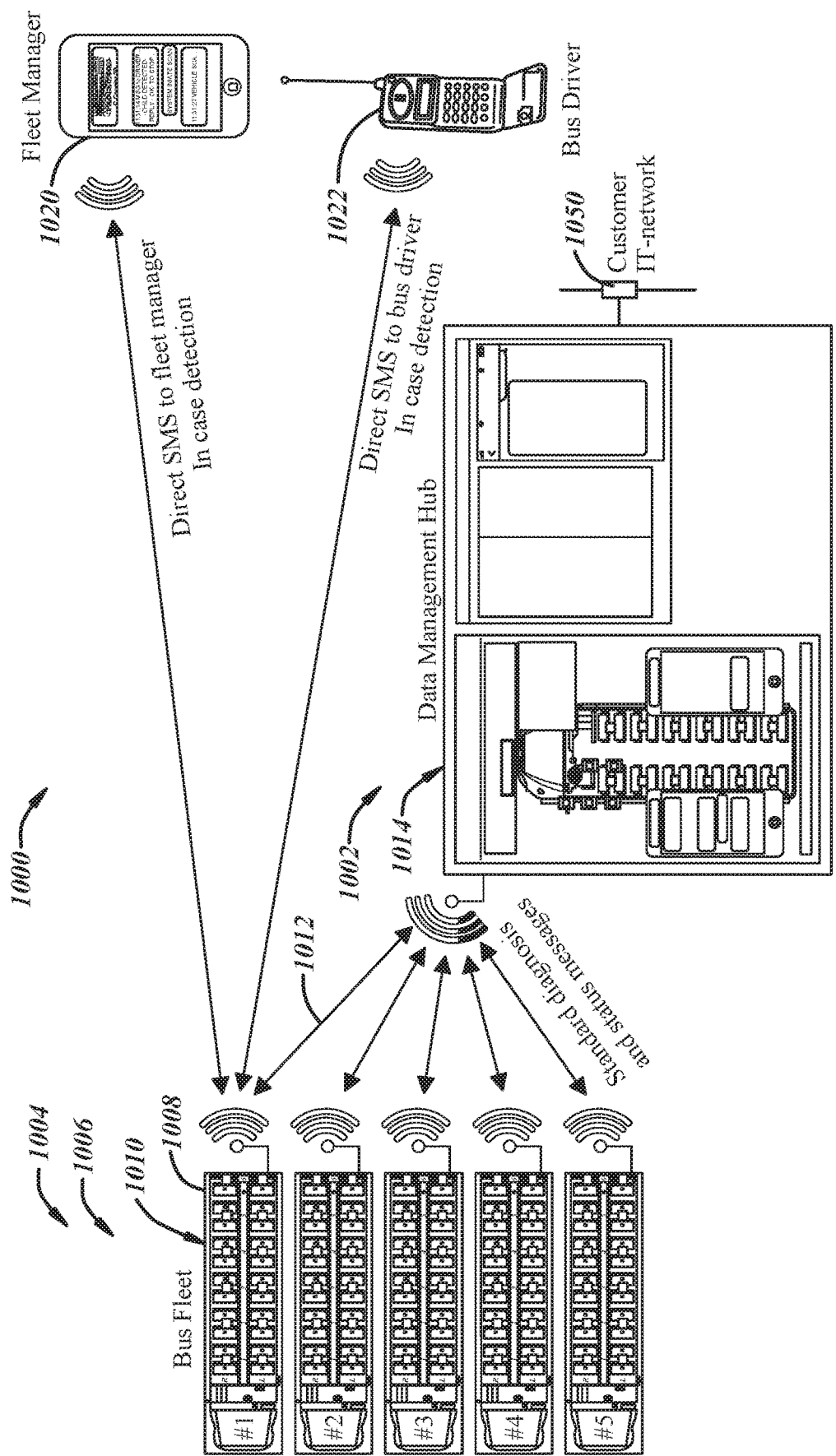
FIG. 25 is a block diagram depicting an exemplary vehicle occupant detection data management system that may be used with or as a part of a vehicle occupant detection system according to one embodiment.

With reference to FIG. 25, there is shown a vehicle occupant detection data management system 1000 that includes a data management hub 1002 for providing information concerning one or more vehicle occupant detection systems of the fleet of vehicles 1004. The data management hub 1002 can include one or more servers, personal computers, or other computers, as well as remote network connectivity so that data may be sent and/or received between one or more computers of the data management hub 1002 and the one or more vehicle occupant detection systems 1006. According to at least some embodiments, the data management hub 1002 can send and receive diagnostic information or other information to and from the one or more vehicle occupant detection systems 1006 of the fleet of vehicles 1004. In one embodiment, the data management hub 1002 can conduct routine diagnostic tasks, such as, for example, requesting and/or receiving diagnostic information from the one or more vehicle occupant detection systems 1006 as well as instructing the one or more vehicle occupant detection systems 1006 to run a diagnostic test or to compile diagnostic information. The data management hub 1002 can provide a user (e.g., fleet manager) with options to adjust certain settings or operation(s) of the one or more vehicle occupant detection systems 1006, as well as enable a user to review results of one or more occupant detection scanning processes of the one or more vehicle occupant detection systems 1006, identify malfunctions of the one or more vehicle occupant detection systems 1006, initiate or run one or more occupant detection scanning processes using the one or more vehicle occupant detection systems 1006, and/or be notified or informed of certain states or information pertaining to the one or more vehicle occupant detection systems 1006.

The data management hub 1002 can be located remotely from the fleet of vehicles 1004. The one or more vehicle occupant detection systems 1006 may each be a vehicle occupant detection system (e.g., vehicle occupant detection system 10) that is installed on a single one of the vehicles of the fleet of vehicles 1004. For example, a first vehicle occupant detection system 1010 is installed on a first vehicle 1008, which is a bus in this example. A remote data connection 1012 can be established between the data management hub 1002 and each of the one or more vehicle occupant detection systems 1006, such as the vehicle occupant detection system 1010 of the first vehicle 1008. Any one or more of the vehicle occupant detection systems 1006 (e.g., the vehicle occupant detection system 1010) can be (or include any of the features of) any of those vehicle occupant detection systems discussed herein, including the vehicle occupant detection system 10 (FIG. 1), the vehicle occupant detection system 210 (FIG. 9), the vehicle occupant detection system 410 (FIG. 12), and the vehicle occupant detection system 610 (FIG. 17).

The remote data connection 1012 can be established using a cellular chipset of the vehicle occupant detection system 1010 (e.g., cellular chipset 428). In one embodiment, the remote data connection 1012 uses a wireless carrier provider that provides mobile communication services. The wireless carrier provider can be a cellular carrier provider, and can provide communications through use of GSM (Global System for Mobile Communications), GPRS (General Packet Radio Service), CDMA (Code-Division Multiple Access), etc. In some embodiments, the data management hub 1002 is connected to a land communications network that provides internetwork connectivity (e.g., Internet connectivity). The data management hub 1002 can also include connections between various components of the data management hub 1002. These connections can use short-range wireless communications (SRWC) such as Wi-Fi™ and/or Bluetooth™, and/or may use local wired connections, such as Ethernet. In some embodiments, a SRWC connection can be established between the data management hub 1002 and the vehicle occupant detection system 1010.

In one embodiment, the data management hub 1002 can be located at a customer facility and integrated with an IT-environment of the customer's facility as indicated at 1050. In such an embodiment, the data management hub 1002 can be configured for a particular customer of a plurality of customers. The vehicle occupant detection data management system 1000 can include a plurality of data management hubs (e.g., one for each customer) that are each used for managing one or more vehicle occupant detection systems 1006. In at least some of such embodiments, the data management hub 1002 can be configured to serve as a gateway between a backend network and the one or more vehicle occupant detection systems 1006. The backend network can be located remotely from the one or more data management hubs 1002, and can be connected to each of these data management hubs via a remote connection. The backend network can be hosted by a provider of the one or more vehicle occupant detection systems 1006 and can be used to obtain diagnostic information or other operational information concerning the one or more vehicle occupant detection systems 1006 or data management hub(s) 1002 via the remote connection. The backend network can also be used to send out over-the-air updates over the remote connection to these one or more vehicle occupant detection systems 1006 and/or data management hub(s) 1002, and/or the backend network can be used for other maintenance purposes. Thus, in this sense, the data management hub 1002 can report certain information pertaining to the operation of the vehicle occupant detection systems as used by a plurality of customers, for example, to the backend network. Thus, in some embodiments, the backend network can send information (e.g., over-the-air updates) to the one or more vehicle occupant detection systems 1006 via the data management hub(s) 1002.

The vehicle occupant detection data management system 1000 can also include a personal fleet manager device 1020 and a personal driver device 1022. The devices 1020, 1022 each include at least one human machine interface (HMI) and are capable of communicating with the vehicle occupant detection system 1010. Although only a single personal fleet manager device 1020 and a single personal driver device 1022 are shown and discussed, the system 1000 can include any number of each of these devices 1020, 1022. In some embodiments, each of the vehicle occupant detection systems 1006 can be associated with the personal fleet manager device 1020 and the personal driver device 1022. In one embodiment, each of the vehicle occupant detection systems 1006 (or a subset thereof) can be associated with a different personal driver device and the same personal fleet manager device(s) 1020. The personal fleet manager device 1020 and the personal driver device 1022 can each include a processor and memory storing computer instructions. In some embodiments, the devices 1020, 1022 each include a cellular chipset (or other means for remote communications) and can receive messages (e.g., SMS messages) from the vehicle occupant detection system 1010 and/or the data management hub 1002. In some embodiments, such as the illustrated embodiment of FIG. 25, these devices 1020, 1022 are personal mobile devices, such as a smartphone or tablet. The at least one HMI of these devices 1020, 1022 can include, for example, one or more of a visual display (e.g., an electronic touchscreen display, other electronic display device), a speaker, a microphone, a light (e.g., a light emitting diode (LED)), and/or a vibrating alert motor (or other vibrator).

Figure 26:
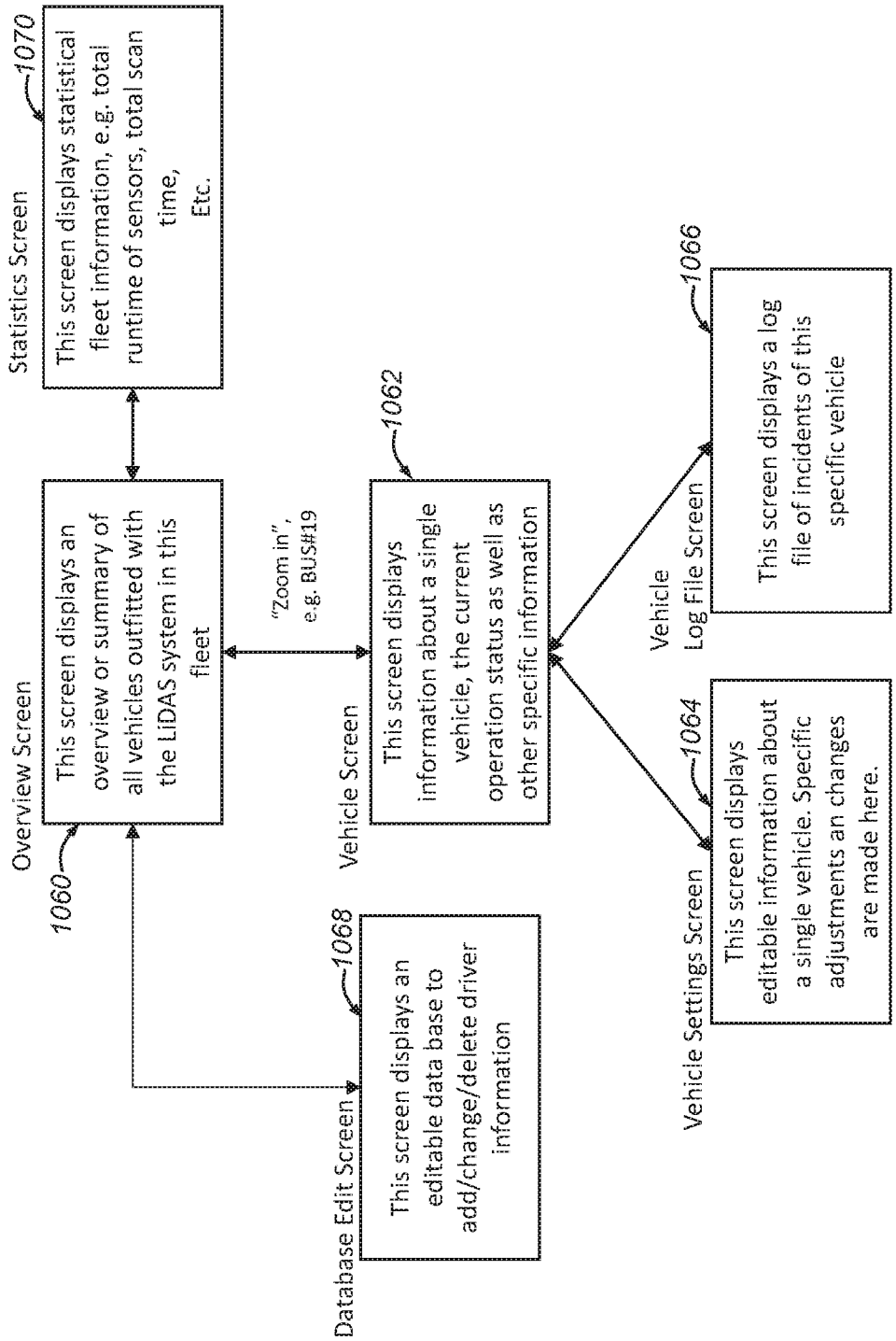
FIG. 26 is a block diagram illustrating an organizational structure of one or more visual screens that can be displayed by the vehicle occupant detection data management system of FIG. 25.

With reference to FIG. 26, there is shown an organizational structure of one or more visual screens that can be displayed at the data management hub 1002 as part of the data management hub interface 1014. In at least some embodiments, the data management hub interface 1014 is a graphical user interface (GUI) that is displayed on a visual display (e.g., a liquid crystal display (LCD), other electronic display) of or at the data management hub 1002. In some embodiments, the visual display can be a touchscreen that enables the data management hub interface 1014 to receive user input. In other embodiments, the visual display can be connected to a computer that also includes other human-machine interfaces (HMIs), such as a keyboard and/or mouse. Various forms of HMIs can be used to obtain input from a user or to provide output to a user.

In one embodiment, the data management hub interface 1014 is a GUI that includes an overview screen 1060, a vehicle screen 1062, a vehicle settings screen 1064, a vehicle log file screen 1066, a database edit screen 1068, and/or a statistics screen 1070. Any one or more of these screens can include one or more input buttons (e.g., graphical buttons that can receive input via a click by a mouse or a touch on a touchscreen), one or more input text fields (i.e., text fields to input alphabetic and/or numeric characters (referred to herein collectively as alphanumeric characters)), tables (e.g., editable tables), radio buttons, check boxes, combo boxes, sliders, graphics, dialog boxes, etc. The graphics can include color changing elements, videos, pictures, screenshots, other images, symbols, trend charts or other charts/graphs, etc. Any one or more of the screens 1060-1070 can include navigation buttons (or other inputs) that allow a user to navigate between screens. For example, the overview screen 1060 can include a "STATISTICS SCREEN" button that, when operated (e.g., clicked), the data management hub interface 1014 then switches from the overview screen 1060 to the statistics screen 1070.

The overview screen 1060 can provide an overview or summary of one or more vehicle occupant detection systems 1006 of the fleet of vehicles 1004. The overview screen 1060 can include or indicate the current operation status of each of the vehicle(s) and/or vehicle occupant detection system(s) in the fleet of vehicles 1004 (e.g., the vehicle occupant detection system is currently scanning, awake, sleeping, or some other state as discussed above including those of an occupant detection scanning process; the vehicle is driving or stopped), a result of one or more occupant detection scanning processes at the one or more vehicle occupant detection systems 1006, the next schedule scan or occupant detection scanning process (or a list of scheduled scans or occupant detection scanning processes) for the one or more vehicle occupant detection systems 1006, driver contact information (e.g., a driver name, a driver phone number), a status of one or more (or each) of the life detection sensors (e.g., an indicator indicating that a sensor is operational or not operational) for each of the one or more vehicle occupant detection systems 1006, a communication status (e.g., whether the data management hub 1002 is connected to each of the one or more vehicle occupant detection systems 1006), inputs (e.g., a button that initiates a scan (or occupant detection scanning process) at each of the one or more vehicle occupant detection systems 1006), and/or information concerning one or more recent life detected events (i.e., events in which an occupant (or lifeform) was detected at one of the vehicle occupant detection systems 1006). In one embodiment, the overview screen 1060 can include a listing of the fleet of vehicles (or the one or more vehicle occupant detection systems 1006), and each of these listed items can be selectable (or an associated graphic/input mechanism). When selected, the vehicle or vehicle occupant detection system that was selected can then be used for directing the data management hub interface 1014 to a vehicle screen for that selected vehicle and/or vehicle occupant detection system. For example, as shown in FIG. 26, when BUS #19 is selected, the data management hub interface 1014 can transition from the overview screen 1060 to the vehicle screen 1062, which can then be populated with information specific to the selected vehicle or BUS #19 in this example.

The vehicle screen 1062 provides information specific to a single vehicle or vehicle occupant detection system, such as the current operation status of the vehicle occupant detection system. The discussion below refers to the "selected vehicle," which refers to either a selected vehicle or a selected vehicle occupant detection system. The vehicle screen 1062 can include a current status of the vehicle or vehicle occupant detection system, the type of vehicle (e.g., model, model year), current or most recent sensor status for one or more of the life detection sensors of the vehicle occupant detection system of the selected vehicle, a time and result of the last or most recent scan or occupant detection scanning process of the selected vehicle, the next schedule scan or occupant detection scanning process (or a list of scheduled scans or occupant detection scanning processes) of the selected vehicle, current driver information (e.g., driver contact information) of the selected vehicle, information concerning one or more recent life detected events, various vehicle statistics (e.g., system run time, scan run time, total number of scans) of the selected vehicle, and/or diagnostic information concerning the selected vehicle. In one embodiment, a user (e.g., fleet manager) can navigate to the vehicle screen 1062 from the overview screen 1060 by selecting a vehicle (or vehicle occupant detection system) from a listing of the vehicles (or vehicle occupant detection systems) in the fleet 1004. Once selected, the vehicle screen can be populated with information pertaining to that selected vehicle (or vehicle occupant detection system). The vehicle screen 1062 can enable a user to navigate to the vehicle settings screen 1064 and the vehicle log file screen 1066. Input from an onscreen button or other input can be used to indicate that a user desires to navigate from the vehicle screen 1062 to the vehicle settings screen 1064 or the vehicle log file screen 1066. In one embodiment, the vehicle screen 1062 can include any one or more of those screens 500-560 discussed above.

The vehicle settings screen 1064 can provide for settings or options for a particular vehicle or vehicle occupant detection system, which can be the selected vehicle to which the vehicle screen 1062 pertains. In another embodiment, the vehicle settings screen 1064 can be navigated to directly from the overview screen (or another screen), and can be done so through receiving an input from a user that specifies a particular vehicle (or vehicle occupant detection system) of the fleet of vehicles 1004. The vehicle settings screen 1064 can enable a user to edit or modify settings or options pertaining to a particular vehicle (or vehicle occupant detection system), such as a time to initiate a night scan or occupant detection scanning process (or other periodic scan or occupant detection scanning process), a body of an automatic message, wake up times for the vehicle occupant detection system, driver assignment information (i.e., information indicating or identifying a particular individual as being the driver for a particular day/time period), vehicle-specific parameters (e.g., scan times, exit times, wait times), and/or alternative contact information (e.g., phone number or other contact information for one or more individuals responsible or deemed responsible for managing the vehicle (or vehicle occupant detection system)). This vehicle settings screen 1064 can be or include any of those features of the settings screen discussed above with respect to the driver user interface 443 or otherwise.

The vehicle log file screen 1066 is used to access one or more log files concerning a vehicle. As described above, in one embodiment, the vehicle log file screen 1066 can be accessed from the vehicle settings screen 1062. The log files of the vehicle log file screen 1066 can be those log files discussed above, or any other file or collection of data concerning the operation of the vehicle occupant detection system (and/or the vehicle). The log file(s) can include logged information concerning one or more occupant detection scanning processes carried out by the vehicle occupant detection system, concerning one or more recent life detected events, entries concerning the changing/modification of settings for the selected vehicle, etc.

Although the vehicle settings screen 1064 and the vehicle log file screen 1066 are discussed as being specific to a particular vehicle (or vehicle occupant detection system), in other embodiments, either or both of these screens can be general to the entire fleet 1004, or specific to a subset thereof (i.e., one or more vehicles (or vehicle occupant detection systems) of the fleet 1004). Also, in one embodiment, a fleet settings screen can be used that allows a user to view, change, and/or modify various settings for the fleet of vehicles (or a subset thereof) all at once. Likewise, in one embodiment, a fleet log file screen can be used that allows a user to view various log file(s) (or a listing thereof, or other information pertaining thereto) for the fleet of vehicles (or a subset thereof) all at once.

The database modification screen 1068 enables a user to add, edit, delete, or otherwise change certain driver information, such as driver contact information (or other information pertaining to one or more personal driver devices) and assignment information. In some embodiments, the database modification screen 1068 enables a user to assign a driver to a vehicle (or to indicate the assignment of a driver to a particular vehicle), and allows a user to add new drivers, delete drivers, and/or change information concerning the drivers, such as the contact information of the drivers (e.g., phone numbers, email, username). The database modification screen 1068 can also enable a user to add, edit, delete, or otherwise change certain user information of users other than those that are drivers. For example, the database modification screen 1068 enables a user to modify information pertaining to a fleet manager and/or personal fleet manager device.

The statistics screen 1070 displays statistics or metrics concerning the fleet of vehicles 1004 and/or the one or more vehicle occupant detection systems 1006. The statistics screen 1070 can display statistics in the form of tables, charts, plots, other graphs, etc. Various statistics can be obtained based on information received from the fleet of vehicles 1004 and/or the one or more vehicle occupant detection systems 1006. For example, the statistics can pertain to the total runtime of the sensors during a scan (or occupant detection scanning process) (or the average runtime of the sensors during a scan or occupant detection scanning process), the total time of an occupant detection scanning process, total system runtime, total number of scans (or occupant detection scanning processes), status of the life detection sensors, life detected events, etc.

With reference to FIG. 27, there is shown an embodiment of the vehicle screen 1062 of the data management hub interface 1014 that can be used as a part of the data management hub 1002. The exemplary vehicle screen 1062 of FIG. 27 includes a first portion (or sensor overview portion) 1074 and a second portion (or system status message portion) 1076. Although the sensor overview portion 1074 and the system status message portion 1076 are depicted as being a part of a single screen, in other embodiments, these portions 1074, 1076 can be a part of different screens. The sensor overview portion 1074 may be used to view the status of one or more life detection sensors of the vehicle occupant detection system. In one embodiment, the sensor overview portion 1074 can include any one or more of those screens 500-560 (FIGS. 13-16) discussed above. Also, in one embodiment, the sensor overview portion 1074 can include a confirmation button 1084. This confirmation button 1084 is similar to the confirmation buttons 542, 562, but can be used to provide an occupancy presence fleet manager confirmation, which is an occupancy presence confirmation that is directed to a fleet manager. In other embodiments, other human machine interface (HMI) input devices at the data management hub interface 1014 can be used to provide this occupancy presence fleet manager confirmation, such as a physical pushbutton or voice input that is received by a microphone. The occupancy presence fleet manager confirmation can be used to confirm that a fleet manager is aware of the scan result (or other status) of the vehicle occupant detection system.

Also, in some embodiments, the sensor overview portion 1074 can include a personal fleet manager device display portion 1080 and a personal driver device display portion 1082. The personal fleet manager device display portion 1080 includes one or more dialog or text boxes that form or represent a conversation (or a series of messages) between the vehicle occupant detection system (or the data management hub 1002) and the personal fleet manager device 1020. The personal driver device display portion 1082 includes one or more dialog or text boxes that form or represent a conversation (or a series of messages) between the vehicle occupant detection system (or the data management hub 1002) and the personal driver device 1022. The personal devices 1020, 1022 can be sent SMS messages (or other messages) that are used to inform the fleet manager or driver of a status of the vehicle occupant detection system. These messages can be displayed on the respective portions 1080, 1082 so that a user of the data management hub 1002 can view the communications or messages sent to the devices 1020, 1022.

The system status message portion 1076 includes a message information portion 1090 and a vehicle dialog portion 1092. In the illustrated embodiment, the message information portion 1090 includes information that is received at the data management hub 1002 as a part of a scan result message of one of the one or more vehicle occupant detection systems 1006. In some embodiments, the message information portion 1090 can display information pertaining to the last message received from the vehicle occupant detection system, or a selected message that is selected by, for example, touching a message in the vehicle dialog portion 1092. In such an example, once a user touches a message in the vehicle dialog portion 1092, the message information portion 1090 can be populated with information of that selected message, such as information in the body of the message and/or metadata. The scan results message includes information concerning a result of an occupant detection scanning process, including, for example, a time of compiling or sending the scan result message, a time of performing or starting the occupant detection scanning process, a scan result (e.g., NO CHILD DETECTED), a next scan schedule time (i.e., a next scheduled time of an occupant detection scanning process), the total number of scans (or occupant detection scanning processes) performed by the vehicle (e.g., "414" in the illustrated embodiment), a run time of the occupant detection scanning process (or a part thereof, such as the time of performing the scans by the life detection sensors), a next reboot time of the vehicle occupant detection system (or part thereof), a diagnosis level (e.g., "254" in the illustrated embodiment), a qualifier (e.g., "11" in the illustrated embodiment), a data set indicator (e.g., "14" in the illustrated embodiment), a processor temperature (e.g., "57.5 C" in the illustrated embodiment), an automatic fleet manager message flag (i.e., a flag indicating whether the message is also automatically sent to a personal fleet manager device), an automatic provider message flag (i.e., a flag indicating whether the message is also automatically sent to a provider of the vehicle occupant detection system), an enabled field, a responsive field, a detected field, a last incident date (i.e., a date and/or time when an occupant was last detected by the vehicle occupant detection system), and a last incident file (i.e., a file that includes information (such as information that would be included in the scan result message) pertaining to the last scan in which an occupant (or lifeform) was detected). The scan result message can include a subset of that information discussed above and/or other information as well, such as any of that information obtained in the occupant detection scanning process.

The vehicle dialog portion 1092 of the system status message portion 1076 includes one or more dialog or text boxes that form or represent a conversation (or a series of messages) between the vehicle occupant detection system or vehicle (e.g., "Bus 27" in the example of FIG. 27) and the data management hub 1002. This vehicle dialog portion 1092 is similar to the personal fleet manager device display portion 1080 and that discussion is incorporated herein to the extent it is not inconsistent with other features/discussion specifically regarding the system status message portion 1076. As shown in FIG. 27, the vehicle dialog portion 1092 shows the last received message (or scan result message) that was received from the vehicle occupant detection system of a vehicle, which is "Bus 27" in this example. The vehicle dialog portion 1092 can include other dialog or text boxes that includes any one or more of the messages sent between the data management hub 1002 and the vehicle occupant detection system. In one embodiment, the vehicle dialog portion 1092, the personal fleet manager device display portion 1080, and/or the personal driver device display portion 1082 can be scrollable (e.g., by sliding a finger on a touchscreen, using a scroll-wheel of a mouse) so as to allow a user to view older/newer messages in the conversation.

Figure 28:
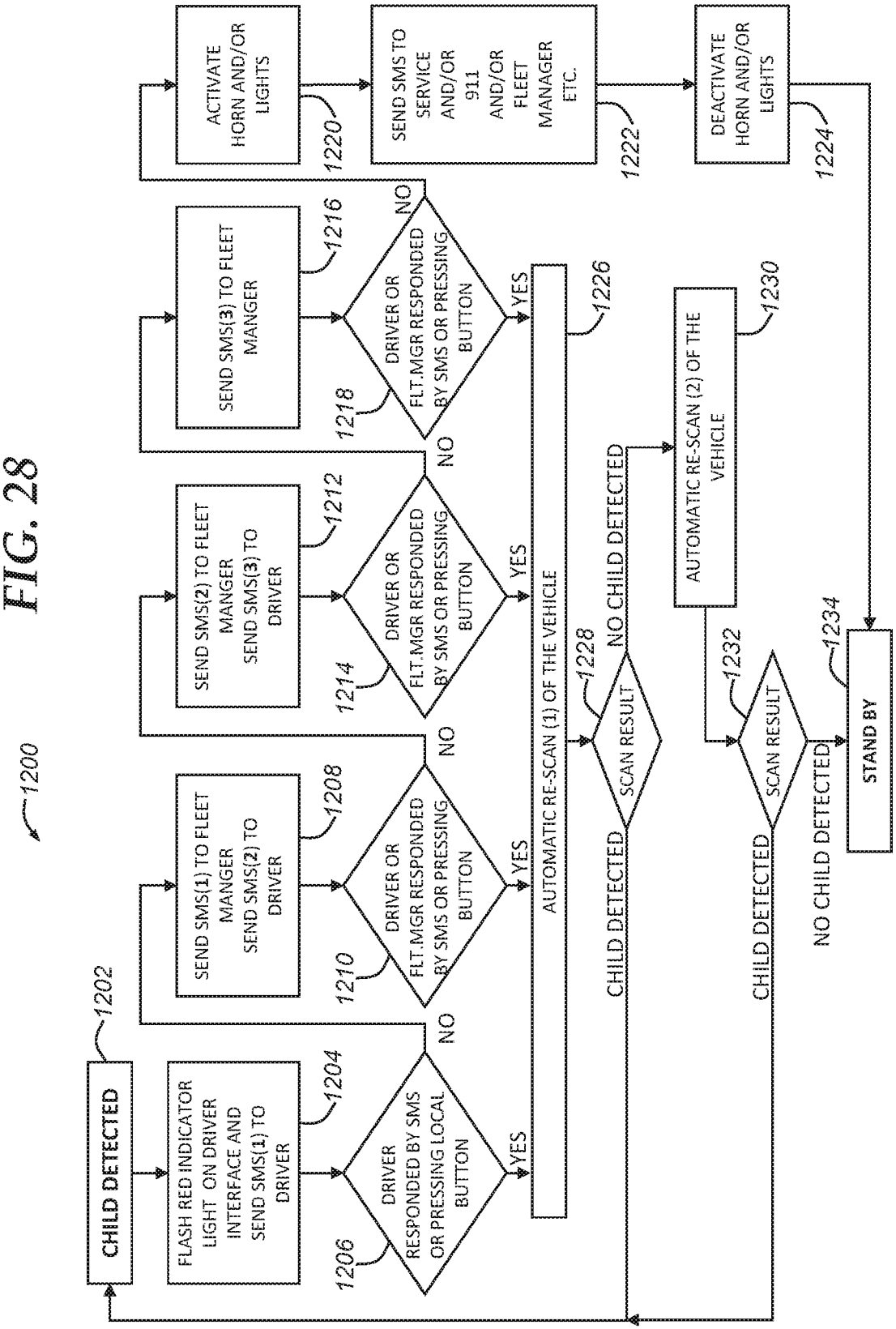
FIG. 28 is a flowchart illustrating an embodiment of an alarm escalation process that can be carried out by the vehicle occupant detection system according to one embodiment.

With reference to FIG. 28, there is shown an embodiment of an alarm escalation process 1200. Although the process 1200 is discussed with respect to the vehicle occupant detection system 1010, the method 1200 can be used with various other occupant detection systems, including the vehicle occupant detection system 10, the vehicle occupant detection system 210, the vehicle occupant detection system 410, and the vehicle occupant detection system 610.

The process 1200 begins with step 1202 where an occupant (or lifeform) has been detected by the vehicle occupant detection system. The process 1200 then continues to step 1204, where a local warning system (e.g., local warning system 18) provides an indication that an occupant (or lifeform) has been detected. Step 1204 is carried out in response to determining that an occupant (or lifeform) has been detected. In the illustrated embodiment, the local warning system flashes a red LED indicator on a driver interface, such as the driver interface 443. Also, in some embodiments, in response to determining that an occupant (or lifeform) has been detected, a remote warning system (e.g., remote warning system 20) sends an occupant-detected message (or first occupant-detected message) to a personal driver device, such as the personal driver device 1022. The occupant-detected message is a message that indicates that an occupant (or lifeform) has been detected by the vehicle occupant detection system or as a part of the occupant detection scanning process. The occupant-detected message can be a short message service (SMS) message or other text message. In the illustrated embodiment, this step includes sending a first occupant-detected driver message. An occupant-detected driver message is an occupant-detected message that is directed to the driver. The process 1200 then continues to step 1206.

In step 1206, a determination is made as to whether an occupancy presence driver confirmation is received. The occupancy presence driver confirmation can be received by the driver pressing a particular button on a driver interface at the vehicle or vehicle occupant detection system, such as the confirmation button 562. Alternatively, the occupancy presence driver confirmation can be received as a result of the personal driver device (to which the message was sent in step 1204) sending a response message to the vehicle occupant detection system. In one embodiment, the occupancy presence driver confirmation can be received as a particular response message that includes a message body being or including a particular word or phrase, such as "CONFIRMED". When it is determined that an occupancy presence driver confirmation is received, the process 1200 continues to step 1226; otherwise, when a first predetermined amount of time passes and no occupancy presence driver confirmation has yet been received, the process 1200 continues to step 1208.

In step 1208, a remote warning system provides an indication that an occupant (or lifeform) has been detected. In the illustrated embodiment, this step includes sending a second occupant-detected message to a personal fleet manager device and a personal driver device. In the illustrated embodiment, this step includes sending a second occupant-detected driver message and a first occupant-detected fleet manager message, which is an occupant-detected message directed to a fleet manager. However, according to various embodiments, this step can include sending an occupant-detected message to the personal fleet manager device, the personal driver device, and/or one or more various other devices or components of the system, such as the data management hub 1002. The process 1200 continues to step 1210.

In step 1210, a determination is made as to whether an occupancy presence confirmation is received. The occupancy presence confirmation can be received from a driver or a fleet manager, and may be an occupancy presence driver confirmation or an occupancy presence fleet manager confirmation. The occupancy presence driver confirmation can be received in any suitable manner, such as those described above with respect to step 1206. The occupancy presence fleet manager confirmation can be received in a like manner, but from a device used by the fleet manager, such as the personal fleet manager device 1020, an HMI of the data management hub 1002, etc. When it is determined that an occupancy presence confirmation is received, the process 1200 continues to step 1226; otherwise, when a second predetermined amount of time passes and no occupancy presence confirmation has yet been received, the process 1200 continues to step 1212.

In step 1212, a third occupant-detected message is sent. Step 1212 is similar to step 1208, except that a third occupant-detected driver message is sent to a driver and a second occupant-detected fleet manager message is sent to a fleet manager. The process 1200 continues to step 1214. In step 1214, a determination is made as to whether an occupancy presence confirmation is received. This step is similar to step 1210. When it is determined that an occupancy presence confirmation is received, the process 1200 continues to step 1226; otherwise, when a third predetermined amount of time passes and no occupancy presence confirmation has yet been received, the process 1200 continues to step 1216.

In step 1216, a fourth occupant-detected message is sent. Step 1216 is similar to step 1208, except that a third occupant-detected fleet manager message is sent to a fleet manager. In some embodiments, step 1216 can include sending a fourth occupant-detected driver message to a driver, or may not include sending an occupant-detected driver message to a driver. The process 1200 continues to step 1218. In step 1218, a determination is made as to whether an occupancy presence confirmation is received. This step is similar to step 1210. When it is determined that an occupancy presence confirmation is received, the process 1200 continues to step 1226; otherwise, when a fourth predetermined amount of time passes and no occupancy presence confirmation has yet been received, the process 1200 continues to step 1220.

In step 1220, at least one HMI output device of the local warning system provides an output. In the illustrated embodiment, the local warning system can activate a horn of the vehicle and flash or operate lights (e.g., emergency flashers, headlights) of the vehicle. Various HMI output devices are discussed herein as a part of the local warning system, and any of those devices can be used in providing the output. The output can be provided or tailored so as to draw a passerby's attention to the vehicle. The process 1200 continues to step 1222.

In step 1222, the remote warning system provides a message to (or otherwise contacts) a remote device. In one embodiment, the remote warning system sends a message to an emergency services service or another monitoring service. Additionally or alternatively, an emergency medical services (EMS) notification, such as those discussed above, can be provided. Additionally or alternatively, a fleet manager or other designated individual can be contacted, such as by sending an SMS message to a device of the fleet manager or other designated individual. Any of the messages sent in steps 1204, 1208, 1212, 1216, and/or 1222 can be an occupant-detected message, a scan result message, or message including other information pertaining to the vehicle occupant detection system and/or an occupant detection scanning process. The process 1200 continues to step 1224.

In step 1224, the at least one HMI output device of the local warning system is deactivated. In at least some embodiments, this step can be carried out in response to determining that the occupant-detected message (or other message) was successfully sent in step 1222. In other embodiments, this step can be carried out in response to a timer expiring, where the timer begins at step 1220 and is set to a fifth predetermined amount of time. The process 1224 continues to step 1234, where the vehicle occupant detection system is set to a standby mode (or low power mode or sleep mode).

In step 1226, an occupant detection scanning process is carried out. This occupant detection scanning process (or first rescan process) can be used to ensure that the detected occupant (see step 1202) and/or other occupants are no longer present on the vehicle or in a life detection zone. This step can be carried out automatically in response to any of the determinations made in steps 1206, 1210, 1214, and 1218. In step 1228, when an occupant is detected as a result of this occupant detection scanning process, the process 1200 continues back to step 1202; otherwise, the process 1200 continues to step 1230.

In step 1230, an occupant detection scanning process is carried out. This occupant detection scanning process is a second rescan process. This step is similar to step 1226 and that discussion is incorporated herein. In step 1232, when an occupant is detected as a result of this occupant detection scanning process, the process 1200 continues back to step 1202; otherwise, the process 1200 continues to step 1234. In some embodiments, steps 1230-1232 can be omitted and, in step 1228, when no occupant is detected as a result of this occupant detection scanning process, the process 1200 continues to step 1234. Any number of rescan processes (e.g., steps 1226 and 1228, steps 1230 and 1232) can be carried out. The number of rescans can be adjusted for each vehicle occupant detection system in the vehicle settings screen 1064 (FIG. 26), for example. Also, any one or more of the steps (e.g., steps 1204-1218) can be omitted or repeated, and details of the alarm escalation process (e.g., which individuals or devices are contacted in steps 1204, 1208, 1212, and/or 1216) can be adjusted or modified based on input received on the vehicle settings screen 1064, driver interface 443, and/or other input HMI of the vehicle occupant detection system and/or data management hub. In some embodiments, each of the predetermined amount of times in the process 1200 (i.e., the first through fifth predetermined amount of time) can be equal to one another, different from one another, or a combination thereof (e.g., some can be the same and others can be different). Also, in some embodiments, the vehicle settings screen 1064 can be used to specify any one or more of the predetermined amount of times in the process 1200.

Figure 29:
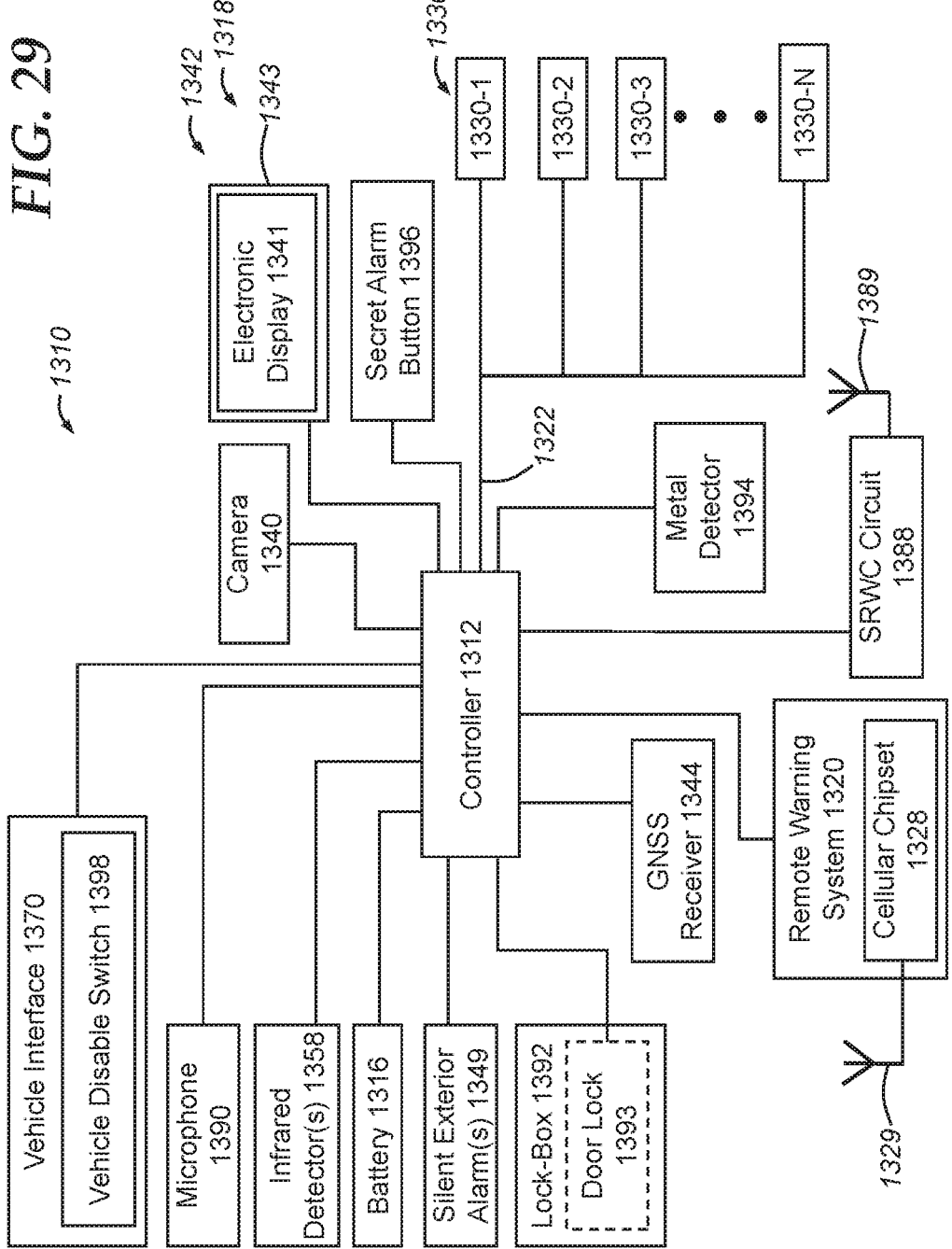
FIG. 29 is a block diagram depicting a fifth embodiment of a vehicle occupant detection system.

With reference to FIG. 29, there is shown a fifth embodiment of a vehicle occupant detection system 1310. The vehicle occupant detection system 1310 includes an electronic control unit (ECU) or controller (referred to herein as "controller") 1312, a battery 1316, a local warning system 1318, a remote warning system 1320 including a cellular chipset 1328, a sensor interface 1322, one or more life detection sensors 1330, at least one camera 1340, an electronic display device 1341 that displays the driver interface 1343, a global navigation satellite system (GNSS) receiver 1344, at least one silent exterior alarm device 1349, at least one infrared detector 1358, a vehicle interface 1370 having a vehicle disable switch 1398, a short range wireless communications (SRWC) circuit 1388, at least one microphone 1390, a lock box 1392 having an electronically-controlled door lock 1393, a metal detector 1394, and a secret alarm button 1396. The local warning system 1318 includes an interior alarm device 1342 that comprises a driver interface 1343 which may be implemented using an electronic display device 1341 that presents a graphical user interface (GUI) for interior alarms and other notifications to the driver, as well as to receive driver input. The components of FIG. 29 that include similar reference numerals to those of FIGS. 1, 9, 12, and/or 17 denote like elements, and the description of those like components will not be repeated here for the sake of brevity. For example, controller 1312 is analogous or corresponds to the controller 12, 212, 412, 612 of the vehicle occupant detection system 10, 210, 410, 610 (FIGS. 1, 9, 12, and 17, respectively), and the plurality of life detection sensors 430 are analogous or corresponds to the plurality of life detection sensors 30, 230, 430, 630 of the vehicle occupant detection system 10, 210, 410, 610 (FIGS. 1, 9, 12, and 17, respectively). It should be appreciated that any technically-feasible combination of the components of the vehicle occupant detection system 10, the vehicle occupant detection system 210, the vehicle occupant detection system 410, the vehicle occupant detection system 610, and/or the vehicle occupant detection system 1310 can be used, according to various embodiments.

The controller 1312 includes a processor and memory, such as any of those described above with respect to controllers 12, 212, 412, and 612. The controller 1312 can include random-access memory (RAM) or the like, and may additionally include read-only memory (ROM) or other non-volatile memory. The non-volatile memory may be housed in the same housing of the processor of the controller 1312, or may be housed in a separate device that is communicatively coupled to the controller 1312 such that the controller 1312 may access contents of the non-volatile memory. The controller 1312 is used to perform various operations, such as those that are used to carry out various functionality described herein. These operations may be stored in memory of the controller 1312 as computer instructions, and may be packaged into one or more different files. These different files may be stored in different memory locations or even separate memory of the vehicle occupant detection system 1310. The processor of the controller 1312 executes the computer instructions to carry out various operations of the vehicle occupant detection system 1310, such as those described below. It should be appreciated that while FIG. 29 only shows a single controller, any suitable number of controllers can be used. Also, although a particular arrangement of the controller 1312 and the other components to which it is connected is shown, any suitable arrangement may be used.

Each of the infrared detector(s) 1358 captures infrared sensor data, which can then be used to detect the presence of a human or other lifeform. At least in some embodiments, each of the infrared detector(s) 1358 is a passive infrared detector (PIR), such as those that have a pair of pyroelectric sensors that are used to detect heat energy (or infrared radiation) in the surrounding environment. However, in other embodiments, the infrared detector(s) 1358 may be active infrared detectors, which include a transmitter and a receiver. Also, according to some embodiments, each of the infrared detector(s) 1358 may be mounted or positioned at the vehicle so that a field of view of the infrared detector 1358 faces an entryway of the vehicle, such as a door or other entryway (e.g., a primary entryway that is next to the driver's seat of a bus and emergency exits that are positioned in the ceiling or roof of a bus or at the rear of the bus). In one embodiment, one or more entryways have a single infrared detector 1358 positioned to face the entryway so as to detect infrared radiation, which may be used to detect the presence of a human being or other animal or lifeform. In other embodiments, any one or more of the entryways may have more than one infrared detector 1358 positioned to face the entryway so as to detect infrared radiation. Each of the at least one infrared detector 1358 is communicatively coupled to the controller 1312, such as by way of a wired connection or a wireless connection (e.g., via a connection with SRWC circuit 1388 that utilizes, for example, Bluetooth™, Wi-Fi™, Z-Wave™, or other SRWC technique).

The infrared detector(s) 1358, the controller 1312, or other component of the vehicle occupant detection system 1310 can be configured to determine whether a human or other lifeform is present based on infrared sensor data that is captured by the infrared detector(s) 1358. For example, the vehicle occupant detection system 1310 can be configured with a predetermined infrared threshold or pattern that is used to compare to the infrared sensor data obtained by the infrared detector(s) 1358. In continuing with this example, the infrared sensor data is considered to indicate the presence of a human (or other lifeform) when the infrared sensor data indicates a value (e.g., such as the density or amount of infrared radiation) that exceeds the predetermined infrared threshold.

In one embodiment, when the infrared detector(s) 358 detect the presence of a human or lifeform, then the occupant detection scanning process is carried out. For example, at a time in which the bus is stored (e.g., nighttime), in response to a detection by the infrared detector(s) 358 that an occupant is present on the bus, the vehicle occupant detection system 310 carries out the occupant detection scanning process. The scan result of the occupant detection scanning process can indicate whether the life detection sensors 1330 also detected a lifeform and, if so, the scan result may be used to indicate one or more life detection zones in which the occupant is detected. The scan result and/or the infrared sensor data (or information based thereon) can be sent to a designated individual, such as a fleet manager, a police office, emergency medical service (EMS), or a driver. For example, these results may be sent using cellular chipset 1328 to a personal driver device of a driver that is scheduled to drive the bus next or to a fleet manager. In some embodiments, in response to the infrared detector(s) 358 that an occupant is present on the bus, the vehicle occupant detection system 1310 determines whether the driver is present at the bus and, if so, provides a local notification. In one embodiment, the local notification is provided as a message to the personal driver device, which then displays the messages or otherwise notifies the driver. In one embodiment, the vehicle occupant detection system 1310 determines to send this message based on the presence of the personal driver device and, when it is determined that the personal driver device is present, the scan result and/or the infrared sensor data (or information based thereon) can be sent to the personal driver device using SRWC communications, such as those which are described below.

The short range wireless communication (SRWC) circuit 1388 of the vehicle occupant detection system 1310 enables SRWC messages to be sent and received by the vehicle occupant detection system 1310 using a SRWC protocol or technique, such as Wi-Fi™, Bluetooth™ (including Bluetooth™ Low Energy (BLE)), ZigBee™, Z-Wave™, other IEEE 802.11 techniques, other IEEE 802.15 techniques, infrared communication techniques, etc. The SRWC circuit 1388 includes at least one antenna 1389 and, in some embodiments, includes a plurality of antennas. Use of multiple antennas can enable an angle of arrival (AOA) and/or angle of departure (AOD) of SRWC signals to be determined, which can aid in determining the location of a device relating to the SRWC circuit 1388 (or vehicle occupant detection system 1310). The SRWC circuit 1388 is communicatively coupled to the controller 1312 and, in many embodiments is connected to the controller 1312 via a hardwired connection. The SRWC circuit 1388 may be configured to enable SRWC communications between the controller 1312 and one or more other components of the vehicle occupant detection system 1310, such as the life detection sensors 1330, and/or one or more external components (i.e., those that are not a part of the vehicle occupant detection system 1310).

Figure 31:
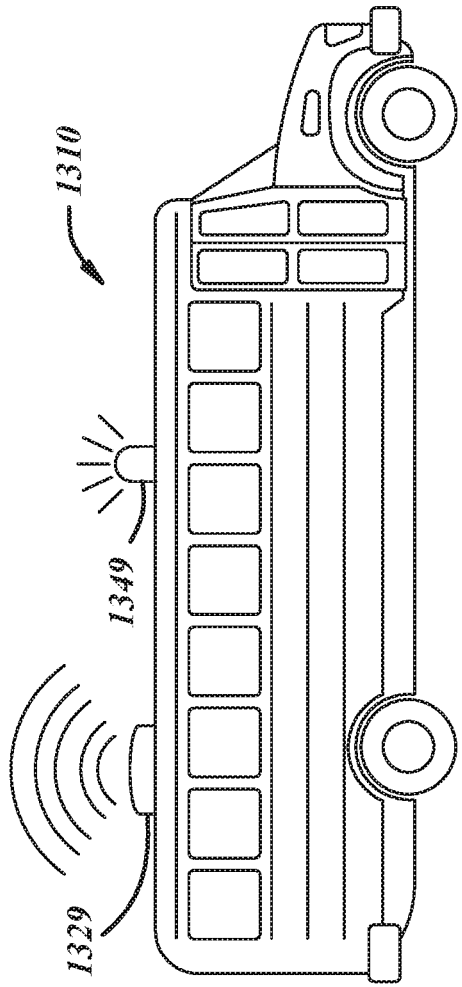
FIG. 31 is a side-view block diagram depicting various components used as a part of the fifth embodiment of the vehicle occupant detection system of FIG. 29 according to one embodiment.

The cellular chipset 1328 includes an antenna 1329 through which cellular and/or other wireless signals can be transmitted and received. The GNSS receiver 1344 includes an antenna 1345, which is used by the GNSS receiver to receive GNSS signals from one or more GNSS satellites. As shown in FIG. 31, the antennas 1329, 1345 may be provided on the top of the roof of the bus or vehicle, and may include a weather-proof housing. Moreover, the antennas 1329 may be housed in a common housing, such as is shown in FIG. 31, or may include separate housings.

The vehicle occupant detection system 1310 includes at least one camera 1340 and at least one microphone 1390. The discussion of camera 240 is incorporated herein. The camera(s) 1340 can include one or more driver cameras that have a field of view that is directed to a driver location (e.g., driver's seat), one or more entryway cameras that have a field of view that is directed to an entryway of the vehicle, one or more passenger cameras that have a field of view that is directed to a passenger location (e.g., passenger seats, such as those within life detection zone(s)), and/or one or more exterior cameras that have a field of view that is directed to an area external to the vehicle. The exterior camera(s), at least in some embodiments, may be mounted to the exterior of the vehicle. The camera(s) 1340 can be used for capturing image data, which can be streamed to a local or remote device and/or which can be saved in memory of the vehicle occupant detection system 1310 and/or at a local or remote device that is separate from the vehicle occupant detection system 1310.

The microphone(s) 1390 can be any of a variety of types of microphones, and are each used to capture audio data. The microphone(s) 1390 may be used to capture audible sounds of the driver or one or more other passengers of the vehicle and these audible sounds as captured may be referred to as audio data. The microphone(s) 1390 may be located at the front, middle, and/or rear of the passenger compartment of the bus. The audio data can be streamed to a local or remote device and/or which can be saved in memory of the vehicle occupant detection system 1310 and/or at a local or remote device that is separate from the vehicle occupant detection system 1310. Each of the camera(s) 1340 and the microphone(s) 1390 are communicatively coupled to the controller 1312. This can include wired connections and/or wireless connections, such as through the use of an SRWC connection with the SRWC circuit 1388 (or other SRWC circuit).

The microphone(s) 1390 may be standalone microphone(s) and not integrated with another sensor, or may be integrated with another device. According to some embodiments, any one or more of the microphone(s) 1390 may be included as a part of single device along with the camera(s) 1340.

Figure 30:
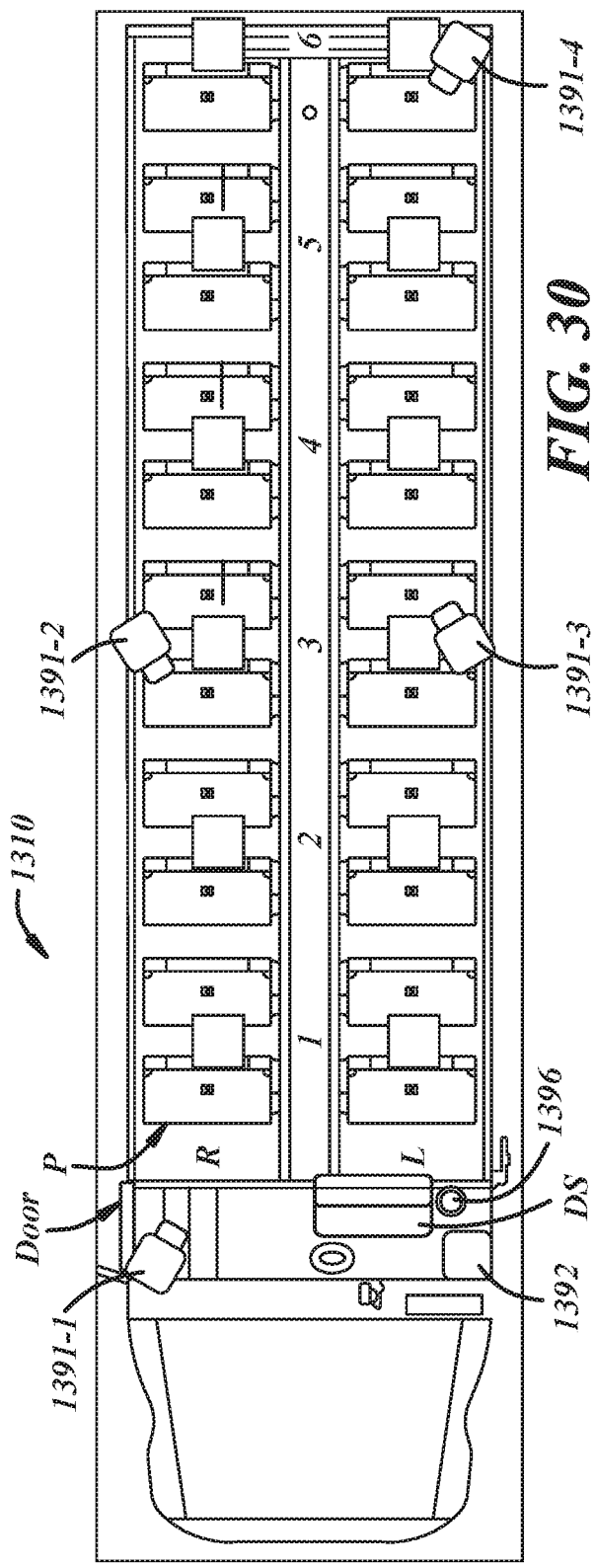
FIG. 30 is a top-view block diagram depicting various components used as a part of the fifth embodiment of the vehicle occupant detection system of FIG. 29 according to one embodiment.

For example, as shown in FIG. 30, there is shown a plurality of camera-microphone packages 1391, including a first camera-microphone package 1391-1, a second camera-microphone package 1391-2, a third camera-microphone package 1391-3, and a fourth camera-microphone package 1391-4. As used herein, a "camera-microphone package" is a single device that integrates at least one camera(s) 1340 and at least one microphone(s) 1390. Each of these camera-microphone packages 1391-1, 1391-2, 1391-3, 1391-4 includes at least one camera 1340 and at least one microphone 1390. Each of the camera-microphone packages 1391-1, 1391-2, 1391-3, 1391-4 are mounted on the ceiling of the interior passenger compartment of the bus. The first camera-microphone package 1391-1 is provided above the door and faces toward the passenger seating area P of the bus in a direction extending toward the back or rear of the bus. The second camera-microphone package 1391-2 is provided above a middle portion of the passenger seating area and faces toward the passenger seating area P of the bus in a direction extending toward the front of the bus. The third camera-microphone package 1391-3 is provided above a middle portion of the passenger seating area and faces toward the passenger seating area P of the bus in a direction extending toward the back or rear of the bus. The fourth camera-microphone package 1391-4 is provided above a rear portion of the passenger seating area and faces toward the passenger seating area P of the bus in a direction extending toward the front of the bus. A different number of cameras, microphones, and/or camera-microphone packages may be used, and the configuration, such as the mounting position, of the cameras, microphones, and/or camera-microphone packages may be selected or adjusted in accordance with the particular application in which the vehicle occupant detection system 1310 is provided, as the embodiment provided in FIG. 30 is but one example.

In one embodiment, in response to detecting a human or other lifeform at the vehicle, such as through the use of the infrared detector(s) 1358 and/or the life detection sensor(s) 1330, audio data and/or image data is then captured using the microphone(s) 1390 and/or the camera(s) 1340. The audio data and/or image data may then be saved locally at the vehicle occupant detection system 1310, and/or uploaded to an external device, such as the personal driver device or a remote computer. For example, the audio data and/or image data can be streamed to a remote computer (e.g., a personal fleet manager device) so that a remote user may view an area within and/or surrounding the bus and/or listen to the audio obtained by the microphone(s) 1390. As used herein, a video stream refers to a stream of image data that is sent to a device and visually displayed at the device. And, as used herein, an audio stream refers to a stream of audio data that is sent to a device and audibly presented at the device. An audio stream and/or video stream may be provided in response to the detection of a human or lifeform at the vehicle, such as during a time after a vehicle trip or a time in which the vehicle is being stored (e.g., at nighttime for a school bus).

In some embodiments, the driver interface 1343 is connected to the controller 1312 via the SRWC circuit 1388. In one of such embodiments, the driver interface 1343 may be implemented on a mobile device, such as a tablet or other handheld mobile device. However, in other embodiments, the driver interface 1343 may be hardwired to the controller 1312. The mobile device that implements the driver interface 1343 includes the electronic display device 1341 that displays the driver interface GUI. The electronic display device 1341 can be a touchscreen, and/or may include various other human-machine interfaces.

The lock box 1392 is a safe that includes a storage compartment, a door that provides access to the compartment when opened, one or more walls that (together with the door) define the storage compartment, and an electronically-controlled door lock 1393 that locks the door so that the contents of the storage compartment are secured. The lock-box 1392 can be used for storing certain instruments that may be useful during certain events at the bus. For example, the lock-box 1392 may store non-lethal defense mechanisms, such as a taser or pepper spray. In one embodiment, the controller sends an unlock signal to the electronically-controlled door lock 1393, which disengages a locking mechanism thereby permitting access to the storage compartment. In one embodiment, a remote unlock signal is sent from a remote computer to the vehicle occupant detection system 1310 via the cellular chipset 1328. The remote unlock signal then instructs (or requests) that the electronically-controlled door lock 1393 be disengaged the locking mechanism thereby permitting access to the storage compartment. In another embodiment, a local unlock signal is sent from a local device (e.g., the driver interface 1343, the personal driver device 1022) that causes the locking mechanism of the electronically-controlled door lock 1393 to become disengaged thereby permitting access to the storage compartment. The lock-box 1392 may also have buttons (or other HMI) that permit a local user to manually enter a code or otherwise convey an authorization that then causes the locking mechanism of the electronically-controlled door lock 1393 to become disengaged thereby permitting access to the storage compartment. The lock-box 1392 can be located proximate to the driver's seat (or other driver location), such as is shown in FIG. 30, and permanently attached to the vehicle (i.e., so that it may not be removed or at least not removed readily, without damage, and/or a specialized tool). Further, in some embodiments, the lock-box 1392 is hidden from passenger areas or doorways.

Each of the at least one metal detector 1394 is used to detect the presence of metal, and one or more metal detectors 1394 can each be positioned at an entryway of the vehicle. As used herein, an entryway is a portion of the bus or vehicle through which an individual may enter a passenger cabin of the bus or vehicle, such as a door or an emergency escape hatch. The metal detector(s) 1394 may be used to detect the presence of dangerous materials that may be brought onto the bus. For example, the metal detector(s) 1394 may detect metal and the results of the detection (or "metal detector detection results") may be stored in memory of the vehicle occupant detection system. Then, in response to triggering of the secret alarm trigger 1396, which is discussed below, the metal detector detection results may be recalled from memory and sent as a part of a message (e.g., the first message in step 410 of method 400 (FIG. 32) discussed below) to a designated individual or device.

The secret alarm trigger 1396 is a trigger that, when activated (i.e., triggered), causes an alarm signal to be sent to a remote location without being perceived by passengers in the vehicle. That is, it is intended that passengers (not including the activator, which is likely the driver) located within a passenger compartment of the vehicle remain unaware that the operator has initiated the secret alarm trigger 1396. In this sense, the secret alarm trigger 1396 is located in an area proximate to a driver position (e.g., driver's seat) and mounted in a manner such that the secret alarm trigger 1396 is capable of being triggered without being perceived by passengers located in a passenger compartment of the vehicle (or at least by passengers located in a passenger seat (not including the driver) of the vehicle). An exemplary mounting position includes an area that is on a side of the driver's seat DS that is opposite from a side on which the door D is provided, as shown in FIG. 30. In another embodiment, the secret alarm trigger 1396 is provided or embedded within the driver's seat DS and may be embedded on a side that is opposite from a side on which the door D is provided. In another embodiment, the secret alarm trigger 1396 is provided on or near an instrument panel of the bus or vehicle and, in another embodiment, the secret alarm trigger 1396 is provided under a seating portion of the driver's seat DS on which the driver sits such that the secret alarm trigger 1396 hangs down from a surface opposed to a surface on which the driver sits.

Figure 32:
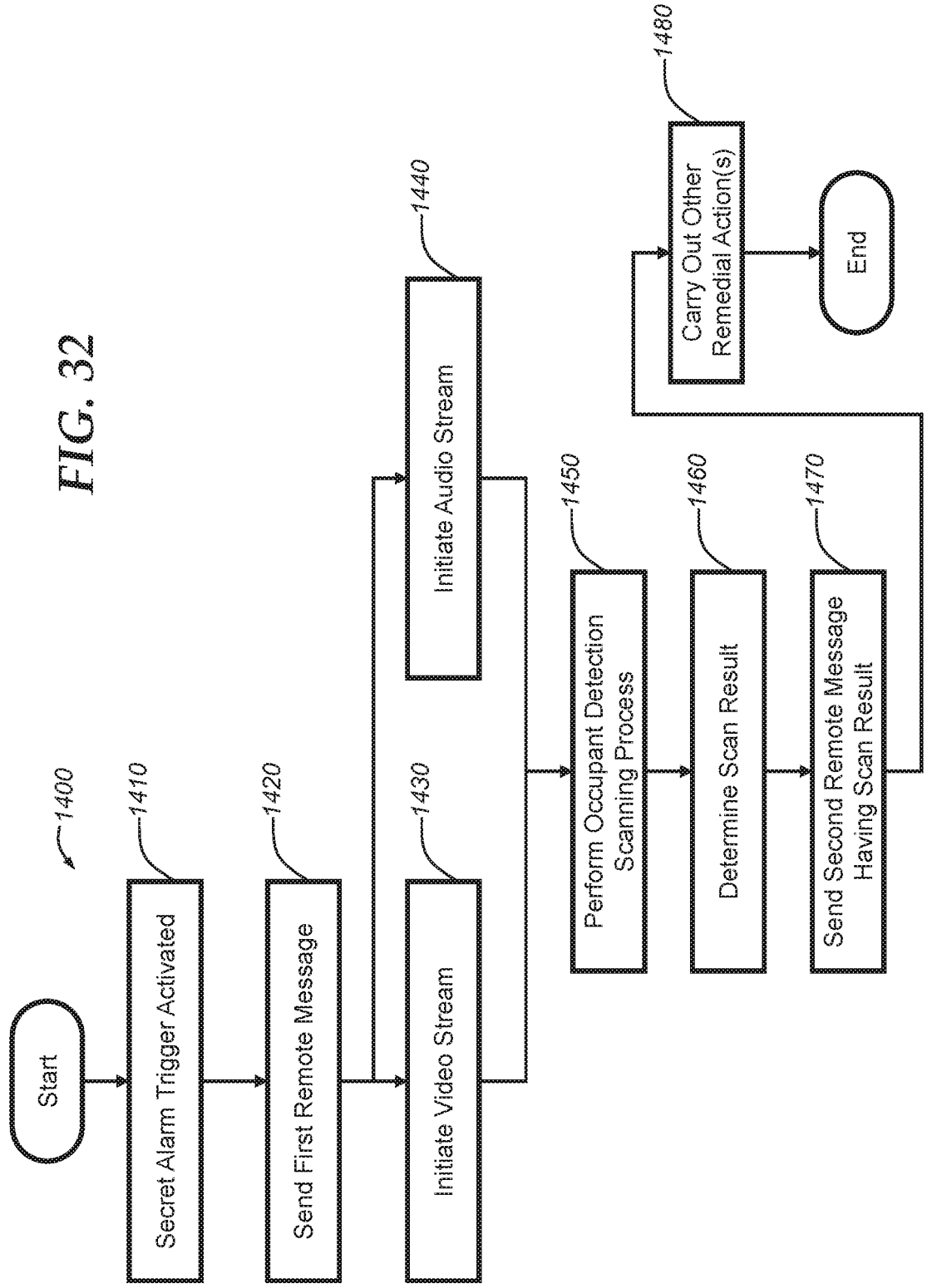
FIG. 32 is a flowchart illustrating a secret alarm trigger process that is carried out by a vehicle occupant detection system according to one embodiment.

The secret alarm trigger 1396 is communicatively coupled to the controller 1312, such as by way of a hard-wired connection or a wireless connection (e.g., SRWC connection to the SRWC circuit 1388). With reference to the embodiment shown in FIG. 30, the secret alarm trigger 1396 is an electromechanical button and that, when depressed, causes a secret alarm trigger process to be carried out, such as the secret alarm trigger process 1400 (FIG. 32). In other embodiments, the secret alarm trigger 1396 may be in the form of another input mechanism, such as an electromechanical switch, a graphical button or input provided on a GUI of the driver interface 1343, etc.

The vehicle occupant detection system 1310 also includes a silent exterior alarm device 1349, which is a type of exterior alarm that does not produce any sound or other indication that is perceivable by passengers within the passenger compartment of the vehicle. In one embodiment, and as shown in FIG. 31, the silent exterior alarm device 1349 is a light source that is provided on the roof of the bus and that emits light when activated. The silent exterior alarm device 1349 thus is usable to warn others that are not passengers on the bus or vehicle that there may be an emergency on the bus, or that attention to the bus or vehicle is otherwise desired. The silent exterior alarm device 1349 may be provided in other forms, such as in the form of a digital sign on the bus exterior that displays one or more predefined messages. Although only a single silent exterior alarm device is shown, it should be appreciated that any suitable number of silent exterior alarm devices may be used.

The vehicle interface 1370 includes a vehicle disable switch 1398, which is operable by the controller 1312 via the vehicle interface 1370. The controller 1312 is connected or coupled to the vehicle disable switch 1398 in a manner such that the controller 1312 causes the vehicle disable switch 1398 to be activated (e.g., switched or set to disable) thereby preventing the vehicle from started, driven, or propelled. In one embodiment, the vehicle disable switch 1398 is an ignition shut-off switch that is wired in series with the ignition switch, which is one that is used to turn on the starter motor of the vehicle or otherwise cause the vehicle to be started. In another embodiment, such as in the case of electric vehicles, the vehicle disable switch 1398 is provided between a battery (or other power source) and a motor, such as the primary mover of the vehicle. Of course, other embodiments of the vehicle disable switch 1398 may be implemented so as to prevent the vehicle from being started, driven, or propelled.

With reference to FIG. 32, there is shown a secret alarm trigger process 1400 that is carried out by a vehicle occupant detection system, such as the vehicle occupant detection system 1310. Although the process 1400 is described as being carried out by the vehicle occupant detection system 1310, it should be appreciated that the process 1400 may be carried out by other vehicle occupant detection systems. Also, although a particular order of steps 1410-1480 of the process 1400 is shown and described with reference to FIG. 32, it should be appreciated that these steps may be carried out in any technically-feasible order.

The process 1400 begins with step 1410, wherein the secret alarm trigger is activated. As mentioned above, the secret alarm trigger 1396 is triggered by an individual at the bus or vehicle, such as the driver. For example, in one embodiment, the secret alarm trigger 1396 is an electromechanical button that is mounted within the vehicle at a position proximate to a driver's seat, such as in a location where the driver may press the secret alarm trigger 1396 without becoming unseated from the driver's seat. In such an example, the bus driver may press the electromechanical button that corresponds to the secret alarm trigger 1396. A secret alarm trigger activation signal is then sent from the secret alarm trigger 1396 to the controller 1312, which then can record a time indicator indicating a time that corresponds to the activation of the secret alarm trigger 1396, such as the time of activation of the secret alarm trigger 1396 and/or the time of receipt of the secret alarm trigger activation signal at the controller 1312. This time indicator is referred to as a secret alarm trigger activation time. The time indicator along with other information may then be stored in memory of the vehicle occupant detection system 1310, such as non-volatile memory of the controller 1312. The process 1400 then continues to step 1420.

In step 1420, a first remote message is sent to a first remote device. The first remote message includes a secret alarm trigger activation indicator, which indicates that the secret alarm trigger 1396 was activated or triggered. In at least some embodiments, the first remote message further includes the secret alarm trigger activation time. For example, in one embodiment, the location of the vehicle occupant detection system 1310 (and, thus, the location of the vehicle in which the vehicle occupant detection system 1310 is installed) is sent as a part of the first remote message (or may be sent as a part of another remote message to the remote user). In many embodiments, the first remote message is sent using the cellular chipset 1328 to one or more remote devices (collectively referred to as the "first remote device(s)"), which may be remote device of a fleet manager, an emergency monitoring or alarm service, and/or other designated individual. In one embodiment, the first remote message is an SMS message that is sent to a predefined number, such as one that is stored in memory of the vehicle occupant detection system 1310.

In at least some embodiments, the location is a GNSS location that is determined based on GNSS signals received at the GNSS receiver 1344. In one embodiment, in response to the activation of the secret alarm trigger 1396 or in response to the controller 1312 (or other component of the vehicle occupant detection system 1310 receiving the secret alarm trigger activation indicator), the GNSS receiver 1344 receives GNSS signals and determines the GNSS location based on the received GNSS signals; this GNSS location is then sent to the first remote user(s). In other embodiments, the controller 1312 (or other device of the vehicle occupant detection system 1310) determines whether the location of the vehicle (e.g., the GNSS location of the vehicle occupant detection system 1310 that is installed in the vehicle) has recently been recorded and, if so, that recently-recorded location is used and sent to the first remote user(s); otherwise, a present GNSS location is determined from the GNSS signals and sent to the first remote user(s).

Other information may be included in the first remote message, such as one or more present states of the vehicle occupant detection system 1310. For example, image data and/or audio data that was recorded by the at least one camera 1340 and/or the at least one microphone 1390 is included in the first remote message (or sent in another message to the remote user). In one embodiment, this image data and/or audio data is recently recorded data—for example, the at least one camera 1340 and/or the at least one microphone 1390 are configured to record image data and/or audio data and this data is then stored for a predetermined amount of time (e.g., 5 minutes) and then deleted after the predetermined amount of time unless there is an indication that the data is of interest and is to be stored longer or indefinitely. This image data can be stored locally at the at least one camera 1340 and the audio data can be stored locally at the at least microphone, or this data can be stored at the memory of the controller 1312 (or other memory of the vehicle occupant detection system 1310).

In some embodiments, vehicle information that is obtained via the vehicle interface 1370 is included in the first remote message (or in another remote message sent to the remote user). For example, a parking state status and/or an ignition status are sent to the remote user. The parking state status 672 and ignition status 674 are discussed above with respect to FIG. 17. Also, in some embodiments, external device information, such as one or more states or information obtained from the personal driver device 1022, is sent as a part of the first remote message (or as a part of another remote message that is sent to the remote user). The external device information includes, for example, an indicator indicating whether the personal driver device 1022 is present at the vehicle (e.g., within operating/detection range of certain SRWC used by the vehicle occupant detection system 1310 and the personal driver device 1022), a range of the personal driver device 1022, a location of the personal driver device 1022 relative to the SRWC circuit 1388, etc. The process 1400 continues to steps 1430 and 1440.

In steps 1430 and 1440, a remote video stream is initiated (step 1430) and a remote audio stream is initiated (step 1440). A remote video stream is a video stream that is a stream of image data that is sent to a remote device and visually displayed at the remote device. A remote audio stream is a stream of audio data that is sent to a remote device and audibly presented at the remote device. The remote video stream and/or the remote audio stream are provided to one or more remote devices (collectively referred to as the "second remote device(s)"), which may include a remote device of a fleet manager (e.g., the personal fleet manager device 1020), a remote device of an emergency monitoring or alarm service, and/or a remote device of other designated individual. It should be appreciated that the second remote device(s) may include any one or more of the first remote device(s). In one embodiment, the initiation of the remote video stream and/or the remote audio stream includes sending a streaming request to a remote device and, then, receiving a response to the streaming request that indicates whether the request is to be satisfied—that is, whether the image data and/or audio data is to be streamed to the remote device. Once the remote video stream and/or the remote audio stream have been initiated, image data and/or audio data is sent and streamed to the second remote device(s) for playback.

In step 1430, in some embodiments, the controller 1312 sends a message to the at least one camera 1340 that causes the at least one camera 1340 to start recording video (or a series of images) in the form of image data. In some scenarios or embodiments, the at least one camera may have already started to obtain image data and, in such embodiments, this message provides an indication that the already-obtained image data is of interest and/or that this already-obtained image data is to be sent to the controller 1312 (or other device of the vehicle occupant detection system 1310). The image data that is obtained by the at least one camera 1340 is sent to the controller 1312 (or other device of the vehicle occupant detection system 1310) and then sent to the remote device, such as by way of the cellular chipset 1328. After the remote video stream is initiated, the remote video stream is carried out, which includes continuously obtaining image data using the at least one camera and sending the obtained image data to the second remote device(s).

In step 1440, in some embodiments, the controller 1312 sends a message to the at least one microphone 1390 that causes the at least one microphone 1390 to start recording audio in the form of audio data. In some scenarios or embodiments, the at least one microphone may have already started to obtain audio data and, in such embodiments, this message provides an indication that the already-obtained audio data is of interest and/or that this already-obtained audio data is to be sent to the controller 1312 (or other device of the vehicle occupant detection system 1310). The audio data that is obtained by the at least one microphone 1390 is sent to the controller 1312 (or other device of the vehicle occupant detection system 1310) and then sent to the remote device, such as by way of the cellular chipset 1328. After the remote audio stream is initiated, the remote audio stream is carried out, which includes continuously obtaining audio data using the at least one microphone and sending the obtained audio data to the second remote device(s).

In some embodiments, the remote video stream and the remote audio stream include streaming image data and audio data from a camera-microphone package that includes at least one camera and at least one microphone. In such embodiments, the remote video stream and the remote audio stream may coincide with one another and may be initiated at the same time. The image data and the audio data of may be combined into video-audio data that is sent and streamed together, or the image data and the audio data may be kept separate. The process 1400 continues to step 1450.

In step 1450, an occupant detection scanning process is performed. The occupant detection scanning process may be performed out by the life detection sensors 1330 according to any one or more of those previously discussed embodiments of the occupant detection scanning process, such as that which is described with respect to step 830 (FIG. 23) and/or step 960 (FIG. 24). This step includes obtaining sensor data from the life detection sensors. The process 1400 continues to step 1460. In step 1460, the scan result is determined from the sensor data obtained during the occupant detection scanning process. This step 1460 may be carried out according to step 970 (FIG. 24). The process 1400 continues to step 1470.

In step 1470, a second remote message is sent to a third remote device. The third remote device includes one or more remote devices (collectively referred to as the "third remote device(s)"), which may include a remote device of a fleet manager (e.g., the personal fleet manager device 1020), a remote device of an emergency monitoring or alarm service, and/or a remote device of other designated individual. It should be appreciated that the third remote device(s) may include any one or more of the first remote device(s) and/or any one or more of the second remote device(s). The second remote message includes the scan result that was determined in step 1460. The process 1400 continues to step 1480.

In step 1480, one or more remedial actions are carried out. In at least some embodiments, the one or more remedial actions are carried out in response to a message that is received from a remote device. The remote device may be any one of the first remote device(s), the second remote device(s), and the third remote device(s). In one embodiment, a first remedial action includes disabling the vehicle from being started, driven, and/or propelled. In such an embodiment, for example, the vehicle occupant detection system 1310 receives an indication from a remote device (e.g., any of the first, second, or third remote device(s) discussed above) to disable the vehicle from being started, driven, and/or propelled and, in response to this indication, the vehicle disable switch 1398 is activated such that the vehicle is disabled from being started, driven, and/or propelled.

As another example of a remedial action, one or more silent exterior alarms can be activated. This can include activating the roof-mounted light 1349 that is provided on the roof of the bus as shown in FIG. 31. Another example of a remedial action includes causing the electronically-controlled door lock 1393 to be unlocked so as to permit access to the contents of the storage compartment of the lock-box 1392. In one embodiment, the vehicle occupant detection system 1310 receives an indication from a remote device (e.g., any of the first, second, or third remote device(s) discussed above) to unlock the lock-box 1393 and, in response, the controller 1312 sends an unlock signal to the electronically-controlled door lock 1393, which disengages a locking mechanism thereby permitting access to the storage compartment. The process 1400 then ends.

Lifeform Classification Profiles. In one embodiment, life classification profiles may be developed for analyzing infrared sensor data obtained from the infrared detector(s) 1358 and/or for analyzing sensor data obtained from the life detection sensor(s) 1330. These life classification profiles may be developed through, for example, testing or empirically-derived, and then stored in memory at the vehicle occupant detection system 1310. A life classification profile may be developed for people of different attributes (e.g., different sizes, different ages) and/or for identifying other classes of lifeforms (e.g., small mammalian animal (e.g., raccoon, housecat), birds).

In some embodiments, such as those where the confidence level of the determined class or type of lifeform detected is sufficiently high, the type of remedial action(s) taken in response to the detection may be selected based on the determined class or type of lifeform. The confidence level may be determined to be sufficiently high where the system is tested ahead of time and the overall, predetermined confidence level of the system is determined to be over a threshold amount, or where the system (at the time of use) determines a confidence level of a particular infrared detection result and then determines whether that confidence level for that result is above a predetermined threshold amount. For example, when one of the infrared detector(s) 1358 or life detection sensors 1330 detects a lifeform that is classified as being a human, then an audible message having spoken words (e.g., "DO NOT MOVE") may be played through a speaker of the vehicle occupant detection system 1310 (or through a speaker of the bus) and an emergency message may be sent to a designated individual, such as to the police informing them of a potential break in, or to a fleet manager. In another example, when one of the infrared detector(s) 1358 or life detection sensors 1330 detects a lifeform that is classified as being a non-human lifeform (e.g., a small animal), then the remedial action(s) do not include spoken words, but do include a frightening sound (e.g., a roar of a lion) that is played through a speaker of the vehicle occupant detection system 1310 (or through a speaker of the bus) or a designated individual (which may be the same or different than the designated individual contacted when the occupant detected is a human) is sent a message.

Frequency separation techniques. As mentioned above, during the occupant detection scanning process, such as that which is carried out in step 960 of the method 900 (FIG. 24), different channel separation techniques can be used so as to avoid or reduce interference between the electromagnetic signals. An example of a channel separation technique is frequency division multiplexing (FDM), where electromagnetic signals are transmitted by each of the life detections sensors according to a different frequency (or set of frequencies) (each of which is considered a channel) so as to avoid or mitigate interference between channels (e.g., adjacent channels). Another example of a channel separation technique is code division multiplexing (CDM), which uses pseudo-random codes to multiplex a base signal. The use of FDM or CDM techniques enables multiple life detection sensors to scan at the same time. In other embodiments, time division multiplexing (TDM) can be used in which the life detection sensors transmit electromagnetic signals at different times in a synchronized manner. In some embodiments, a combination of the above-mentioned techniques are employed.

Arrangement of life detection sensors. The life detection sensors may be mounted according to various positions and orientations. As discussed above with respect to FIGS. 4-5, according to one embodiment, each life detection sensor is oriented so that the field of view of the life detection sensor encompasses two bench seats (each in a different row). Also, as discussed above with respect to FIG. 6, the dual-sensor bracket 130 housing houses two life detection sensors that can be used and can be mounted on the ceiling in the center aisle of the bus and, as discussed above with respect to FIG. 7, the quad-sensor bracket 140 housing houses four life detection sensors that can be used and can be mounted on the ceiling in the center aisle of the bus.

Housing/Cover of Life Detection Sensor. The life detection sensors are each housed within a cover or housing that protects the circuitry and other components of the life detection sensor. The cover may be selected based on the desired type of mounting for the life detection sensor. For example, in one embodiment, the life detection sensors (or a subset thereof) are flush-mounted with respect to the ceiling of the passenger compartment. In such an embodiment, each flush-mounted life detection sensor is recessed in a hole created in the ceiling of the passenger compartment of the bus. The hole may be sized and the life detection sensor may be positioned so that the field of view of the life detection sensor is not obstructed. In such an embodiment, a cover comprised of a radar transmissive material (i.e., a material that does not interfere with electromagnetic signals transmitted and/or received by the life detection sensor) can be included as a part of the housing and the cover can be sized according to the size of the hole. The cover is fit within the hole and may have a flange portion that extends along a surface of the ceiling that is within the passenger cabin of the bus. In other embodiments, the life detection sensors (or a subset thereof) are not flush-mounted, but project downward from the ceiling of the passenger compartment of the vehicle. In at least some of such embodiments, a hole may still be included in the ceiling of the passenger compartment so that wires (e.g., wires connecting the life detection sensor to the controller) may be provided through a space between the ceiling and roof of the vehicle. In such a case, the size of the hole may be reduced compared with a hole used for a flush-mounted life detection sensor.

With reference to FIGS. 33-34, there is shown a cover 1500 for a life detection sensor that includes two screw holes 1502, 1504, as well as a plurality of retaining tabs 1510, 1512, 1514, 1516 that are configured to hold the life detection sensor 1600. The cover 1500 is configured to be mounted to a ceiling C of a vehicle, such as a school bus, by inserting a screw $S_1$, $S_2$ through each of the two screw holes 1502, 1504 and through a corresponding portions of the ceiling C so as to fix the cover 1500 to the ceiling C of the vehicle, such as to a headliner of an interior passenger compartment of the vehicle. It should be appreciated that the cover and/or life detection sensor(s) may be mounted to any suitable location, which can include, for example, a side wall of an interior passenger cabin, underneath a passenger or driver seat, and within a passenger or driver seat.

The cover 1500 is comprised of a unitary construction and can be formed of a polymer or resin material through a molding process, such as injection molding. Of course, other constructions and processes may be used to construct the cover 1500. The cover 1500 is elongated along an axis X from a first end portion 1530 to a second end portion 1532 with the first screw hole 1502 being provided at the first end portion 1530 and the second screw hole 1504 being provided at the second end portion 1532. The first screw hole 1502 includes a hole or slit that extends perpendicular to the axis X in which the cover 1500 extends and the second screw hole 1504 includes a hole or slit that extends parallel to the axis X in which the cover 1500 extends. This configuration accounts for variances in the corresponding screw holes provided in the ceiling so as to facilitate mounting the housing to the ceiling using screws $S_1$, $S_2$. The first end portion 1530 and the second end portion 1532 are provided on a common plane and abut the ceiling of the vehicle when fixed thereto by the screws $S_1$, $S_2$. However, it should be appreciated that other fixing means can be used to fix the cover to the ceiling, such as adhesives, weldments, hook and loop fasteners, rivets, etc.

The life detection sensor 1600 includes a housing 1602 that includes a cable connector portion 1604 that is used to connect to a communication cable so that the life detection sensor 1600 can be connected to the controller, a battery, and/or other portions of the vehicle occupant detection system. The cable connector portion 1604 projects off of an end face of the housing 1602 at a first end portion 1630 of the life detection sensor 1600, and is connected to one or more electrical wires W. The housing 1602 is configured to be slid underneath (i.e., under an interior facing portion) of the plurality of retaining tabs 1510-1516. The cover 1500 also includes a base 1508 that is shown in the illustrated embodiment as a rectangular wall, and the cover 1500 is configured to hold the life detection sensor 1600 between the plurality of retaining tabs 1510-1516 and the base 1508. The plurality of retaining tabs 1510-1516 are provided on one side of a central axis passes through the center of the cover 1500 and that is perpendicular to axis X In the illustrated embodiment, the plurality of tabs 1510-1516 are provided on the right side of this central axis. To engage the life detection sensor 1600 with the cover 1500, the life detection sensor 1500 is placed in the left side of the cover 1500 and then slid to the right side of the cover 1500 so that the plurality of retaining tabs 1510-1516 engage the housing 1602 so as to retain the life detection sensor 1600 within the cover 1500 between the base 1508 and the plurality of retaining tabs 1510-1516.

The cover 1500 includes a sensor view portion 1540 that is comprised of a tranmissive material that allows the life detection sensor 1600 to obtain sensor data without interference from the sensor view portion 1540. In one embodiment, the sensor view portion 1540 is comprised of an optically opaque, RF transmissive material. In one embodiment, the non-interfering material is an RF transparent material, such as polypropiolactone (PPL), polyvinyl chloride (PVC), Teflon, acrylonitrile butadiene styrene (ABS), etc. The sensor view portion 1540 can be comprised of the same or a different material than the rest of the cover 1500. In one embodiment, the sensor view portion 1540 is sized and positioned according to the size and position of the life detection sensor 1600 when received within the cover 1500. That is, the area of the sensor view portion 1540 can correspond to that area of the life detection sensor 1600 as shown in FIG. 33, at least according to one embodiment.

The cover 1500 is configured to be mounted or fixed to a flat, planar portion of the vehicle, such as a portion of the ceiling C. However, in other embodiments, the cover 1500 can be configured to be mounted or fixed to other types of surfaces, including those that are not flat or planar. When mounted to the ceiling C, the entire cover 1500 is disposed beneath the ceiling C and does not include any portion that projects within the ceiling C, as is best shown in FIG. 34. In some embodiments, one or more electrical wires W are used to provide electrical power to the life detection sensor 1600 and/or data communications between the life detection sensor 1600 and the controller (or other components of the vehicle occupant detection system). In such embodiments, the one or more electrical wires W can be fed through a portion between the ceiling C of the vehicle and the roof R of the vehicle. Also, in such embodiments, a hole H may be provided in the ceiling C of the vehicle at a portion that will be covered by the cover 1500 when mounted to the ceiling C of the vehicle. The hole H may be circular (or cylindrical), at least in one embodiment. In some embodiments, including the illustrated embodiment, the cover 1500 holds the life detection sensor 1600 below the ceiling C. In some of such embodiments, the hole H only needs to be large enough to permit the one or more electrical wires W to pass through. Thus, by having a cover 1500 that includes a protruding portion in which the life detection sensor 1600 is retained, only a relatively small hole H is needed to be provided in the ceiling C of the vehicle since only the electrical wire(s) W need to pass through and not the life detection sensor 1600, at least according to some embodiments. In some embodiments, the area of the hole H taken along a plane that is parallel (i.e., taken in plan view as shown in FIG. 33) with a portion of the ceiling C of the mass-transit vehicle to which the cover 1500 is attached is less than the area of the life detection sensor 1600 when taken along the plane. It should be appreciated that, in the illustrated embodiment, the entire cover 1500 projects or protrudes from the ceiling C when mounted (i.e., no part of the cover is retained within the ceiling C, such as in a space between the ceiling C and the roof R of the vehicle), and so the entire cover 1500 as illustrated can be considered the protruding portion.

In some embodiments, the life detection sensor 1600 communicates with the controller (or other components of the vehicle occupant detection system) via wireless communications. In some of such embodiments, the cable connector portion 1604 may be used only for providing electrical power, or may be omitted, such as in the case where the life detection sensor includes a battery. Also, in some of such embodiments, the cable connector portion 1604 may be replaced with an antenna used for wireless communications, such as SRWCs.

Driver Device Connection Establishment. In some embodiments, a personal driver device is paired with the SRWC circuit of the vehicle occupant detection system. A personal driver device, such as the personal driver device 1022, may be paired or associated with a SRWC circuit of the vehicle occupant detection system. This can include carrying out a pairing process, such as a Bluetooth™ pairing process, which, for example, can include the SRWC circuit of the vehicle occupant detection system being set to a discovery mode and then the personal driver device can initiate a discovery process where it searches for discoverable devices. A user may then select the SRWC circuit of the vehicle occupant detection system from a list of discovered devices. Then, authentication information may be exchanged between the personal driver device and the SRWC circuit of the vehicle occupant detection system. The authentication information can be, for example, a public key of the personal driver device and a public key of the SRWC circuit of the vehicle occupant detection system. This authentication information may be used to generate a short-term key. Then, this short-term key may be used by the devices to exchange a secret key (or a long-term key), which is generated at one of the two devices. The secret key may then be used to encrypt or otherwise secure wireless communications between the personal driver device and the SRWC circuit of the vehicle occupant detection system. These devices may be bonded as well by each of the devices storing the secret key on memory so that it may be used to secure wireless communications between the personal driver device and the SRWC circuit of the vehicle occupant detection system at a later time and without having to carry out the pairing process again.

Driver Presence Detection. According to some embodiments, certain functionality can be carried out based on whether the driver of the vehicle is present at the vehicle. The presence of the driver can be determined using a variety of techniques. In one embodiment, a first technique is to determine whether a personal driver device, such as the personal driver device 1022, is within operating/connection range of a short-range wireless communication (SRWC) circuit of the vehicle, such as the SRWC circuit 1388 of the vehicle occupant detection system 1310. For example, once the devices are paired and/or bonded, the vehicle occupant detection system can be configured to recognize the personal driver device as being a device that is being used by the driver or a particular driver. As an example, a user may operate a user interface of the vehicle occupant detection system, such as a GUI, to carry out this configuration step, which can include the user selecting an option "SET DRIVER DEVICE" and then selecting the personal driver device from a list of discovered, paired, or bonded devices. At this point, the vehicle occupant detection system may identify the selected device as being the personal driver device. Then, the vehicle occupant detection system can identify whether the personal driver device (or the device set at the vehicle occupant detection system as the personal driver device) is present, which can be used to indicate whether the driver is present.

In some embodiments, the SRWC connection between the personal driver device and the vehicle occupant detection system can be used to determine a location of the personal driver device relative to the SRWC circuit of the vehicle occupant detection system. The location of the driver may then be inferred from the personal driver device location, and various functionality described below can be carried out based on the location of the driver. In one embodiment, a range between the personal driver device and the SRWC circuit of the vehicle occupant detection system is determined. For example, the received signal strength indicator (RSSI) that is determined based on wireless communications sent between the two devices may be used to determine the range. Additionally or alternatively, an angle or departure (AOD) and/or an angle of arrival (AOA) between the two devices can be used to determine a relative position or direction between the personal driver device and the SRWC circuit of the vehicle occupant detection system. Such an embodiment may be implemented using direction finding techniques of Bluetooth™ 5.1. The location of the driver may then be used to confirm that the driver is carrying out certain predefined duties, such as doing a manual occupant check at the end of a trip. As an example of verifying that such predefined duties are being carried out, the location (which can include the range) is used to determine whether, at the end of a trip, the driver has moved in a predetermined path, which is a series of two or more predetermined points. As an example, the predetermined path can be defined as a first point near the front of the bus, a second point near the back or rear of the bus, and a third point near the front of the bus. This predetermined path may be used to determine whether the driver moved from the front of the bus to the back of the bus and then to the front of the bus again, which can be used as an indicator that the driver carried out a manual occupant check.

As mentioned above, the location of the driver (or personal driver device) may be used as a part of determining certain functionality that is to be carried out. For example, during a vehicle trip, the vehicle occupant detection system may determine that the driver has departed or exited the passenger cabin of the bus (or vehicle) during a time when the driver is supposed to be present in the passenger cabin. The vehicle occupant detection system may then send a message to the personal driver device instructing the driver to enter or occupy the passenger cabin of the bus (or vehicle). In one embodiment, when it is determined that the driver has departed or exited the passenger cabin of the bus (or vehicle) and not returned for more than a predetermined amount of time, then a message may be sent to a fleet manager or other designated individual. In some instances, one or more steps of any of the alarm escalation processes can be carried out.

The personal driver device, once paired with the vehicle occupant detection system, may be used to receive messages from the vehicle occupant detection system. For example, a manual occupant check message may be sent to the personal driver device informing the driver to carry out a manual occupant check. This manual occupant check message may be displayed on a display of the personal driver device. As another example, a scan result message that indicates a scan result of the occupant detection scanning process may be sent to the personal driver device from the vehicle occupant detection system.

In some embodiments, the personal driver device may send messages to the vehicle occupant detection system. For example, the personal driver device may send an occupant detection scanning process start command to the vehicle occupant detection system. This occupant detection scanning process start command may command (or at least request) that the vehicle occupant detection system perform an occupant detection scanning process.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A method of carrying out a remedial action in response to detecting an occupant within a vehicle, wherein the method is carried out by a vehicle occupant detection system, wherein the vehicle occupant detection system includes:
   a plurality of life detection sensors that are communicatively coupled to a controller via a modular wire harness that has a plurality of modular wire harness segments and that enables additional life detection sensor(s) to each be added to the vehicle occupant detection system in a modular fashion through connecting an additional wire harness segment to one of the plurality of module wire harness segments;
   wherein a first one of the plurality of life detection sensors is mounted to a ceiling within an interior cabin of the mass-transit vehicle by a cover that protects the first life detection sensor, and
   the cover includes a sensor view portion that is comprised of a transmissive material that allows the first life detection sensor to obtain sensor data through the transmissive material; and
wherein the method comprises:
   detecting a mass-transit service termination event at the vehicle occupant detection system;
   in response to detecting the mass-transit service termination event, carrying out an occupant detection scanning process using the plurality of life detection sensors, wherein each of the plurality of life detection sensors obtains sensor data as a part of the occupant detection scanning process;
   determining whether an occupant is present at the vehicle based on the sensor data; and
   providing a notification that indicates whether an occupant is present at the vehicle.

2. The method of claim 1, wherein the notification includes indicating one or more life detection zones in which an occupant was detected.

3. A vehicle occupant detection system, comprising:
   a controller and a memory storing computer instructions, wherein the controller includes a processor that is communicatively coupled to the memory;
   a plurality of life detection sensors, wherein the plurality of life detection sensors are installed within an interior cabin of a mass-transit vehicle and are each associated with a life detection zone; and
   a local warning system having a human-machine interface (HMI) output device, wherein the HMI output device is used to indicate a result of an occupant detection scanning process carried out using the plurality of life detection sensors,
   wherein the plurality of life detection sensors are communicatively coupled to the controller via a modular wire harness that has a plurality of modular wire harness segments and that enables additional life detection sensor(s) to each be added to the vehicle occupant detection system in a modular fashion through connecting an additional wire harness segment to one of the plurality of module wire harness segments,
   wherein a first one of the plurality of life detection sensors is mounted to a ceiling within the interior cabin of the mass-transit vehicle by a cover that protects the first life detection sensor, and
   wherein the cover includes a sensor view portion that is comprised of a transmissive material that allows the first life detection sensor to obtain sensor data through the transmissive material;
   wherein the controller, when executing the computer instructions using the processor, causes the vehicle occupant detection system to:
      acquire sensor data by scanning the life detection zone using the plurality of life detection sensors;
      determine whether an occupant is present based on the sensor data; and
      provide an indication to a user that an occupant is present using the HMI output device when it is determined that an occupant is present.

4. A vehicle occupant detection system, comprising:
   a controller and a memory storing computer instructions, wherein the controller includes a processor that is communicatively coupled to the memory;
   a plurality of life detection sensors, wherein the plurality of life detection sensors are installed within an interior cabin of a mass-transit vehicle, wherein the plurality of life detection sensors are communicatively coupled to the controller via a modular wire harness that has a plurality of modular wire harness segments, wherein a first one of the plurality of life detection sensors is mounted to a ceiling within the interior cabin of the mass-transit vehicle by a cover that protects the first life detection sensor, and wherein the cover includes a sensor view portion that is comprised of a transmissive material that allows the first life detection sensor to obtain sensor data through the transmissive material;

wherein the controller, when executing the computer instructions using the processor, causes the vehicle occupant detection system to:
acquire sensor data by scanning the mass-transit vehicle using the plurality of life detection sensors;
determine whether an occupant is present based on the sensor data; and
provide an indication to a user that an occupant is present when it is determined that an occupant is present.

* * * * *